US011453439B2

(12) United States Patent
Kobayashi et al.

(10) Patent No.: US 11,453,439 B2
(45) Date of Patent: Sep. 27, 2022

(54) ROTATION ANGLE DETECTION DEVICE, ELECTRIC POWER STEERING DEVICE AND METHOD OF CONTROLLING ELECTRIC POWER STEERING DEVICE

(71) Applicant: NSK LTD., Tokyo (JP)

(72) Inventors: Takayuki Kobayashi, Tokyo (JP); Dai Suzuki, Tokyo (JP); Shin Kumagai, Tokyo (JP); Hidetaka Nakamura, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/432,338

(22) PCT Filed: Apr. 7, 2021

(86) PCT No.: PCT/JP2021/014711
§ 371 (c)(1),
(2) Date: Aug. 19, 2021

(87) PCT Pub. No.: WO2021/206110
PCT Pub. Date: Oct. 14, 2021

(65) Prior Publication Data

US 2022/0089216 A1 Mar. 24, 2022

(30) Foreign Application Priority Data

Apr. 8, 2020 (JP) ............................ JP2020-069997
Jul. 1, 2020 (JP) ............................ JP2020-114168
Feb. 4, 2021 (JP) ............................ JP2021-016704

(51) Int. Cl.
*B62D 15/02* (2006.01)
*G06F 1/3287* (2019.01)
(Continued)

(52) U.S. Cl.
CPC ....... *B62D 15/0235* (2013.01); *B62D 5/0463* (2013.01); *B62D 6/00* (2013.01);
(Continued)

(58) Field of Classification Search
CPC .......... B62D 5/04; B62D 5/0463; B62D 6/00; G01D 5/14; G01D 5/244; G01D 5/24428; G01D 5/24447
See application file for complete search history.

(56) References Cited

U.S. PATENT DOCUMENTS 10,103,657 B2 * 10/2018 Kuwahara ............ B62D 5/0463
10,578,723 B2 * 3/2020 Iwazawa ............. G01D 5/2449
(Continued)

FOREIGN PATENT DOCUMENTS

EP 2 050 658 B1 2/2012
JP 04-353711 A 12/1992
(Continued)

OTHER PUBLICATIONS

Written Opinion for PCT/JP2021/014711, dated Jun. 8, 2021.
(Continued)

*Primary Examiner* — Kevin Hurley
*Assistant Examiner* — Maurice L Williams
(74) *Attorney, Agent, or Firm* — Sughrue Mion, PLLC

(57) ABSTRACT

The power control unit sets a drive interval for driving the sensor by providing power intermittently to the sensor to a first time interval when no change is detected in the sine-wave signal and the cosine-wave signal, sets to the second time interval that is shorter than the first time interval when a change in only one of the sine-wave signal and the cosine-wave signal is detected, and sets to the third time interval that is shorter than the second time interval when a change in one of the sine-wave signal and the cosine-wave signal is detected and then a change in the other is detected.

10 Claims, 24 Drawing Sheets

(51) Int. Cl.
*B62D 5/04* (2006.01)
*B62D 6/00* (2006.01)
*G01D 5/244* (2006.01)

(52) U.S. Cl.
CPC .......... *B62D 15/025* (2013.01); *G01D 5/244* (2013.01); *G06F 1/3287* (2013.01)

(56) References Cited

U.S. PATENT DOCUMENTS 11,114,969 B2* 9/2021 Ohashi .................. B62D 5/0463
11,125,768 B2* 9/2021 Koeck .................... G01D 5/246
11,213,700 B2* 1/2022 Hautvast .............. A61N 5/1048
2006/0273247 A1* 12/2006 Sakamaki .............. B62D 5/049 250/231.16
2008/0157705 A1 7/2008 Sasaki et al.
2009/0319125 A1 12/2009 Lavoie
2012/0273290 A1* 11/2012 Kawano ............... B62D 5/0487 180/443
2013/0205917 A1 8/2013 Becker et al.
2014/0379204 A1 12/2014 Goto et al.
2015/0268283 A1* 9/2015 Mariethoz ............... H02P 6/185 702/66
2018/0010929 A1 1/2018 Li et al.
2018/0093702 A1 4/2018 Nampei
2018/0201303 A1 7/2018 Hara et al.
2018/0231400 A1 8/2018 Okumura et al.
2018/0234039 A1 8/2018 Kuwahara et al.
2019/0212216 A1 7/2019 Tanaka et al.
2019/0277666 A1* 9/2019 Ohmi ..................... G01D 5/244
2019/0346287 A1 11/2019 Koike et al.
2019/0363658 A1* 11/2019 Ghaderi .................. H02P 27/06
2020/0284614 A1 9/2020 Kawano et al.
2022/0024513 A1* 1/2022 Fukuda .................. H05K 1/144
2022/0024517 A1* 1/2022 Mori ........................ G01B 7/30
2022/0026242 A1* 1/2022 Kato ........................ H02K 1/28
2022/0041215 A1 2/2022 Suzuki et al.

FOREIGN PATENT DOCUMENTS

JP 2007-271372 A 10/2007
JP 2008-180698 A 8/2008
JP 2009-162730 A 7/2009
JP 2012-46047 A 3/2012
JP 2016-179760 A 10/2016
JP 2017-196991 A 11/2017
JP 2018-510353 A 4/2018
JP 2018-132353 A 8/2018
JP 2018-155545 A 10/2018
JP 2018-177005 A 11/2018
JP 2019-196971 A 11/2019
JP 2019-203749 A 11/2019
JP 2019-209722 A 12/2019
JP 2019-215310 A 12/2019
WO 2010/082086 A1 7/2010
WO 2017/026261 A1 2/2017
WO 2017/195601 A1 11/2017
WO 2019/097692 A1 5/2019

OTHER PUBLICATIONS

International Search Report for PCT/JP2021/014711, dated Jun. 8, 2021.
U.S. Appl. No. 17/634,329, filed Feb. 11, 2011, Takayuki Kobayashi et al.
International Search Report for PCT/JP2021/014710 dated Jun. 29, 2021.
Written Opinion for PCT/JP2021/014710 dated Jun. 29, 2021.
International Search Report for PCT/JP2021/014712, dated Jun. 8, 2021.
Written Opinion for PCT/JP2021/014712, dated Jun. 8, 2021.
European Search Report dated Mar. 14, 2022 in European Application No. 21751738.2.
Office Action dated Mar. 28, 2022 in European Application No. 21751738.2.
European Search Report dated Mar. 15, 2022 in European Application No. 21751494.2.
Office Action dated Mar. 28, 2022 in European Application No. 21751494.2.
Office Action dated Jan. 3, 2022 in U.S. Appl. No. 17/432,321.
Office Action dated May 11, 2022 in U.S. Appl. No. 17/432,321.
U.S. Appl. No. 17/432,321, filed Aug. 19, 2021, Dai Suzuki et al.
U.S. Appl. No. 17/634,629, Feb. 11, 2022, Takayuki Kobayashi et al.

* cited by examiner

VEHICLE SPEED SENSOR
12
Vh
CONTROLLER (ECU)
40
IG
Vbat
11
BATTERY
14
sin1, cos1
sin2, cos2
SENSOR UNIT
30
MOTOR
20
I
Th
1
2i
TORQUE SENSOR
10
REDUCTION GEAR
3
2o
4A
4B
5
6

FIG. 6A
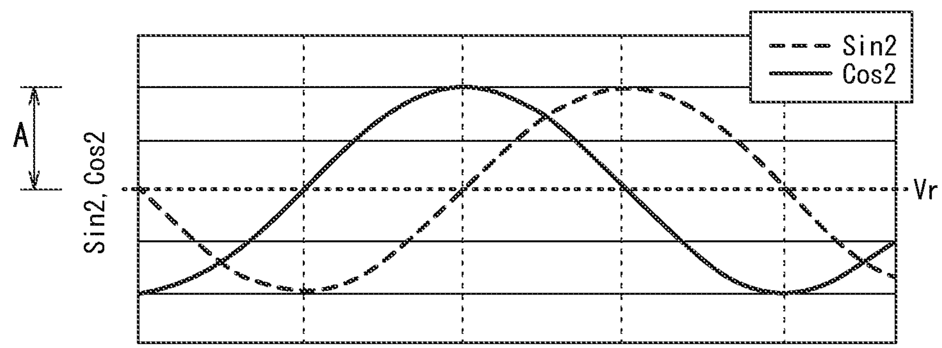
FIG. 6B
COMPARATOR OUTPUT
Sin : 0 Cos : 0 | Sin : 0 Cos : 1 | Sin : 1 Cos : 1 | Sin : 1 Cos : 0 | Sin : 0 Cos : 0
FIG. 6C
INCREASE/ DECREASE OF CNTs
+1 −1 | +1 −1
FIG. 6D
INCREASE/ DECREASE OF CNTc
+1 −1 | +1 −1
FIG. 6E
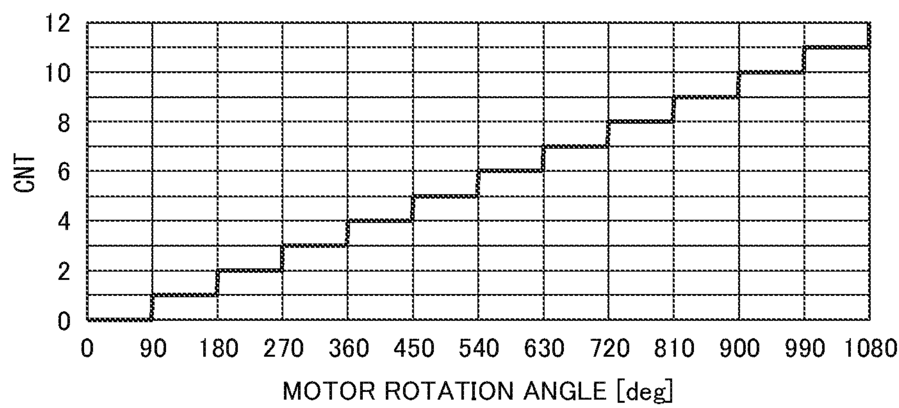

60
MPU
θo
θi
MOTOR20
66
ROTATION ANGLE INFORMATION CALCULATION UNIT
360
66a
66b
θm
Rg
66c
66d
68
ASSIST CONTROL UNIT
64
ROTATION NUMBER CALCULATION UNIT
Nr
63
ROTATION NUMBER INFORMATION CORRECTION UNIT
CNTa
62
COUNT TOTAL UNIT
CNT
61
ANGULAR POSITION CALCULATION UNIT
θ1
θ2
65
TORSION ANGLE CALCULATION UNIT
θt
67
DIAGNOSIS UNIT
Sd
CNTs
CNTc
sin1
cos1
sin2
cos2
Th
Vb Vs2

Cs

Cc
x
x
x−2.2
x−2.2
x−2.2
x−4.4
w
1
0
1
0
100
101
TIME

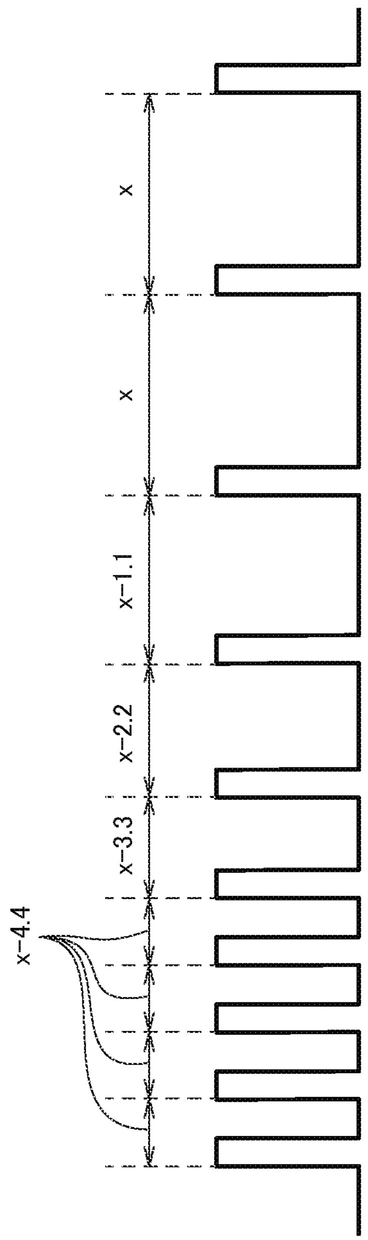
FIG. 16A Vs2
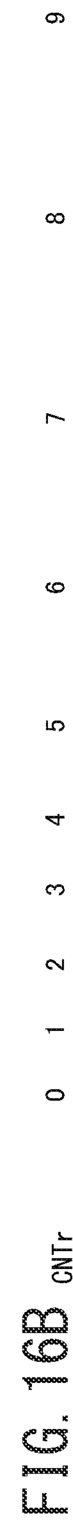
FIG. 16B CNTr
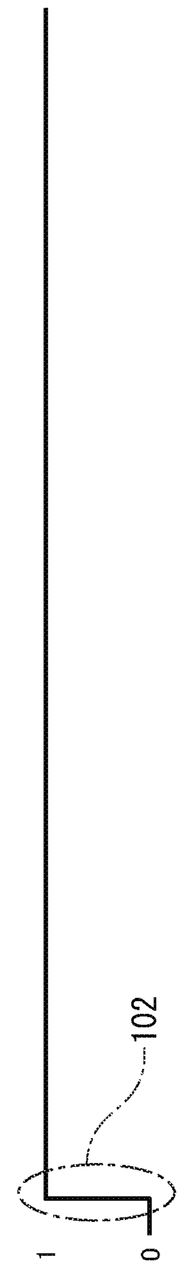
FIG. 16C Cs
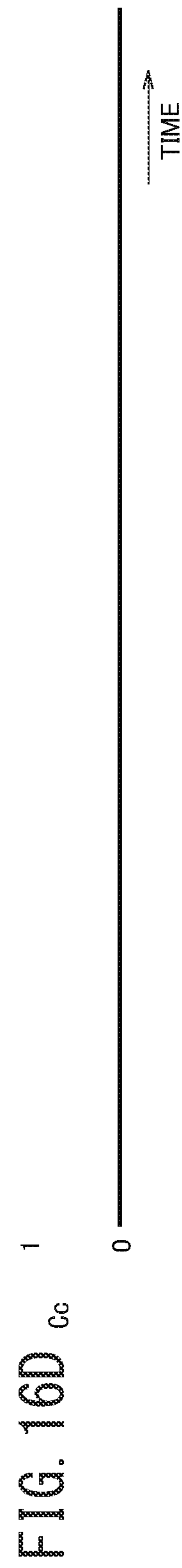
FIG. 16D Cc

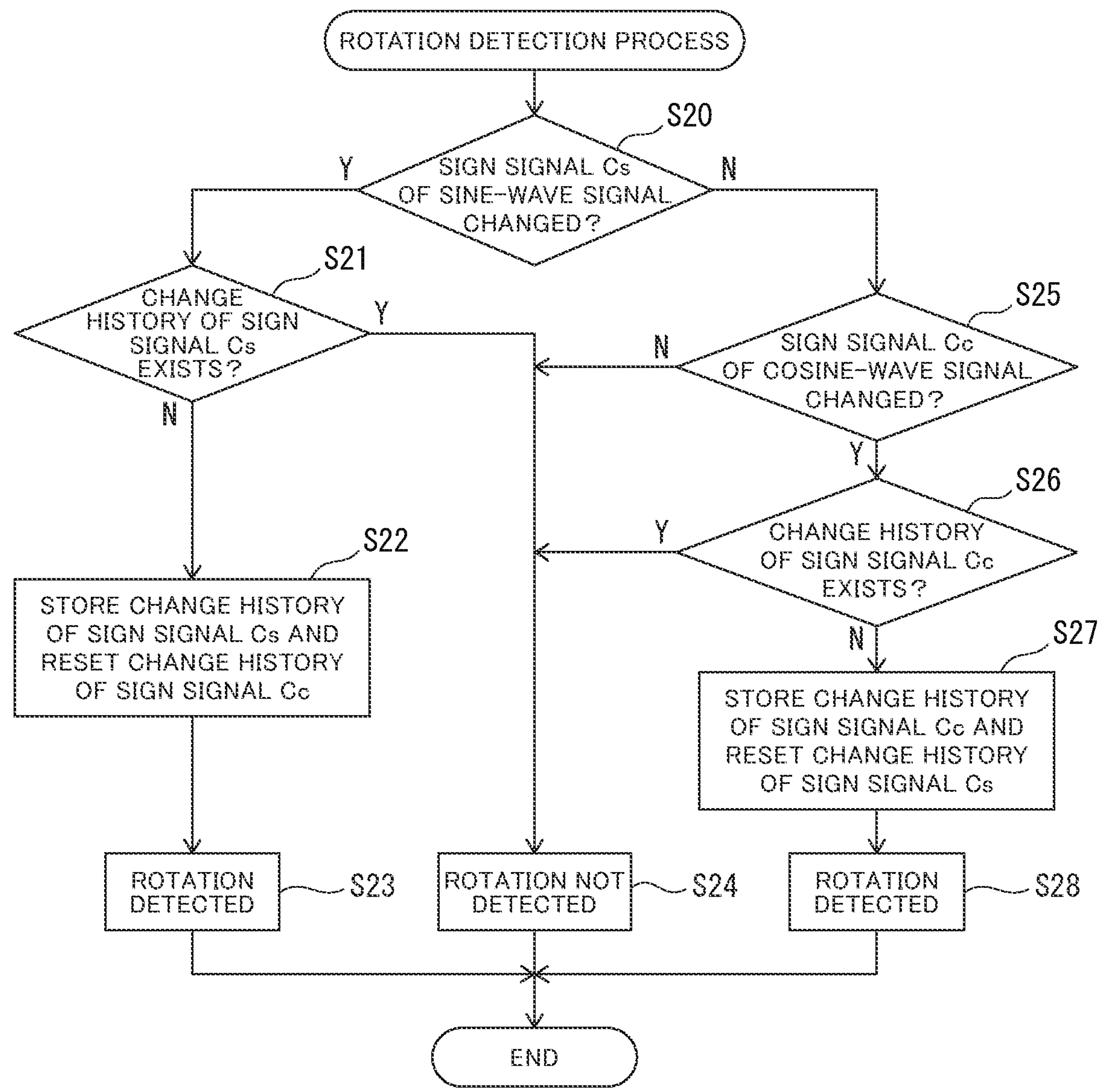
FIG. 18
ROTATION DETECTION PROCESS
S20
SIGN SIGNAL Cs OF SINE-WAVE SIGNAL CHANGED?
Y
N
S21
CHANGE HISTORY OF SIGN SIGNAL Cs EXISTS?
Y
N
S25
SIGN SIGNAL Cc OF COSINE-WAVE SIGNAL CHANGED?
N
Y
S26
CHANGE HISTORY OF SIGN SIGNAL Cc EXISTS?
Y
N
S22
STORE CHANGE HISTORY OF SIGN SIGNAL Cs AND RESET CHANGE HISTORY OF SIGN SIGNAL Cc
S27
STORE CHANGE HISTORY OF SIGN SIGNAL Cc AND RESET CHANGE HISTORY OF SIGN SIGNAL Cs
ROTATION DETECTED
S23
ROTATION NOT DETECTED
S24
ROTATION DETECTED
S28
END SENSOR UNIT
30
HARNESS 35
VL1
GND
sin1
cos1
VL2
sin2
cos2
33
FIRST SENSOR
34
SECOND SENSOR
34a
34b
36
FIRST AMPLIFIER
37
SECOND AMPLIFIER
37a
37b
38
FIRST OFFSET VOLTAGE OUTPUT CIRCUIT
39
SECOND OFFSET VOLTAGE OUTPUT CIRCUIT
39a
Voff1
Voff2
Rd11
Rd12
Rd21
Rd22
C11
C12
Ce1
Ce2
GND1
GND2
C21
C22
C23
C24
V1SIN
G1SIN
V1COS
G1COS
V2SIN
G2SIN
V2COS
G2COS
SIN1N
SIN1P
COS1N
COS2P
SIN2N
SIN2P
COS2N
COS2P
Ss1n
Ss1p
Sc1n
Sc1p
Ss2n
Ss2p
Sc2n
Sc2p
Rs21
Rs22
Rs23
Rs24
Rc21
Rc22
Rc23
Rc24

BATTERY
14
11
Vbat
IG
40
12
VEHICLE SPEED SENSOR
Vh
CONTROLLER (ECU)
sin1, cos1
sin2, cos2
6
5C
Th
I
SENSOR UNIT
30
20
MOTOR
REDUCTION GEAR
3
5A
5B
TORQUE SENSOR
10
1
4C
4B
2
4A
5C VEHICLE SPEED SENSOR
CONTROLLER (ECU)
BATTERY
TORQUE SENSOR
MOTOR
SENSOR UNIT
sin1, cos1
sin2, cos2
Vh
IG
Vbat
Th
I
1
2i
2o
4A
4B
5A
5B
5C
6
7A
7B
7C
7D
10
11
12
14
20
20a
30
40

BATTERY
14
11
Vbat
IG
40
12
VEHICLE SPEED SENSOR
Vh
CONTROLLER (ECU)
sin1, cos1
sin2, cos2
30
SENSOR UNIT
I
6
MOTOR
20
REDUCTION GEAR
3
8B
8A
5C
5B
5A
1
Th
2i
TORQUE SENSOR
10
2o
4A
4B

ROTATION ANGLE DETECTION DEVICE, ELECTRIC POWER STEERING DEVICE AND METHOD OF CONTROLLING ELECTRIC POWER STEERING DEVICE

CROSS REFERENCE TO RELATED APPLICATIONS

This application is a National Stage of International Application No. PCT/JP2021/014711 filed Apr. 7, 2021, claiming priority based on Japanese Patent Application No. 2020-069997 filed Apr. 8, 2020, Japanese Patent Application No. 2020-114168 filed Jul. 1, 2020 and Japanese Patent Application 2021-016704 filed Feb. 4, 2021.

TECHNICAL FIELD

The present invention relates to a rotation angle detection device, an electric power steering device and a method of controlling an electric power steering device.

BACKGROUND ART

Conventionally, a sensor for detecting a rotation angle of a motor rotation shaft is proposed. In addition, a technology for monitoring a rotation number of a rotation shaft of a motor while a power switch is off is proposed.

For example, in an electric power steering system, while an ignition key (main power) that is a power switch is off and an assistance function is stopped, a steering shaft may be rotated due to external force. For this reason, a rotation number of a rotation shaft of a motor connected to the steering shaft is desirable to be monitored by a circuit that is backed up by a battery even while the ignition key is off.

For example, the following PTL 1 describes a technology for making redundant by mounting two Magnetic Resistance (MR) sensors that detect the angular position of the electric steering motor and two counting units that process the output signal of the sensors and counting a rotation number of an electric steering motor by the two counting units based on a sine-wave signal and a cosine-wave signal that are output by two MR sensors respectively while the ignition key that is the power switch is off.

CITATION LIST

Patent Literature

PTL 1: European Patent No. 2050658

SUMMARY OF INVENTION

Technical Problem

The technology in PTL 1 may lead to an increase in power consumption due to current that flows through the sensor while the ignition key is off.

The present invention is made in consideration of such a problem, and the purpose of the present invention is to reduce power consumption of a rotation angle detection device including a sensor for outputting a signal in accordance with a rotation of a motor rotation shaft while a power switch is off.

Solution to Problem

In order to achieve the above-described object, according to an aspect of the present invention, there is provided a rotation angle detection device of a motor including: a sensor configured to output a sensor signal including a sine-wave signal and a cosine-wave signal in accordance with a rotation of a motor rotation shaft of a motor; a sensor power supply unit configured to supply power to the sensor; a power control unit configured to control the sensor power supply unit to supply power to the sensor continually when a power switch is on and supply power to the sensor intermittently when the power switch is off; a sensor signal detection unit configured to detect a change in the sine-wave signal and a change in the cosine-wave signal.

The power control unit sets a drive interval for driving the sensor by providing power intermittently to the sensor to a first time interval when no change is detected in the sine-wave signal and the cosine-wave signal, sets to a second time interval that is shorter than the first time interval when a change in only one of the sine-wave signal and the cosine-wave signal is detected, and sets to a third time interval that is shorter than the second time interval when a change in one of the sine-wave signal and the cosine-wave signal is detected and then a change in the other is detected.

According to another aspect of the present invention, there is provided an electric power steering device including; a torque sensor configured to detect steering torque that is applied to a steering shaft based on a torsion angle between an input shaft and an output shaft connected via a torsion bar mounted on a steering shaft of a vehicle; a motor configured to provide steering assistance force to a steering mechanism of the vehicle; the rotation angle detection device described above configured to calculate rotation angle information of a motor rotation shaft of the motor; a motor control unit configured to drive and control the motor based on the steering torque; and a steering angle calculation unit configured to calculate a steering angle of the input shaft based on the torsion angle, a reduction ratio of a reduction gear, and the rotation angle information.

According to another aspect of the present invention, there is provided a control method of the electric power steering device, wherein the steering assistance force provided by the motor is controlled based on the steering angle calculated by the steering angle calculation unit.

Advantageous Effects of Invention

According to the present invention, it is possible to reduce power consumption of a rotation angle detection device including a sensor for outputting a signal in accordance with a rotation of a motor rotation shaft while a power switch is off.

BRIEF DESCRIPTION OF DRAWINGS

FIG. 6A to FIG. 6D are explanatory diagrams of an exemplary operation of a rotation number detection unit, and FIG. 6E is an explanatory diagram of exemplary rotation number information.

FIG. 16A to FIG. 16D are explanatory diagrams of an example of controlling the drive interval of the second sensor when a rotation of the motor rotation shaft is not detected while the ignition key is off.

FIG. 18 is a flow chart of an exemplary rotation detection process of FIG. 17.

DESCRIPTION OF EMBODIMENTS

Embodiments of the present invention will be described in detail with reference to the drawings. Note that the embodiments of the present invention to be described below indicate devices and methods to embody the technical idea of the present invention by way of example, and the technical idea of the present invention does not limit the constitution, arrangements, and the like of the constituent components to those described below. The technical idea of the present invention can be subjected to a variety of alterations within the technical scope prescribed by the claims described in CLAIMS.

First Embodiment

Configuration

Hereinafter, a configuration example of a case in which a rotation angle detection device of the embodiment is applied to an Electric Power Steering (EPS) device that gives rotation force of a motor as the steering assistance force (assistance force) to a steering mechanism of a vehicle. The present invention is not limited to a rotation angle detection device applied to an electric power steering but can be widely applied to a rotation angle detection device including at least two sensors that output signals in accordance with a rotation of a motor rotation shaft.

Figure 1:
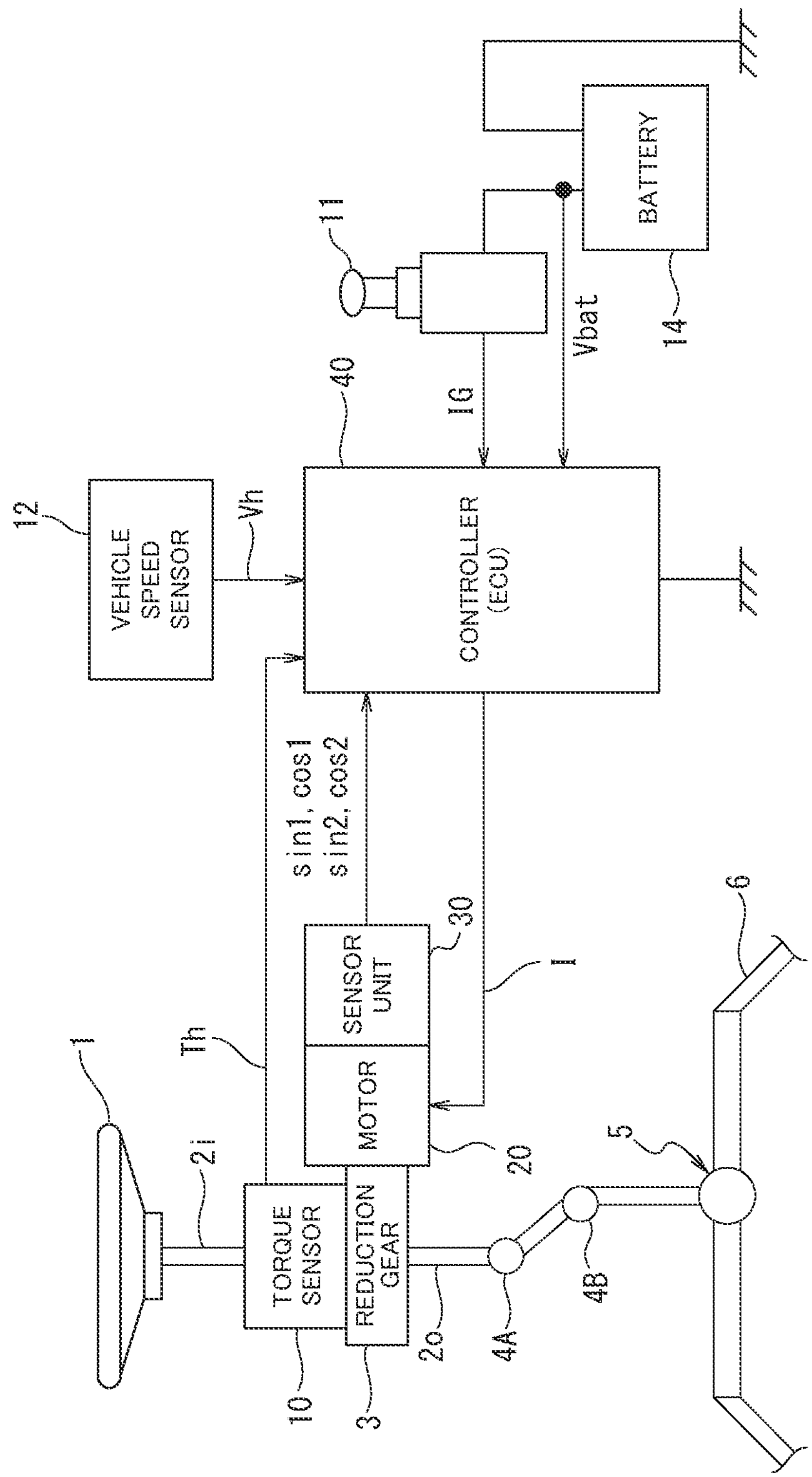
FIG. 1 is a configuration diagram illustrating an outline of an exemplary electric power steering device according to the embodiment.

Refer to FIG. 1. Column shafts (steering shafts) 2*i* and 2*o* of a steering wheel 1 are coupled to a tie rod 6 of steered wheels via a reduction gear 3, universal joints 4A and 4B, and a pinion rack mechanism 5. The input shaft 2*i* and the output shaft 2*o* of the column shaft are connected by a torsion bar (not illustrated) that twists according to a difference of rotation angles of the input shaft 2*i* and the output shaft 2*o*.

A torque sensor 10 electromagnetically measures a torsion angle of the torsion bar as a steering torque Th of the steering wheel 1.

A motor 20 that assists the steering force of the steering wheel 1 is connected to the output shaft 2*o* of the column shaft via the reduction gear 3.

The controller 40 is an Electronic Control Unit (ECU) that drives and controls the motor 20. To the controller 40, battery power Vbat is supplied from a battery 14 that is the power source, and an ignition key signal IG is input from an ignition key 11 that is a power switch.

The controller 40 calculates a steering assistance command value of the assistance command using an assistance map, etc. based on the steering torque Th detected by the torque sensor 10 and vehicle speed Vh detected by a vehicle speed sensor 12, and supplies driving current I to the motor 20 based on the calculated steering assistance command value.

A sensor unit 30 includes two sensors that each output a sensor signal in accordance with a rotation of the motor rotation shaft of the motor 20.

Figure 2:
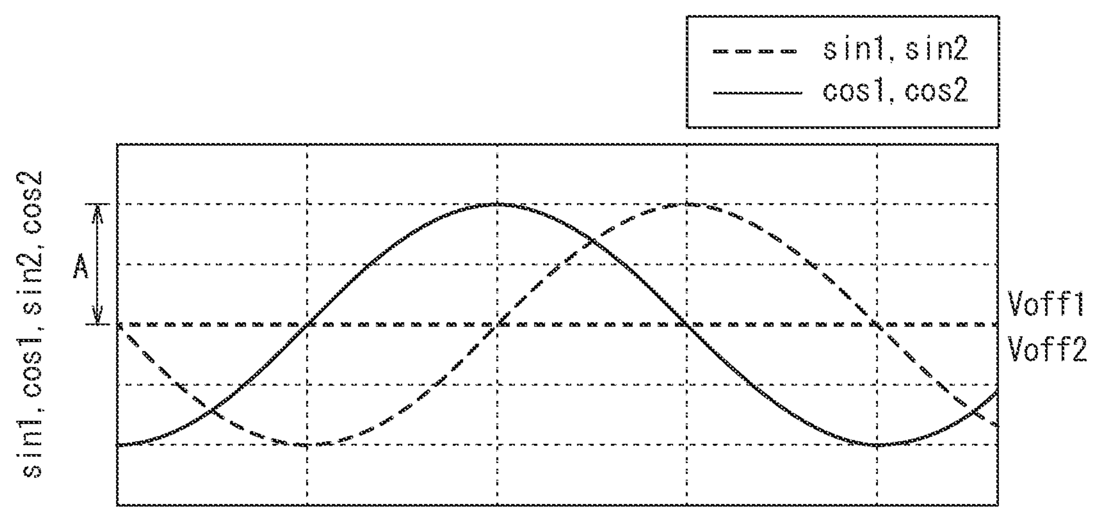
FIG. 2 is a diagram illustrating an example of a first sine-wave signal, a first cosine-wave signal, a second sine-wave signal, and a second cosine-wave signal.

Each of the two sensors in the sensor unit 30 individually detects an angular position θ (θ=0 to 360 deg) of the motor rotation shaft, and one of the sensors outputs a first sine-wave signal sin 1=A×sin θ+Voff1 and a first cosine-wave signal cos 1=A×cos θ+Voff1 each having an amplitude of A, and the other sensor outputs a second sine-wave signal sin 2=A×sin θ+Voff2 and a second cosine-wave signal cos 2=A×cos θ+Voff2 each having an amplitude of A to the controller 40. The voltages Voff1 and Voff2 are offset voltages (in other words, DC components of the first sine-wave signal sin 1, the first cosine-wave signal cos 1, the second sine-wave signal sin 2, and the second cosine-wave signal cos 2). An example of the first sine-wave signal sin 1, the first cosine-wave signal cos 1, the second sine-wave signal sin 2 and the second cosine-wave signal cos 2 are illustrated in FIG. 2.

The controller 40 calculates the rotation angle θm of the motor rotation shaft of the motor 20 based on the first sine-wave signal sin 1, the first cosine-wave signal cos 1, the second sine-wave signal sin 2, and the second cosine-wave signal cos 2.

The controller 40 calculates the rotation angle θo of the output shaft 2*o* of the column shaft based on the rotation angle θm of the motor rotation shaft of the motor 20 and the gear ratio Rg of the reduction gear 3. The controller 40 calculates the rotation angle θi of the input shaft 2*i* of the column shaft, in other words, the steering angle θs of the steering wheel 1, based on the rotation angle θo and the steering torque Th.

In the electric power steering device having the above-mentioned configuration, the steering torque Th that is caused by a driver operating the steering handle and transmitted from the steering wheel 1 is detected by the torque sensor 10, and the motor 20 is driven and controlled by the steering assistance command value calculated based on the steering torque Th and the vehicle speed Vh, and the assistance force (steering assistance force) for the steering wheel operation by the driver is provided to the steering system.

Figure 3:
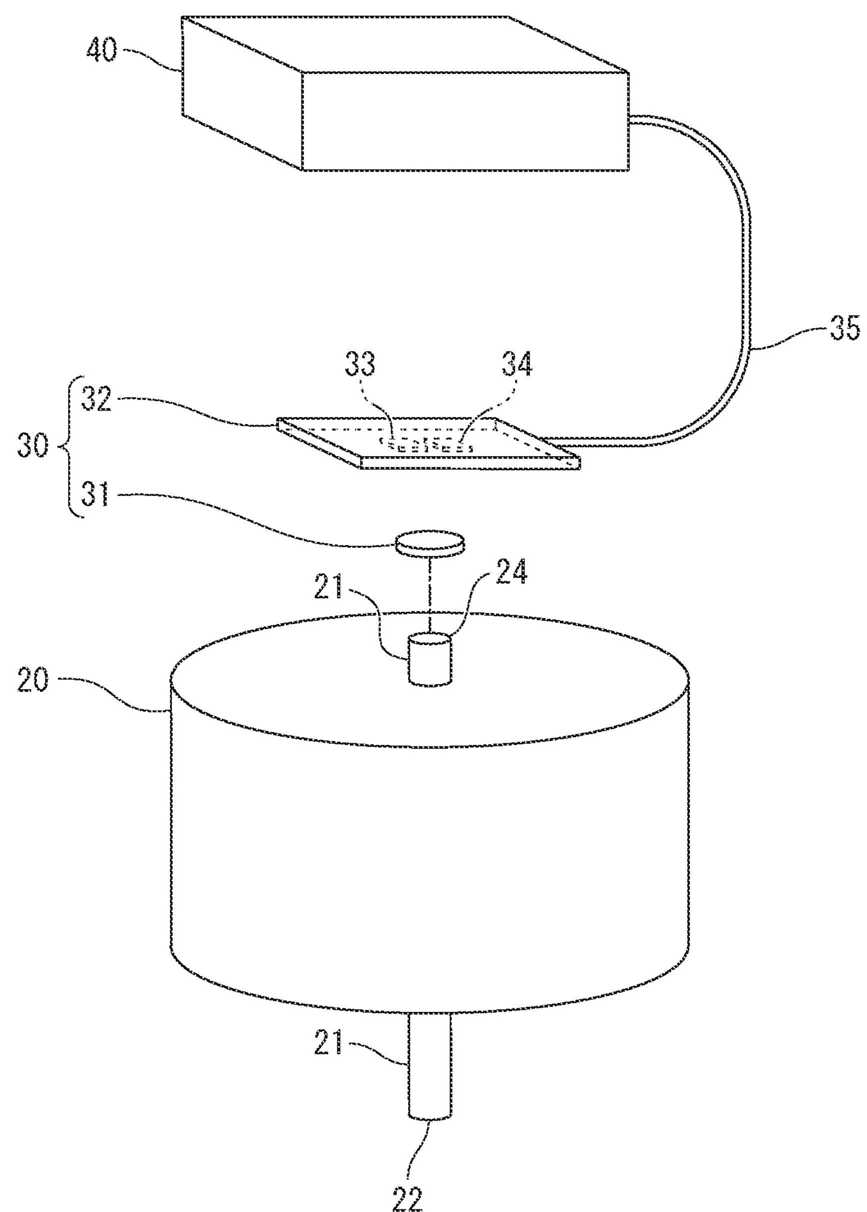
FIG. 3 is an exploded diagram illustrating an outline of an exemplary sensor unit.

FIG. 3 is an exploded diagram illustrating an outline of the exemplary sensor unit 30. The sensor unit 30 includes a magnet 31 and a circuit substrate 32.

The magnet 31 is fixed to an end 24 that is the opposite of the output end 22 of the motor rotation shaft 21 of the motor 20 and has different poles (south pole and north pole) that are arranged along the circumferential direction of the motor rotation shaft 21.

A first sensor 33 and a second sensor 34 that output a first sensor signal and a second sensor signal respectively in accordance with the rotation of the motor rotation shaft 21 of the motor 20 by detecting the magnetic flux generated by the magnet 31 are mounted on the circuit substrate 32.

The first sensor signal that is output from the first sensor 33 includes a first sine-wave signal sin 1 and a first cosine-wave signal cos 1. The second sensor signal that is output from the second sensor 34 includes a second sine-wave signal sin 2 and a second cosine-wave signal cos 2.

The first sensor 33 and the second sensor 34 may be MR sensors (for example, Tunnel Magneto Resistance (TMR) sensors) that detect magnetic flux, for example.

The first sensor 33 and the second sensor 34 are arranged near the magnet 31 that rotates with the motor rotation shaft 21, and respectively generate the first sine-wave signal sin 1 and the first cosine-wave signal cos 1 and the second sine-wave signal sin 2 and the second cosine-wave signal cos 2 in accordance with the rotation of the motor rotation shaft 21 by detecting the magnetic flux generated by the magnet 31.

The sensor unit 30 is formed as a unit separate from the controller 40, and connected to the controller 40 by a harness 35. The controller 40 supplies the first sensor power source Vs1 and a second sensor power source Vs2 that respectively drive the first sensor 33 and the second sensor 34 to the sensor unit 30 via the harness 35. The sensor unit 30 outputs the first sensor signal and the second sensor signal to the controller 40 via the harness 35. The length of the harness 35 may be 10 cm, for example.

The sensor unit 30 and the controller 40 may be formed as a single unit. In this case, the first sensor 33 and the second sensor 34 may be built directly into the controller 40, and the controller 40 may be attached to an end opposite from the output end 22 of the motor 20.

The configuration of the sensor unit 30 is not limited to the configuration illustrated in FIG. 3. The first sensor 33 and the second sensor 34 of the sensor unit 30 may be a sensor of a type other than MR sensor. The first sensor 33 may be any sensor that outputs a signal in accordance with a rotation of the motor rotation shaft 21. The second sensor 34 may be any sensor that outputs a sine-wave signal and a cosine-wave signal in accordance with a rotation of the motor rotation shaft 21.

Figure 4:
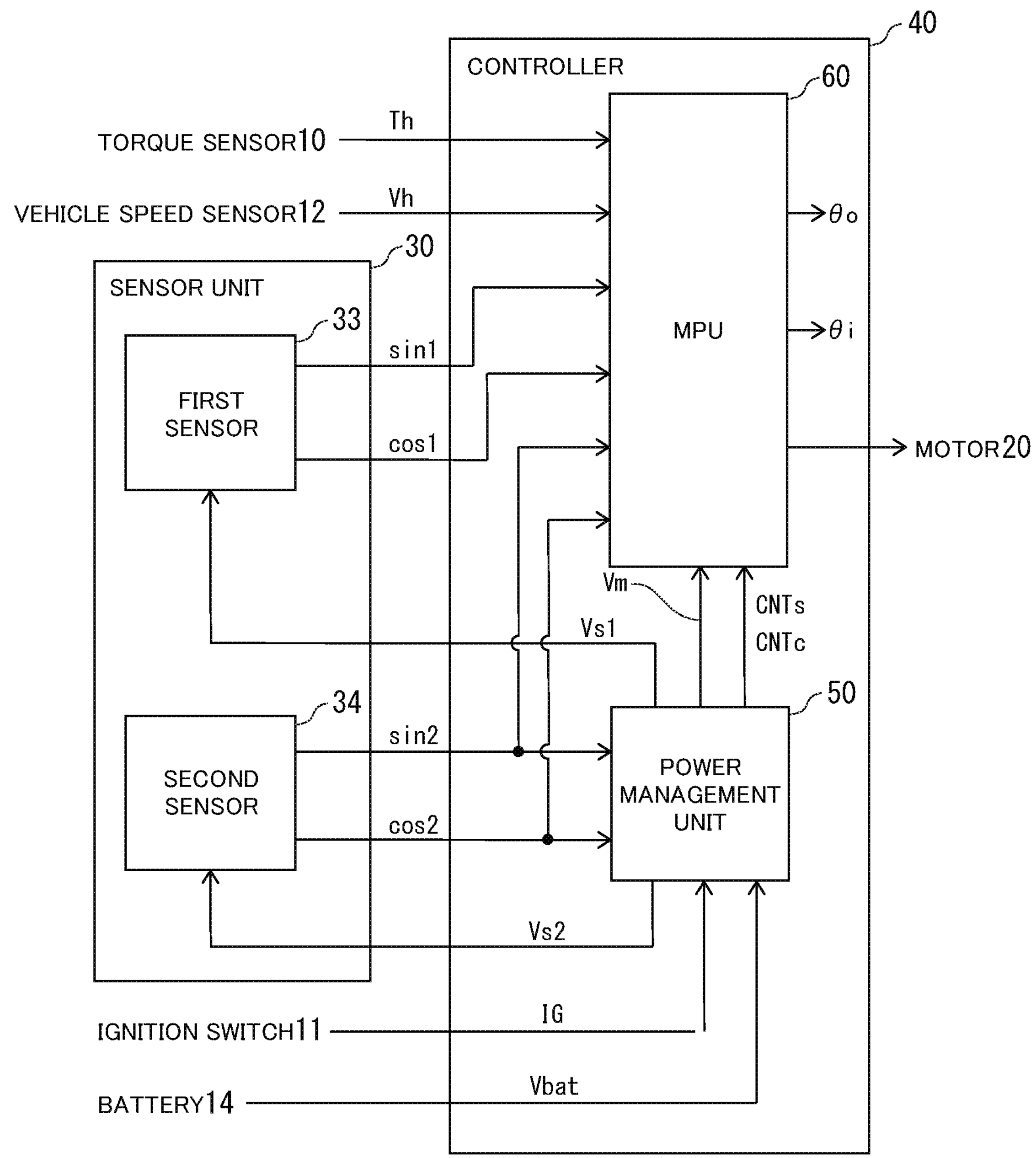
FIG. 4 is a diagram illustrating a configuration example of a controller.

With reference to FIG. 4, a configuration example of the controller 40 is explained. The controller 40 includes a power management unit 50 and a Micro-Processing Unit (MPU) 60.

The power management unit 50 is supplied with battery power Vbat from the battery 14, and manage the power of the sensor unit 30 and the controller 40. The power management unit 50 may be implemented as a single Integrated Circuit (IC) chip. The power management unit 50 may be a power management Integrated Circuit (IC), for example.

The power management unit 50 generates the first sensor power source Vs1 for driving the first sensor 33, the second sensor power source Vs2 for driving the second sensor 34, a power source Vm for driving the MPU60, the controller 40 and other components (hereinafter may be referred to as MPU60, etc.) from the power supplied from the battery 14, based on the ignition key signal IG.

The voltage of the first sensor power source Vs1, the second sensor power source Vs2, and the power source Vm may be a common power voltage Vcc1 (not illustrated), for example. The power voltage Vcc1 may be 5 V, for example.

The power management unit 50 supplies the first sensor power source Vs1, the second sensor power source Vs2, and the power source Vm, to the first sensor 33, the second sensor 34, and the MPU 60, etc., respectively while the ignition key 11 is on.

On the other hand, the power management unit 50 stops providing the first sensor power source Vs1 and the power source Vm to the first sensor 33 and the MPU 60, etc. while the ignition key 11 is off. The power management unit 50 supplies the second sensor power source Vs2 to the second sensor 34 intermittently at a predetermined cycle T. The voltage of the second sensor power source Vs2 that is supplied while the ignition key 11 is off may be lower than the voltage Vcc1 while the ignition key 11 is on.

The power management unit 50 generates rotation number information representing a rotation number by detecting the rotation number of the motor rotation shaft 21 based on the second sine-wave signal sin 2 and the second cosine-wave signal cos 2. The rotation number information includes the sine count value CNTs counting the change of the sign of the second sine-wave signal sin 2, and the cosine count value CNTc counting the change of the sign of the second cosine-wave signal cos 2. The sine count value CNTs and the cosine count value CNTc change according to the combination of the sign of the second sine-wave signal sin 2 and the sign of the second cosine-wave signal cos 2. The details of the power management unit 50 will be described later.

The MPU 60 calculates the steering assistance command value of the assistance command using an assistance map, etc. based on the steering torque Th detected by the torque sensor 10 and the vehicle speed Vh detected by a vehicle speed sensor 12 and controls the driving current I of the motor 20.

The MPU 60 calculates angular position information θ1 representing an angular position of the motor rotation shaft 21 based on the first sine-wave signal sin 1 and the first cosine-wave signal cos 1. The angular position information θ1 represents the angular position within the angular range of one rotation of the motor rotation shaft 21 (θ1=0 to 360 deg).

The MPU 60 calculates rotation angle information θm representing a rotation angle of the motor rotation shaft 21 based on the rotation number information (the sine count value CNTs and the cosine count value CNTc) generated by the power management unit 50 and the angular position information θ1. The rotation angle information θm represents the rotation angle within the angular range of multiple turns that is more than one rotation of the motor rotation shaft 21.

More specifically, since the power source Vm is not supplied to the MPU 60 while the ignition key 11 is off, the MPU 60 stops operation.

When the ignition key 11 is turned on from off, the MPU 60 reads the rotation number information from the power management unit 50 and calculates the rotation angle information θm based on the rotation number information and the angular position information θ1.

While the ignition key 11 is on, the MPU 60 accumulates the change of the angle of the angular position information θ1 after the time at which the ignition key 11 is turned on from off to the rotation angle information θm calculated when the ignition key 11 is turned on from off, and calculates the rotation angle information θm after the ignition key 11 is turned on from off.

The MPU 60 calculates the rotation angle θo of the output shaft 2*o* of the column shaft by multiplying the rotation angle information θm by the gear ratio Rg of the reduction gear 3. Based on the steering torque Th detected by the torque sensor 10, the torsion angle θt of the torsion bar arranged at the column shaft is calculated, and the rotation angle θi of the input shaft 2*i* of the column shaft (steering angle θs of the steering wheel 1) is calculated by adding the torsion angle θt to the rotation angle θo of the output shaft 2*o*.

The controller 40 may control the steering assistance force that is applied to the output shaft 2*o* by the motor 20 based on the rotation angle information of the rotation angle θo of the output shaft 2*o* and the rotation angle θi of the input shaft 2*i*. For example, the controller 40 may determine whether the column shaft is in a state in which the steering wheel is steered to the end or not based on the rotation angle information. When the column shaft is in a state in which the steering wheel is steered to the end, the controller 40 may limit the driving current I of the motor 20 and may correct to reduce the steering assistance force. The controller 40 may use the rotation angle information of the rotation angle θi of the input shaft 2*i* for the determination of whether the input shaft 2*i* is in a neutral position.

Also, for example, the controller 40 may determine whether the driver further turns the steering wheel 1 or the driver returns the steering wheel 1 based on the rotation angle information. For example, the controller 40 may determine whether the driver further turns the steering wheel or the driver returns the steering wheel based on the rotation angle of the column shaft and its changing direction. The controller 40 may determine whether the driver further turns the steering wheel or the driver returns the steering wheel based on the rotation angle of the column shaft and the steering torque Th.

The controller 40 may increase and correct the driving current I to increase the steering assistance force when the driver further turns the steering wheel, and decrease and correct the driving current I to decrease the steering assistance force when the driver returns the steering wheel. More details of the MPU 60 will be described later.

Figure 5:
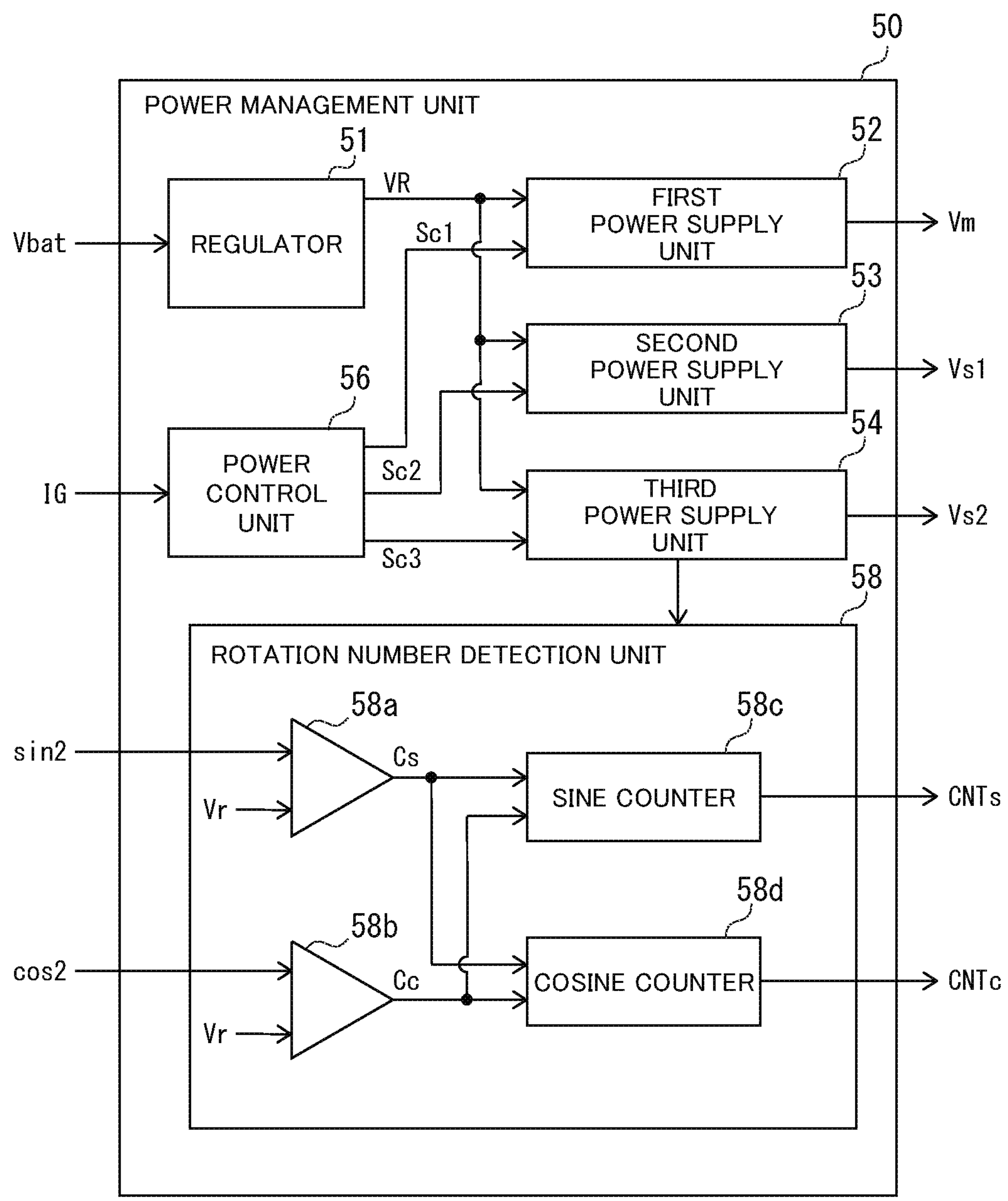
FIG. 5 is a block diagram of an exemplary functional configuration of a power management unit of the first embodiment.

With reference to FIG. 5, a functional configuration example of a power management unit 50 is explained. The power management unit 50 includes a regulator 51, a first power supply unit 52, a second power supply unit 53, a third power supply unit 54, a power control unit 56, and a rotation number detection unit 58.

The regulator 51, the first power supply unit 52, the second power supply unit 53, the third power supply unit 54 and the power control unit 56 are an example of a "power supply unit" described in the claims.

The regulator 51 generates regulator power source VR having a predetermined voltage from the battery power source Vbat. The voltage of the regulator power source VR is 6 V, for example. The first power supply unit 52, the second power supply unit 53, and the third power supply unit 54 generate the power source Vm, the first sensor power source Vs1, and the second sensor power source Vs2, respectively from the regulator power source VR.

The power source Vm and the first sensor power source Vs1 may be made common, and the first power supply unit 52 and the second power supply unit 53 may become a single power supply unit. In other words, the first sensor 33 and the MPU 60, etc. may be supplied with power from one or a plurality of power supply units.

The power control unit 56 outputs control signals Sc1, Sc2, and Sc3 to the first power supply unit 52, the second power supply unit 53 and the third power supply unit 54, respectively, based on the ignition key signal IG and controls the first power supply unit 52, the second power supply unit 53, and the third power supply unit 54.

While the ignition key 11 is on, the power control unit 56 makes the first power supply unit 52, the second power supply unit 53, and the third power supply unit 54 generate the power source Vm, the first sensor power source Vs1, and the second sensor power source Vs2, respectively. The first power supply unit 52 continually supplies power source Vm to the MPU 60, etc. The second power supply unit 53 continually supplies the first sensor power source Vs1 to the first sensor 33. The third power supply unit 54 continually supplies the second sensor power source Vs2 to the second sensor 34 and the rotation number detection unit 58. Therefore, the MPU 60, etc., the first sensor 33, the second sensor 34, and the rotation number detection unit 58 operate continually.

While the ignition key 11 is off, the power control unit 56 stops the first power supply unit 52 and the second power supply unit 53. In other words, the generation of the power source Vm and the first sensor power source Vs1 is stopped. Accordingly, the supply of the first sensor power source Vs1 to the first sensor 33 and the supply of the power source Vm to the MPU 60, etc. are stopped, and the operation of the first sensor 33 and the MPU 60, etc. stop.

On the other hand, the power control unit 56 makes the third power supply unit 54 generate the second sensor power source Vs2 intermittently in a predetermined cycle T. Therefore, the second sensor power source Vs2 is intermittently supplied to the second sensor 34 and the rotation number detection unit 58. The second sensor 34 and the rotation number detection unit 58 operate intermittently in a predetermined cycle T. The power control unit 56 may set the voltage of the second sensor power source Vs2 that is supplied while the ignition key 11 is off to be lower than the while the ignition key 11 is on.

The rotation number detection unit 58 generates rotation number information (in other words, the sine count value CNTs and the cosine count value CNTc) representing a rotation number by detecting the rotation number of the motor rotation shaft 21 based on the second sine-wave signal sin 2 and the second cosine-wave signal cos 2.

The rotation number detection unit 58 includes a first comparator 58*a*, a second comparator 58*b*, sine counter 58*c*, and a cosine counter 58*d*.

The first comparator 58*a* generates a sign signal Cs representing the plus/minus sign of the second sine-wave signal sin 2 by comparing the second sine-wave signal sin 2 and the threshold voltage Vr. The sign signal Cs has a value of "1" when the second sine-wave signal sin 2 is equal to or greater than the threshold voltage Vr and has a value of "0" when the second sine-wave signal sin 2 is less than the threshold voltage Vr.

The second comparator 58*b* generates a sign signal Cc representing the plus/minus sign of the second cosine-wave signal cos 2 by comparing the second cosine-wave signal cos 2 and the threshold voltage Vr. The sign signal Cc has a value of "1" when the second cosine-wave signal cos 2 is equal to or greater than the threshold voltage Vr, and has a value of "0" when the second cosine-wave signal cos 2 is less than the threshold voltage Vr.

Since the second sine-wave signal sin 2 and the second cosine-wave signal cos 2 have a DC offset element Voff2, the threshold voltage Vr may be set to the offset voltage Voff2, for example.

These sign signals Cs and Cc are input to the sine counter 58*c* and the cosine counter 58*d*.

Refer to FIG. 6A and FIG. 6B. The waveform in the broken line in FIG. 6A represents the second sine-wave signal sin 2, and the waveform in the solid line represents the second cosine-wave signal cos 2.

The amplitude A of the second sine-wave signal sin 2 and the second cosine-wave signal cos 2 of the embodiment is one-half of the voltage of the second sensor power source Vs2 (in other words, Vs2/2), and the DC component is offset by one-half of the voltage of the second sensor power source Vs2, and the second sine-wave signal sin 2 and the second cosine-wave signal cos 2 change in the range of 0 V to the voltage of the second sensor power source Vs2 (in other words, Vs2). Therefore, the threshold voltage Vr is set to one-half of the second sensor power source Vs2 (in other words, Vs2/2).

The sign signal Cs of the second sine-wave signal sin 2 output from the first comparator 58*a* has a value of "1" when the angular position of the motor rotation shaft 21 is in the range of 0 deg to 180 deg and has a value of "0" in the range of 180 deg to 360 deg.

The sign signal Cc of the second cosine-wave signal cos 2 output from the second comparator 58*b* has a value of "1" when the angular position of the motor rotation shaft 21 is in the range of 0 deg to 90 deg and 270 deg to 360 deg and has a value of "0" in the range of 90 deg to 270 deg.

Refer to FIG. 5. The sine counter 58*c* and the cosine counter 58*d* count the change of the combination of the signs of the second sine-wave signal sin 2 and the second cosine-wave signal cos 2 based on the sign signal Cs of the second sine-wave signal sin 2 and the sign signal Cc of the second cosine-wave signal cos 2, and calculates the sine count value CNTs and the cosine count value CNTc, respectively.

Refer to FIG. 6C and FIG. 6D. The sine counter 58*c* calculates the sine count value CNTs by counting the number of changes of the sign of the second sine-wave signal sin 2, and the cosine counter 58*d* calculates the cosine count value CNTc by counting the number of changes of the sign of the second cosine-wave signal cos 2. The sine counter 58*c* and the cosine counter 58*d* store the calculated sine count value CNTs and the cosine count value CNTc in a non-volatile memory (not illustrated), for example.

More specifically, the sine counter 58*c* increases the sine count value CNTs by 1 when the value of the sign signal Cs of the second sine-wave signal sin 2 changes from "0" to "1" while the sign signal Cc of the second cosine-wave signal cos 2 has a value of "1", and decreases the sine count value CNTs by 1 when the value of the sign signal Cs of the second sine-wave signal sin 2 changes from "1" to "0".

The sine counter 58*c* increases the sine count value CNTs by 1 when the value of the sign signal Cs of the second sine-wave signal sin 2 changes from "1" to "0" while the sign signal Cc of the second cosine-wave signal cos 2 has a value of 0, and decreases the sine count value CNTs by 1 when the value of the sign signal Cs of the second sine-wave signal sin 2 changes from "0" to "1".

The cosine counter 58*d* increases the cosine count value CNTc by 1 when the value of the sign signal Cc of the second cosine-wave signal cos 2 changes from "0" to "1" while the sign signal Cs of the second sine-wave signal sin 2 has a value of "0", and decreases the cosine count value CNTc by 1 when the value of the sign signal Cc of the second cosine-wave signal cos 2 changes from "1" to "0".

The cosine counter 58*d* increases the cosine count value CNTc by 1 when the value of the sign signal Cc of the second cosine-wave signal cos 2 changes from "1" to "0" while the sign signal Cs of the second sine-wave signal sin 2 has a value of "1", and decreases the cosine count value CNTc by 1 when the value of the sign signal Cc of the second cosine-wave signal cos 2 changes from "0" to "1".

As a result, when the motor rotation shaft 21 makes one rotation, the sine count value CNTs and the cosine count value CNTc increase or decrease by 2, depending on the rotation direction. Therefore, when the motor rotation shaft 21 makes one rotation, the sum of the sine count value CNTs and the cosine count value CNTc (hereinafter may be expressed as "total count value CNT") increases or decreases by 4, depending on the rotation direction, as illustrated in FIG. 6E. Accordingly, the combination of the sine count value CNTs and the cosine count value CNTc and the total count value CNT represent the rotation number in quarters of a rotation. The combination of sine count value CNTs and the cosine count value CNTc and the total count value CNT represent which of the 4 quadrants made by dividing into four the rotation range of the motor rotation shaft 21 the angular position of the motor rotation shaft 21 belongs to.

The sine count value CNTs and the cosine count value CNTc of the embodiment are merely an example, and the rotation number information of the present invention is not limited to the sine count value CNTs and the cosine count value CNTc. The rotation number information may be any rotation number information representing the rotation number in units of 1/n rotations where n is a natural number of 2 and more.

Figure 7:
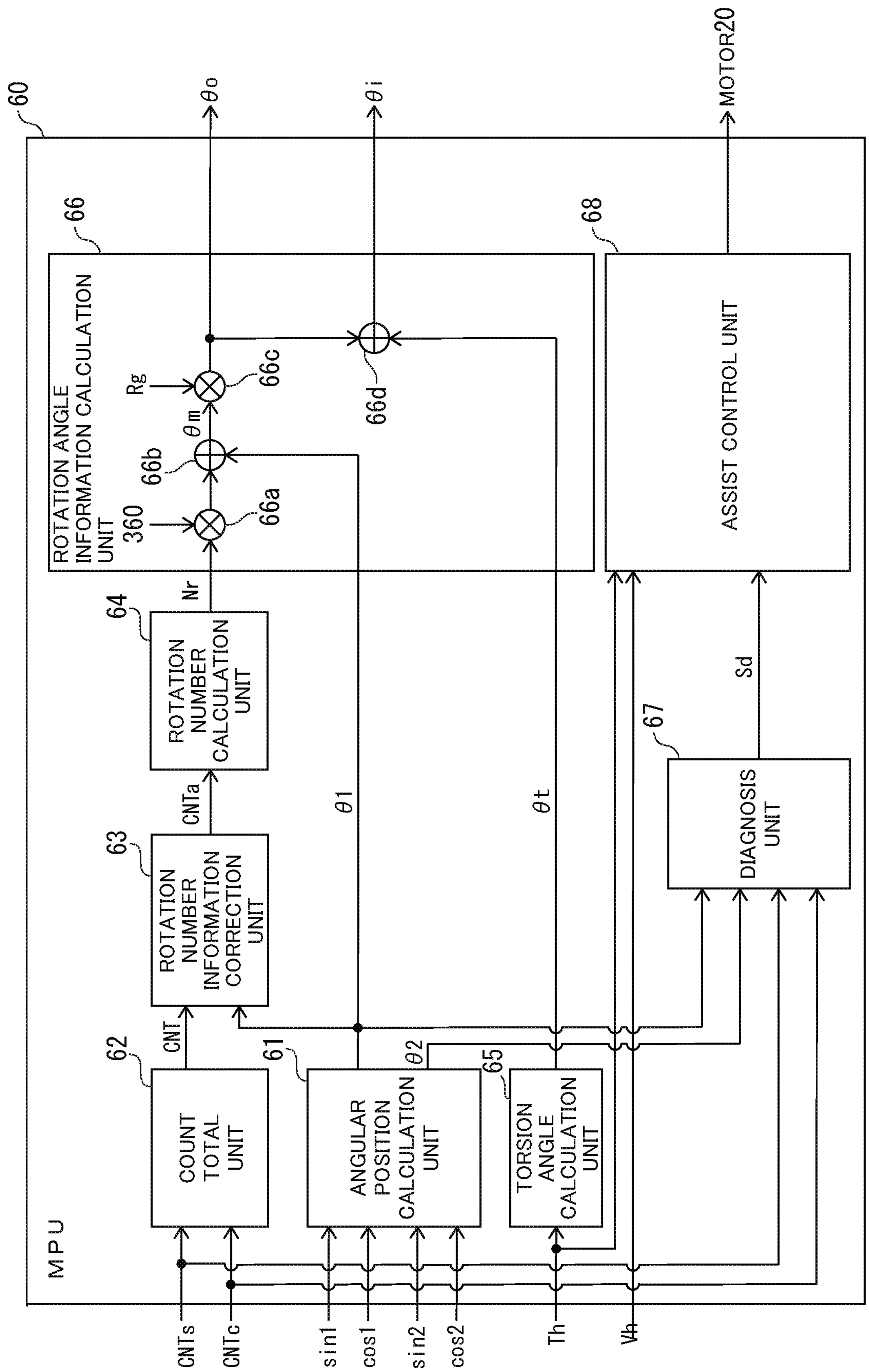
FIG. 7 is a block diagram of an exemplary functional configuration of a microprocessor.

With reference to FIG. 7, a functional configuration example of the MPU 60 is explained. The MPU 60 includes an angular position calculation unit 61, a count total unit 62, a rotation number information correction unit 63, a rotation number calculation unit 64, a torsion angle calculation unit 65, a rotation angle information calculation unit 66, a diagnosis unit 67, and an assist control unit 68.

The functions of the angular position calculation unit 61, the count total unit 62, the rotation number information correction unit 63, the rotation number calculation unit 64, the torsion angle calculation unit 65, the rotation angle information calculation unit 66, the diagnosis unit 67, and the assist control unit 68 are realized by MPU 60 executing a program stored in a storage device (a non-volatile memory, etc. for example) included by the MPU 60 or the controller 40.

Figure 8A:
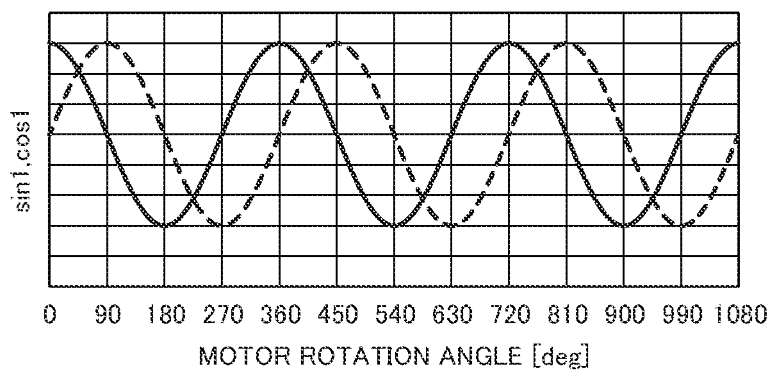
FIG. 8A is a diagram illustrating a first sine-wave signal SIN 1 and a first cosine-wave signal COS 1.
Figure 8B:
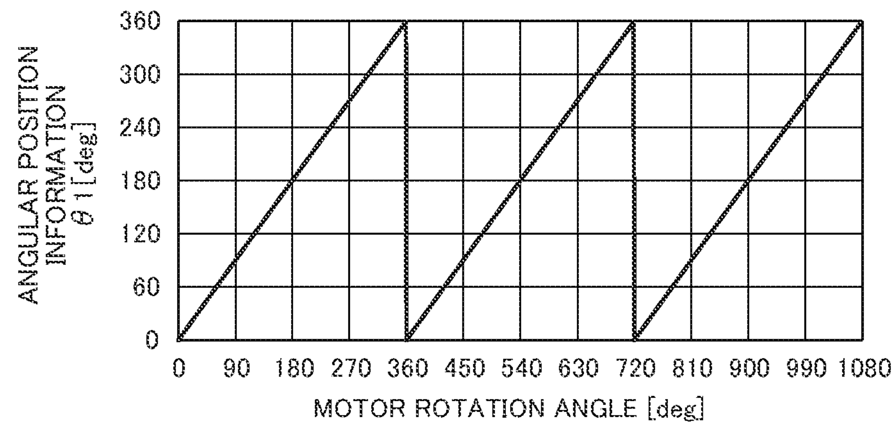
FIG. 8B is a diagram illustrating exemplary angular position information θ1.

The rotation angle information calculation unit 66 is an example of the "rotation angle calculation unit" and the "steering angle calculation unit" described in the claims. The assist control unit 68 is an example of the "motor control unit" described in the claims.

the angular position calculation unit 61 takes the first sine-wave signal sin 1 and the first cosine-wave signal cos 1 as inputs, and compensates the error included in these signals (offset, amplitude difference, phase difference, etc.). FIG. 8A illustrates an example of the first sine-wave signal sin 1 and the first cosine-wave signal cos 1. The angular position calculation unit 61 calculates the angular position information θ1 representing an angular position of the motor rotation shaft 21 within the range of 1 rotation (θ1=0 to 360 deg) based on the first sine-wave signal sin 1 and the first cosine-wave signal cos 1 after the error is compensated. An example of the angular position information θ1 is illustrated in FIG. 8B.

For example, the angular position calculation unit 61 may calculate the angular position information θ1 based on the sum of the first sine-wave signal sin 1 and the first cosine-wave signal cos 1 (cos 1+sin 1) and the difference (cos 1−sin 1).

Similarly, the angular position calculation unit 61 takes the second sine-wave signal sin 2 and the second cosine-wave signal cos 2 as inputs, compensates the error included therein, and calculates the angular position information θ2 representing an angular position of the motor rotation shaft 21 within the range of 1 rotation (θ2=0 to 360 deg).

Refer to FIG. 7. The count total unit 62 reads the sine count value CNTs and the cosine count value CNTc respectively from the sine counter 58*c* and the cosine counter 58*d* of the power management unit 50 when the supply of the power source Vm to the MPU 60 starts (in other words, when the ignition key 11 is turned on from off). The count total unit 62 adds the sine count value CNTs and the cosine count value CNTc and calculates the total count value CNT as illustrated in FIG. 6E.

Here, an error may occur to the sine count value CNTs and the cosine count value CNTc due to an error included in the second sine-wave signal sin 2 and the second cosine-wave signal cos 2 and an error in the threshold voltage of the comparator Vr. As a result, the total count value CNT may include an error.

Refer to FIG. 7. The rotation number information correction unit 63 compensates for the error generated in the total count value CNT by correcting the total count value CNT based on the angular position information θ1. The rotation number information correction unit 63 outputs the corrected total count value CNTa in which the error is compensated. The details of the rotation number information correction unit 63 will be described later.

Figure 8C:
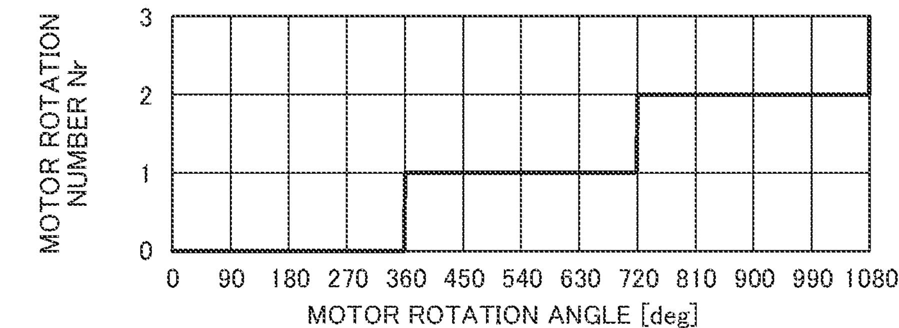
FIG. 8C is a diagram of a motor rotation number Nr.

The rotation number calculation unit 64 calculates the rotation number Nr of the motor rotation shaft 21 as the quotient obtained by dividing the corrected total count value CNTa by a natural number n. The natural number n is the number of increases/decreases of the total count value CNT per one rotation of the motor rotation shaft 21, and the natural number n is 4 in this embodiment. An example of the rotation number Nr is illustrated in FIG. 8C.

The torsion angle calculation unit 65 calculates the torsion angle θt of the torsion bar arranged on the column shaft based on the steering torque Th detected by the torque sensor 10.

Refer to FIG. 7. The rotation angle information calculation unit 66 calculates the rotation angle information θm in the range of multiple rotations of equal to or more than one rotation of the motor rotation shaft 21 based on the rotation number Nr calculated by the rotation number calculation unit 64 and the angular position information θ1 calculated by the angular position calculation unit 61 when the supply of the power source Vm to the MPU 60 is started (in other words, the ignition key 11 is turned on from off).

Figure 8D:
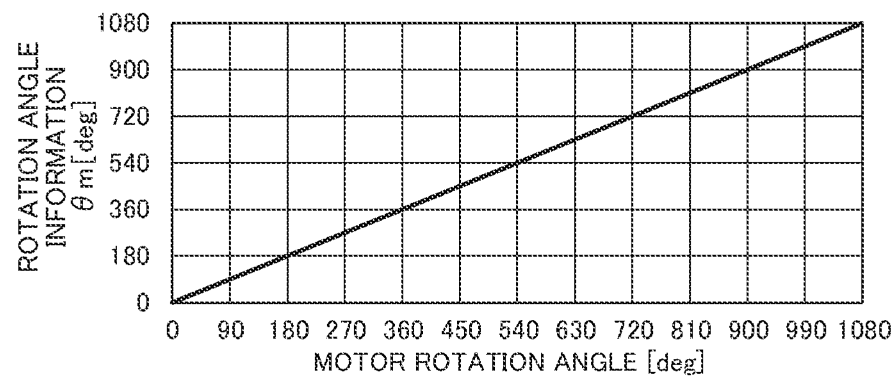
FIG. 8D is a diagram of rotation angle information θm.

The rotation angle information calculation unit 66 calculates the rotation angle information θm=(360 deg×rotation number Nr)+angular position information θ1 by means of a multiplier 66*a* and an adder 66*b*. An example of the rotation angle information θm is illustrated in FIG. 8D.

Afterwards, while the ignition key 11 is on, the rotation angle information calculation unit 66 accumulates the change of the angle of the angular position information θ1 after the time at which the ignition key 11 is turned on from off to the rotation angle information θm calculated when the ignition key 11 is turned on from off, and calculates the rotation angle information θm after the ignition key 11 is turned on from off.

Refer to FIG. 7. The multiplier 66*c* calculates the rotation angle θo of the output shaft 2*o* of the column shaft by multiplying the rotation angle information θm by the gear ratio Rg of the reduction gear 3. The adder 66*d* calculates the rotation angle θi (the steering angle θs of the steering wheel 1) of the input shaft 2*i* of the column shaft by adding the torsion angle θt of the torsion bar to the rotation angle θo. The rotation angle information calculation unit 66 outputs the rotation angle information including the rotation angle θo and the rotation angle θi.

The rotation angle information including the rotation angle θo of the output shaft 2*o* and the rotation angle θi of the input shaft 2*i* can be used for the determination by the controller 40 whether the column shaft is steered to an end or not and the determination whether the driver further turns the steering wheel 1 or returns the steering wheel. The controller 40 may control the steering assistance force that is applied to the output shaft 2*o* by the motor 20 based on these determination results. The rotation angle information of the rotation angle θi of the input shaft 2*i* may be used for the determination of whether the input shaft 2*i* is in a neutral position.

The diagnosis unit 67 determines the abnormality that occurred in the first sensor 33 or the second sensor 34 by comparing the angular position information θ1 calculated based on the first sine-wave signal sin 1 and the first cosine-wave signal cos 1 and the angular position information θ2 calculated based on the second sine-wave signal sin 2 and the second cosine-wave signal cos 2. For example, when the difference between the angular position information θ1 and the angular position information θ2 is equal to or greater than a threshold value, the diagnosis unit 67 determines that an abnormality has occurred in the first sensor 33 or the second sensor 34.

The diagnosis unit 67 determines an abnormality that occurred in the second sensor 34 or the rotation number detection unit 58 based on the difference between the sine count value CNTs and the cosine count value CNTc. For example, the diagnosis unit 67 determines an abnormality has occurred in the second sensor 34 or the rotation number detection unit 58 when the difference between the sine count value CNTs and the cosine count value CNTc is equal to or greater than 2.

The diagnosis unit 67 outputs a diagnosis signal Sd representing the determination result to the assist control unit 68.

The assist control unit 68 controls the driving current I of the motor 20 based on the steering torque Th detected by the torque sensor 10 and the vehicle speed Vh detected by the vehicle speed sensor 12.

Figure 9:
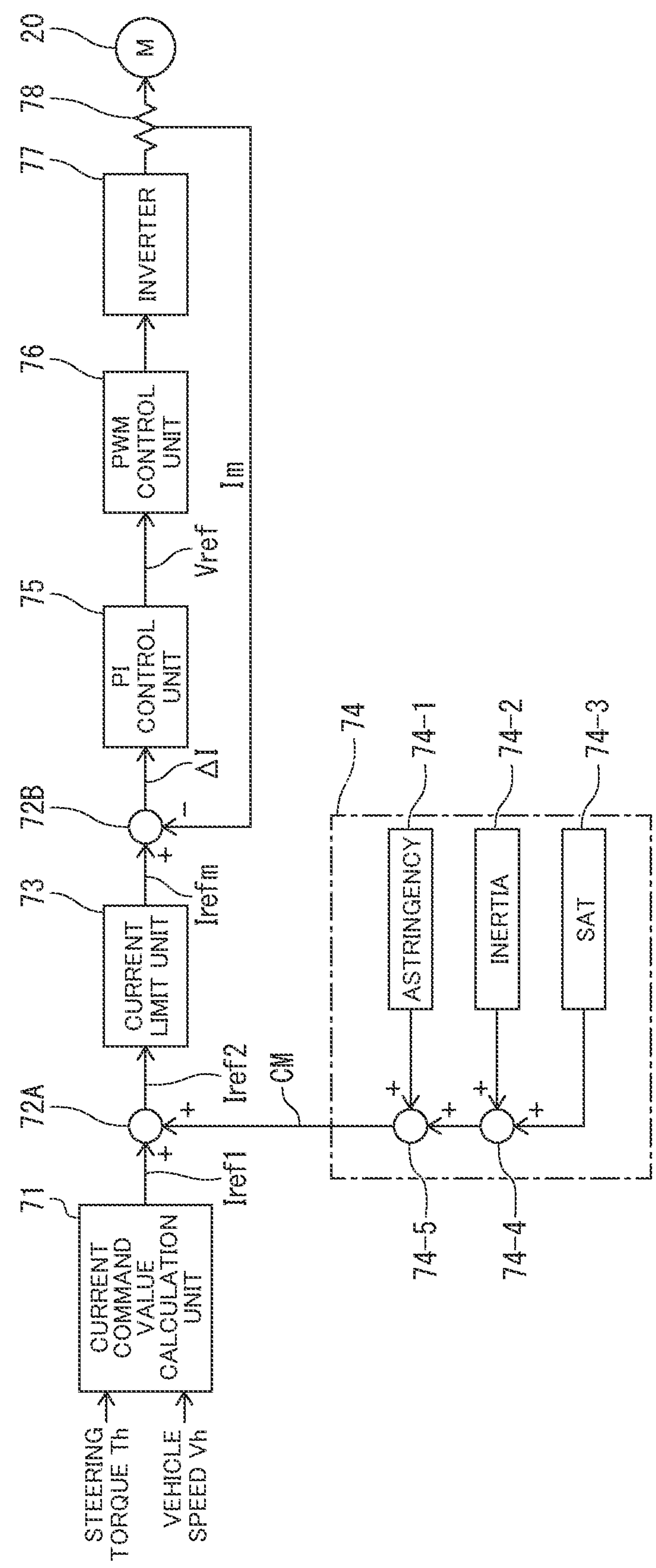
FIG. 9 is a block diagram of an exemplary functional configuration of an assist control unit.

FIG. 9 illustrates an exemplary functional configuration of the assist control unit 68. The steering torque Th detected by the torque sensor 10 and the vehicle speed Vh detected by the vehicle speed sensor 12 are input to a current command value calculation unit 71 that calculates the current command value Iref1. The current command value calculation unit 71 calculates the current command value Iref1 that is the target value of the current to be supplied to the motor 20 based on the input steering torque Th and the vehicle speed Vh using an assistance map, etc.

The current command value Iref1 is input to a current limit unit 73 via an addition unit 72A, and the current command value Irefm whose maximum current is limited is input to the subtraction unit 72B, the deviation ΔI (=Irefm−Im) from the motor current value Im being fed back is calculated, and the deviation ΔI is input to the PI (proportional-integral) control unit 75 for improving the characteristic of the steering operation. The voltage control command value Vref whose characteristic is improved by the PI control unit 75 is input to the PWM control unit 76, and the motor 20 is PWM driven via an inverter 77 as the driver. The current value Im of the motor 20 is detected by the motor current detector 78 and fed back to the subtraction unit 72B.

A compensation signal CM from a compensation signal generation unit 74 is added to the addition unit 72A, and the characteristics of the steering system are compensated by adding the compensation signal CM, thereby improving astringency and inertial characteristics, etc. The compensation signal generation unit 74 adds the self-aligning torque (SAT) 74-3 and the inertia 74-2 at the addition unit 74-4, and further adds the astringency 74-1 at the addition unit 74-5, and the result of the addition by the addition unit 74-5 is the compensation signal CM.

Refer to FIG. 7. The assist control unit 68 performs a predetermined abnormality handling processing such as stopping driving the motor 20 and outputting alarm when an occurrence of abnormality is detected based on the diagnosis signal Sd output by the diagnosis unit 67.

The rotation number information correction unit 63 is described. As described above, an error may occur to the total count value CNTs output from the rotation number calculation unit 64 due to the error included in the second sine-wave signal sin 2 and the second cosine-wave signal cos 2 and the error in the threshold voltage of the comparator Vr.

Hereinafter, the error that occurs to the total count value CNT by exemplifying a case that the threshold voltage of the comparator Vr contains an error.

Figure 10A:
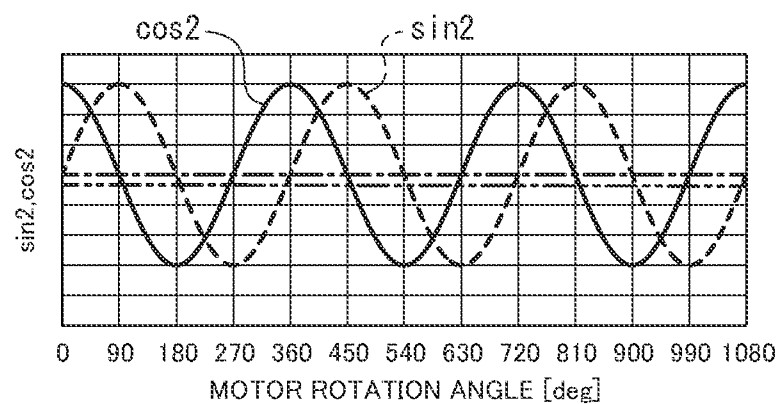
FIG. 10A is a diagram illustrating a second sine-wave signal SIN 2 and a second cosine-wave signal COS 2.

FIG. 10A illustrates an example of the second sine-wave signal sin 2 and the second cosine-wave signal cos 2, and the threshold voltage Vr of the first comparator 58*a* and the second comparator 58*b*. The broken line represents the second sine-wave signal sin 2, the solid line represents the second cosine-wave signal cos 2, the two-dot chain line represents the threshold voltage Vr that is compared with the second sine-wave signal sin 2 at the first comparator 58*a*, and the dashed line represents the threshold voltage Vr that is compared with the second cosine-wave signal cos 2 at the second comparator 58*b*.

In this example, the threshold voltage Vr (two-dot chain line) that is compared with the second sine-wave signal sin 2 is lower than the design value (ideal value).

Figure 10B:
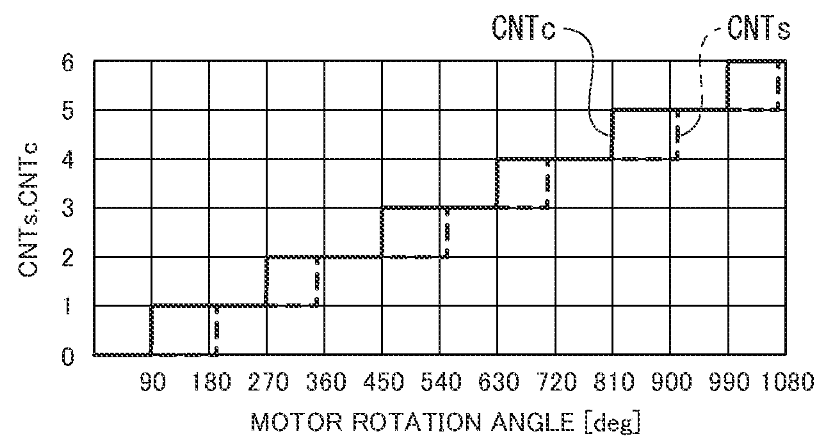
FIG. 10B is a diagram illustrating an example of a sine count value CNTs and a cosine count value CNTc when there is an error in the threshold voltage Vr of a comparator.

As a result, the sine count value CNTs and the cosine count value CNTc will be as illustrated in FIG. 10B. The broken line represents the sine count value CNTs, and the solid line represents the cosine count value CNTc.

As illustrated, there is a gap in the rise (fall) timing of the sine count value CNTs that should occur when the motor rotation angle is 180, 360, 540, 720, 900, 1080 . . . deg.

Figure 10C:
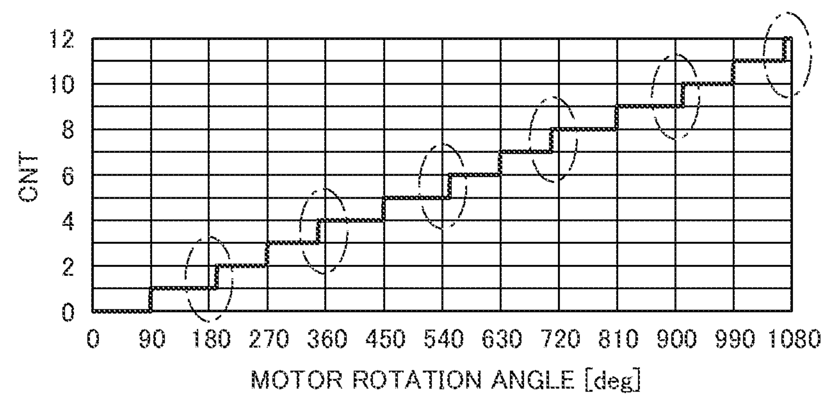
FIG. 10C is a diagram of an example of a total count value CNT.

As a result, there is a gap in the rise (fall) timing of the total count value CNT, as illustrated in FIG. 10C. As illustrated with the enclosing dashed line, there is a gap in the rise (fall) timing of the total count value CNT that should occur when the motor rotation angle is 180, 360, 540, 720, 900, 1080 . . . deg.

As described above, errors occur to the total count value CNT as the timing in the rise (fall) timing of the total count value CNT due to the errors included in the second sine-wave signal sin 2 and the second cosine-wave signal cos 2 and the error in the threshold voltage of the comparator Vr.

Figure 11A:
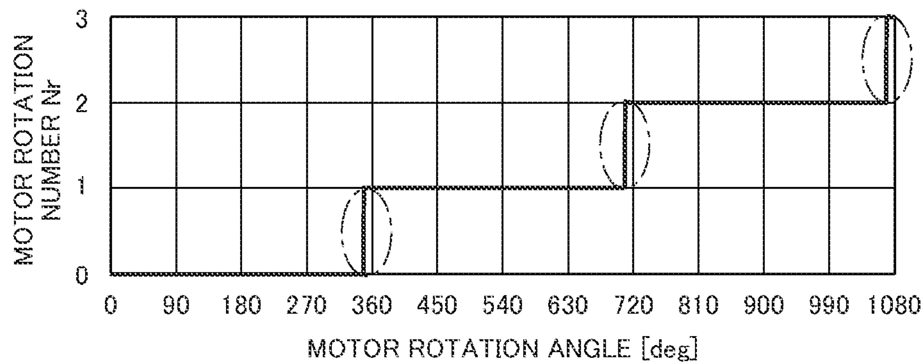
FIG. 11A is an explanatory diagram of an error that may occur in the motor rotation number Nr when a rotation number information correction unit does not exist.

When the rise (fall) timing of the total count value CNT shifts, as illustrated in FIG. 11A, the rise (fall) timing of the motor rotation number Nr calculated by the rotation number calculation unit 64 shifts from the original timing.

Figure 11B:
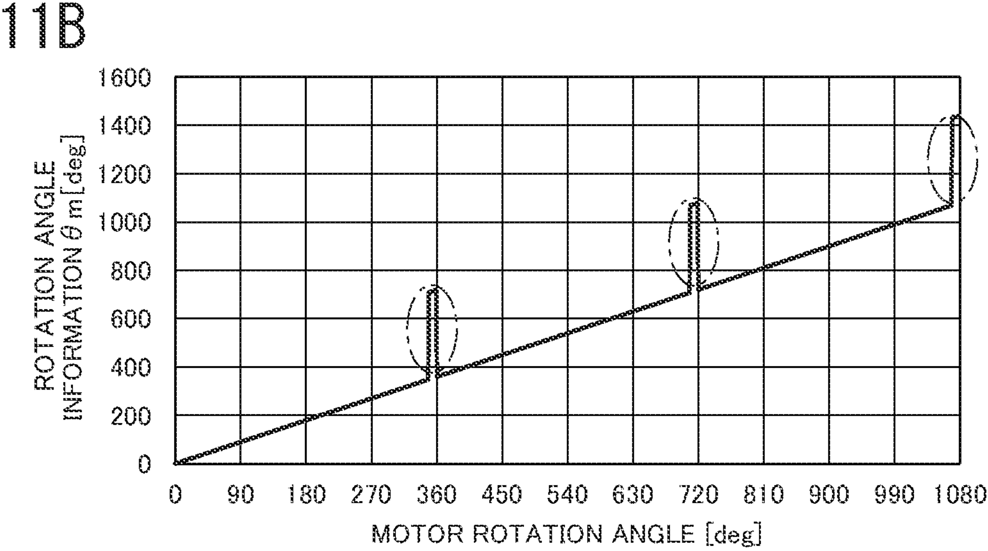
FIG. 11B is an explanatory diagram of an error that may occur in the rotation angle information θm.

When the rotation angle information θm is calculated using this motor rotation number Nr, as illustrated in FIG. 11B, the rotation number will be wrong in the places enclosed by the dashed line, thereby generating an error in the rotation angle information θm.

The rotation number information correction unit 63 corrects the gap in the rise (fall) timing of the total count value CNT illustrated in FIG. 10C.

Figure 12:
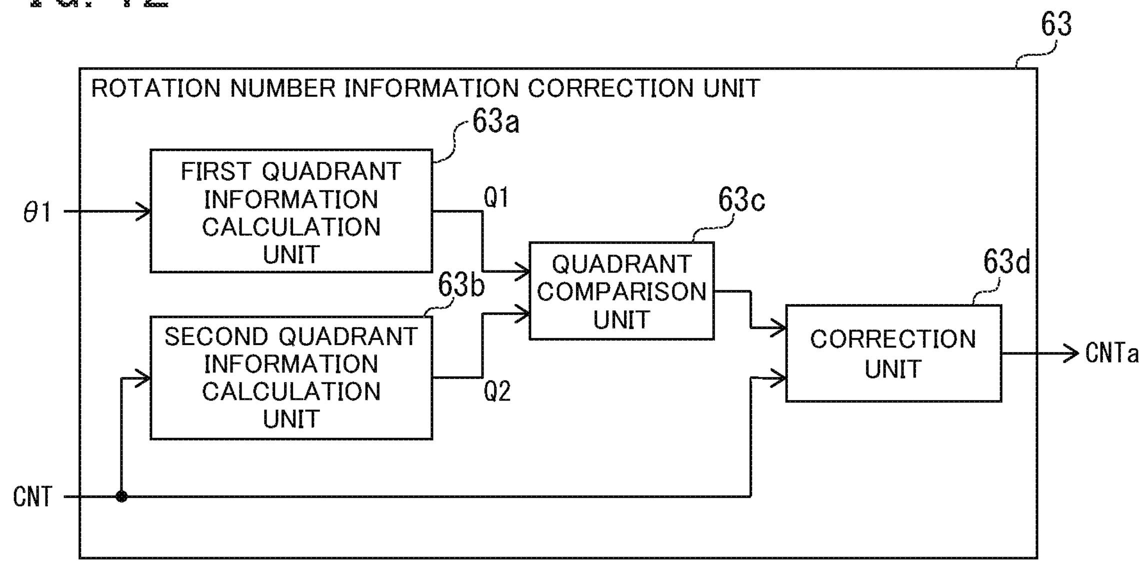
FIG. 12 is a block diagram of an exemplary functional configuration of the rotation number information correction unit.

Refer to FIG. 12. The rotation number information correction 63 includes a first quadrant information calculation unit 63*a*, a second quadrant information calculation unit 63*b*, a quadrant comparison unit 63*c*, and a correction unit 63*d*.

The first quadrant information calculation unit 63*a* calculates first quadrant information Q1 representing which of the quadrants formed by dividing the rotation range of the motor rotation shaft 21 by the above-described natural number n the angular position of the motor rotation shaft 21 belongs to based on the angular position information θ1.

The second quadrant information calculation unit 63*b* calculates second quadrant information Q2 representing which of the quadrants formed by dividing the rotation range of the motor rotation shaft by the above-described natural number n the angular position of the motor rotation shaft 21 belongs to based on the total count value CNT that is the rotation number information.

As described above, the natural number n is the number of increases/decreases of the total count value CNT per one rotation of the motor rotation shaft 21, and in the embodiment, the natural number n is "4". The first quadrant information Q1 and the second quadrant information Q2 represent which of the first quadrant, the second quadrant, the third quadrant, and the fourth quadrant the angular position of the motor rotation shaft 21 belongs to.

The first quadrant information calculation unit 63*a* may calculate the first quadrant information Q1 by performing a threshold determination of which of the first quadrant to the nth quadrant the angular position information θ1 belongs to.

The second quadrant information calculation unit 63*b* may calculate the second quadrant information Q2 as the remainder (modulo: CNT mod n) when the total count value CNT is divided by the natural number n.

Figure 13A:
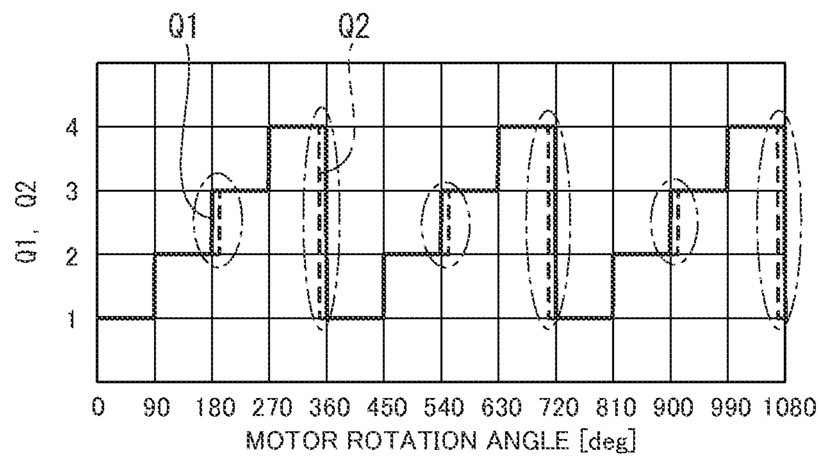
FIG. 13A is a diagram illustrating an example of a first quadrant signal Q1 and a second quadrant signal Q2.

FIG. 13A illustrates an example of the first quadrant information Q1 and the second quadrant information Q2. The solid line illustrates the first quadrant information Q1 and the broken line illustrates the second quadrant information Q2. Due to the gap of the rise (fall) timing of the total count value CNT illustrated in FIG. 10C, a difference is generated between the first quadrant information Q1 and the second quadrant information Q2 in the places enclosed by the dashed line.

Refer to FIG. 12. The quadrant comparison unit 63*c* outputs a quadrant difference representing a comparison result of comparing the first quadrant information Q1 and the second quadrant information Q2.

For example, the quadrant comparison unit 63*c* may calculate the difference by subtracting the number indicating the quadrant of the second quadrant information Q2 from the number indicating the quadrant of the first quadrant information Q1 as the quadrant difference in accordance with the following equation (1).

$$\text{Quadrant difference}=Q2-Q1 \quad (1)$$

However, when the second quadrant information Q2 represents the first quadrant and the first quadrant information Q1 represents the fourth quadrant, the quadrant difference is calculated by adding 4 (i.e., the natural number n) to the subtraction result, in accordance with the following equation (2).

$$\text{Quadrant difference}=Q2-Q1+4\text{, where } Q1=\text{the fourth quadrant, } Q2=\text{the first quadrant} \quad (2)$$

When the second quadrant information Q2 represents the fourth quadrant and the first quadrant information Q1 represents the first quadrant, the quadrant difference is calculated by subtracting 4 (i.e., the natural number n) from the subtraction result, in accordance with the following equation (3).

$$\text{Quadrant difference}=Q2-Q1-4\text{, where } Q1=\text{the first quadrant, } Q2=\text{the fourth quadrant} \quad (3)$$

Figure 13B:
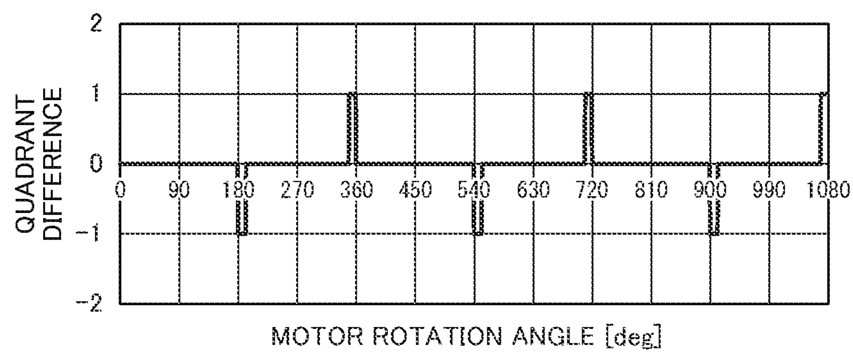
FIG. 13B is a diagram illustrating a difference of the first quadrant signal Q1 and the second quadrant signal Q2.

FIG. 13B represents an example of the quadrant difference. In accordance with the first quadrant information Q1 and the second quadrant information Q2 in FIG. 13A, the quadrant difference takes one of the values 1, 0, and −1.

Refer to FIG. 12. The correction unit 63*d* calculates the corrected total count value CNTa by correcting the total count value CNT in accordance with the quadrant difference output by the quadrant comparison unit 63*c*.

For example, the correction unit 63*d* calculates the corrected total count value CNTa by subtracting the quadrant difference from the total count value CNT.

Figure 13C:
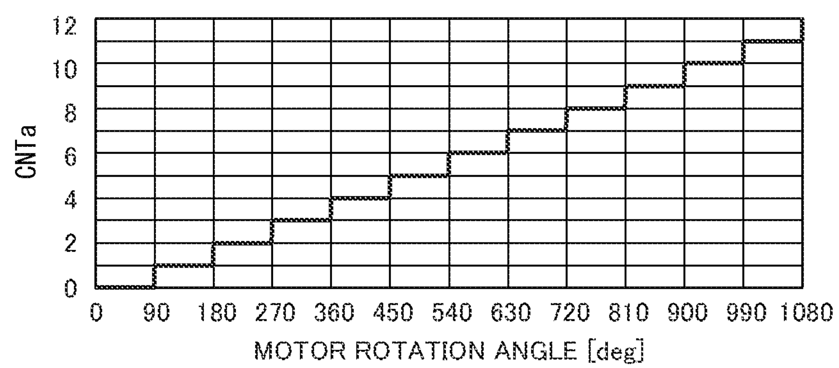
FIG. 13C is a diagram illustrating an example of a corrected total count value CNTa.

FIG. 13C illustrates the corrected total count value CNTa calculated by subtracting the quadrant difference of FIG. 13B from the total count value CNT of FIG. 10C.

Comparing FIG. 10C and FIG. 13C, the gap in the rise (fall) timing when the motor rotation angle is 180, 360, 540, 720, 900, 1080 . . . deg is corrected.

Figure 13D:
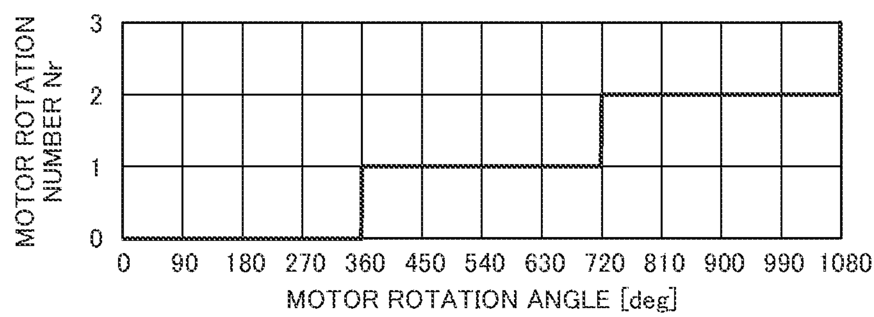
FIG. 13D is a diagram illustrating the motor rotation number Nr calculated from the corrected total count value CNTa.

FIG. 13D is obtained by calculating the motor rotation number Nr based on the corrected total count value CNTa. The motor rotation number Nr in FIG. 13D is similar to the motor rotation number Nr of FIG. 8C, indicating that the error is corrected.

Operation

The operation of the motor control device of the embodiment is described.

(1) The Period when the Ignition Key is Off

The power control unit 56 of the power management unit 50 stops the first power supply unit 52 and the second power supply unit 53, and only the third power supply unit 54 operates. At this time, the power control unit 56 makes the third power supply unit 54 generate the second sensor power source Vs2 intermittently in a predetermined cycle T.

The second sensor power source Vs2 is intermittently supplied to the second sensor 34 and the rotation number detection unit 58. The second sensor 34 and the rotation number detection unit 58 operate intermittently in a predetermined cycle T.

In the period when the rotation number detection unit 58 operates, the sine counter 58*c* increments or decrements the sine count value CNTs in accordance with the output of the first comparator 58*a*. The cosine counter 58*d* increments or decrements the cosine count value CNTc in accordance with the output of the second comparator 58*b*.

As described above, in the period when the ignition key 11 is off, only the power management unit 50 and the second sensor 34 continue operation, and other MPU 60, etc. and the first sensor 33 stop operation.

(2) The Point when the Ignition Key is Turned on from Off

The power control unit 56 starts operation of the first power supply unit 52 and the second power supply unit 53. The power control unit 56 makes the first power supply unit 52, the second power supply unit 53, and the third power supply unit 54 continually generate the power source Vm, the first sensor power source Vs1, and the second sensor power source Vs2. The power source Vm, the first sensor power source Vs1, the second sensor power source Vs2 are started to be continually supplied to the MPU 60, etc., the first sensor 33, the second sensor 34, and the rotation number detection unit 58. As a result, in the period when the ignition key 11 is on, the MPU 60, etc., the first sensor 33, the second sensor 34, and the rotation number detection unit 58 operate continually.

The count total unit 62 of the MPU 60 reads the sine count value CNTs and the cosine count value CNTc respectively from the sine counter 58*c* and the cosine counter 58*d* and calculates the total count value CNT when the ignition key 11 is turned on from off.

The rotation number information correction unit 63 outputs the corrected total count value CNTa by correcting the total count value CNT, and the rotation number calculation unit 64 calculates the rotation number Nr of the motor rotation shaft 21 from the corrected total count value CNTa.

The angular position calculation unit 61 calculates the angular position information θ1 and based on the rotation number Nr and angular position information θ1, the rotation angle information calculation unit 66 calculates the rotation angle information θm of the motor rotation shaft 21.

(3) The Period when the Ignition Key is Off

The power control unit 56 operates the first power supply unit 52, the second power supply unit 53, and the third power supply unit 54 and makes them continually generate the power source Vm, the first sensor power source Vs1, and the second sensor power source Vs2. The MPU 60, etc., the first sensor 33, the second sensor 34, and the rotation number detection unit 58 operate continually.

The rotation number detection unit 58 periodically measures the output of the first comparator 58*a* and the second comparator 58*b* and maintains the sine count value CNTs and the cosine count value CNTc (in other words, the current value of the motor rotation number) by incrementing or decrementing the sine count value CNTs and the cosine count value CNTc.

The angular position calculation unit 61 calculates the angular position information θ1. The rotation angle information calculation unit 66 accumulates the change of the angle of the angular position information θ1 after the time at which the ignition key 11 is turned on from off to the rotation angle information θm calculated when the ignition key 11 is turned on from off and calculates the rotation angle information θm after the ignition key 11 is turned on from off.

The rotation angle information calculation unit 66 calculates the rotation angle θo of the output shaft 2*o* of the column shaft and the rotation angle θi of the input shaft 2*i* based on the rotation angle information θm, the gear ratio Rg of the reduction gear 3, and the torsion angle θt of the torsion bar.

The assist control unit 68 controls the driving current I of the motor 20 based on the steering torque Th detected by the torque sensor 10 and the vehicle speed Vh detected by the vehicle speed sensor 12.

The diagnosis unit 67 determines whether or not an abnormality has occurred in the first sensor 33 or the second sensor 34 by comparing the angular position information θ1 and the angular position information θ2.

The diagnosis unit 67 determines whether or not an abnormality that occurred in the second sensor 34 or the rotation number detection unit 58 based on the difference between the sine count value CNTs and the cosine count value CNTc.

The assist control unit 68 performs a predetermined abnormality handling processing such as stopping driving the motor 20 and outputting an alarm when an occurrence of abnormality is detected based on the diagnosis signal Sd output by the diagnosis unit 67.

Effect of the First Embodiment (1) The first sensor 33 and the second sensor 34 output the first sensor signal and the second sensor signal in accordance with the rotation of the motor rotation shaft 21 of the motor 20. The angular position calculation unit 61 calculates the angular position information that represents the angular position of the motor rotation shaft 21 based on the first sensor signal. The rotation number detection unit 58 detects the rotation number of the motor rotation shaft 21 based on the second sensor signal and outputs the rotation number information representing the rotation number. The rotation angle information calculation unit 66 calculates rotation angle information representing the rotation angle of the motor rotation shaft 21 based on the angular position information and the rotation number information.

The regulator 51, the first power supply unit 52, the second power supply unit 53, the third power supply unit 54, and the power control unit 56 provide power to the first sensor 33, the second sensor 34, the angular position calculation unit 61, the rotation number detection unit 58, and the rotation angle information calculation unit 66 when the power switch is on, and stop providing power to the first sensor 33, angular position calculation unit 61, and the rotation angle information calculation unit 66 and provide power to the second sensor 34 and the rotation number detection unit 58 when the power switch is off.

As a result, in the period when the power switch is off, the power consumption in the first sensor 33 and the angular position calculation unit 61 and the rotation angle information calculation unit 66 that process its output signal can be stopped. Therefore, the power consumption in the period when the power switch is off can be reduced.

(2) The rotation number detection unit 58 may continue detecting the rotation number of the motor rotation shaft 21 while the power switch is off. The rotation angle information calculation unit 66 may calculate the rotation angle information based on the rotation number information output by the rotation number detection unit 58 and the angular position information calculated by the angular position calculation unit 61 when the power switch is turned on from off.

As a result, in the period when the power switch is off, when the motor rotation shaft 21 is turned by an external force, etc., at the timing when the power switch is turned on from off, the rotation angle of the motor rotation shaft 21 in the angle range of multiple turns can be calculated.

(3) The first quadrant information calculation unit 63*a* calculates the first quadrant information representing which of the quadrants formed by dividing the rotation range of the motor rotation shaft 21 by n the angular position of the motor rotation shaft 21 belongs to based on the angular position information (n is a natural number equal to or greater than 2). The second quadrant information calculation unit 63*b* calculates the second quadrant information representing which of the quadrants formed by dividing the rotation range of the motor rotation shaft 21 by n the angular position of the motor rotation shaft 21 belongs to based on the rotation number information representing the rotation number in the unit of 1/n rotation. The correction unit 63*d* corrects the rotation number information in accordance with the comparison result of the first quadrant information and the second quadrant information.

The correction unit 63*d* may correct the rotation number information by subtracting the difference obtained by subtracting the first quadrant information from the second quadrant information from the rotation number information.

As a result, even when an error occurs to the rotation number information calculated by the second sensor signal, the error in the rotation number information can be corrected based on the angular position information calculated based on the first sensor signal. Consequently, the accuracy of the rotation angle information can be improved.

(4) The above-mentioned natural number n is 4, and the second sensor signal is the second sine-wave signal sin 2 and the second cosine-wave signal cos 2 in accordance with the rotation of the motor rotation shaft 21. The rotation number detection unit 58 may detect the rotation number based on the change of the combination of the signs of the second sine-wave signal sin 2 and the second cosine-wave signal cos 2.

As a result, the rotation number representing the rotation number in the unit of ¼ rotation can be detected using a sensor that outputs a sine-wave signal and a cosine-wave signal in accordance with the rotation of the motor rotation shaft 21.

(5) The electric power steering device of the embodiment includes a torque sensor 10 that detects the steering torque applied to the steering shaft based on the torsion angle of the input shaft 2*i* and the output shaft 2*o* that are connected via the torsion bar mounted on the steering shaft of the vehicle, the motor 20 that is connected to the output shaft 2*o* via the reduction gear 3 and applies the steering assistance force to the steering shaft, the rotation angle information calculation unit 66 that calculates the rotation angle information of the motor rotation shaft 21 of the motor 20, and the assist control unit 68 that drives and controls the motor 20 based on the steering torque. The rotation angle information calculation unit 66 calculates the steering angle of the input shaft 2*i* based on the torsion angle, the reduction ratio of the reduction gear 3, and the rotation angle information.

In this way, the steering angle of the steering shaft can be detected using the rotation angle information of the motor rotation shaft 21 of the motor 20 without installing an angle sensor that detects the steering angle of the steering shaft. For example, the steering assistance force applied to the steering shaft by the motor 20 can be controlled based on the steering angle calculated by the rotation angle information calculation unit 66.

Second Embodiment

A power management unit 50 according to the second embodiment is described. The power management unit 50 of the second embodiment generates an internal power source Vp (refer to FIG. 14) for driving a digital logical circuit inside the power management unit 50 in addition to the first sensor power source Vs1, the second sensor power source Vs2, and the power source Vm based on the ignition key signal IG from the power supplied from the battery 14.

While the ignition key 11 is on, the power management unit 50 supplies power source Vm to the MPU 60, etc. in a similar manner to the first embodiment.

While the ignition key 11 is on, the power management unit 50 supplies the first sensor power source Vs1 and the second sensor power source Vs2 to the first sensor 33 and the second sensor 34, respectively. The voltage of the first sensor power source Vs1 and the second sensor power source Vs2 while the ignition key 11 is on may be the common power voltage Vcc1 (Vcc1=5 V, for example), for example.

The power management unit 50 continually supplies the internal power source Vp to the logical circuit inside the power management unit 50, regardless of whether the ignition key 11 is on or off.

On the other hand, the power management unit 50 stops providing the first sensor power source Vs1 and the power source Vm to the first sensor 33 and the MPU 60, etc. while the ignition key 11 is off. The power management unit 50 supplies the second sensor power source Vs2 to the second sensor 34 intermittently.

For example, the voltage of the second sensor power source Vs2 that is supplied intermittently while the ignition key 11 is off may be the power voltage Vcc2 that is lower than the power voltage Vcc1. The power voltage Vcc2 may be 3.3 V, for example.

Refer to FIG. 6A and FIG. 6B. As described above, the threshold voltage Vr is set to one-half of the second sensor power source Vs2 (in other words, Vs2/2). Therefore, for example, when the ignition key 11 is on and the second sensor power source Vs2 is 5 V, the threshold voltage Vr may be set to 2.5 V, and when the ignition key 11 is off and the second sensor power source Vs2 is 3.3 V, the threshold voltage Vr may be set to 1.65 V.

Figure 14:
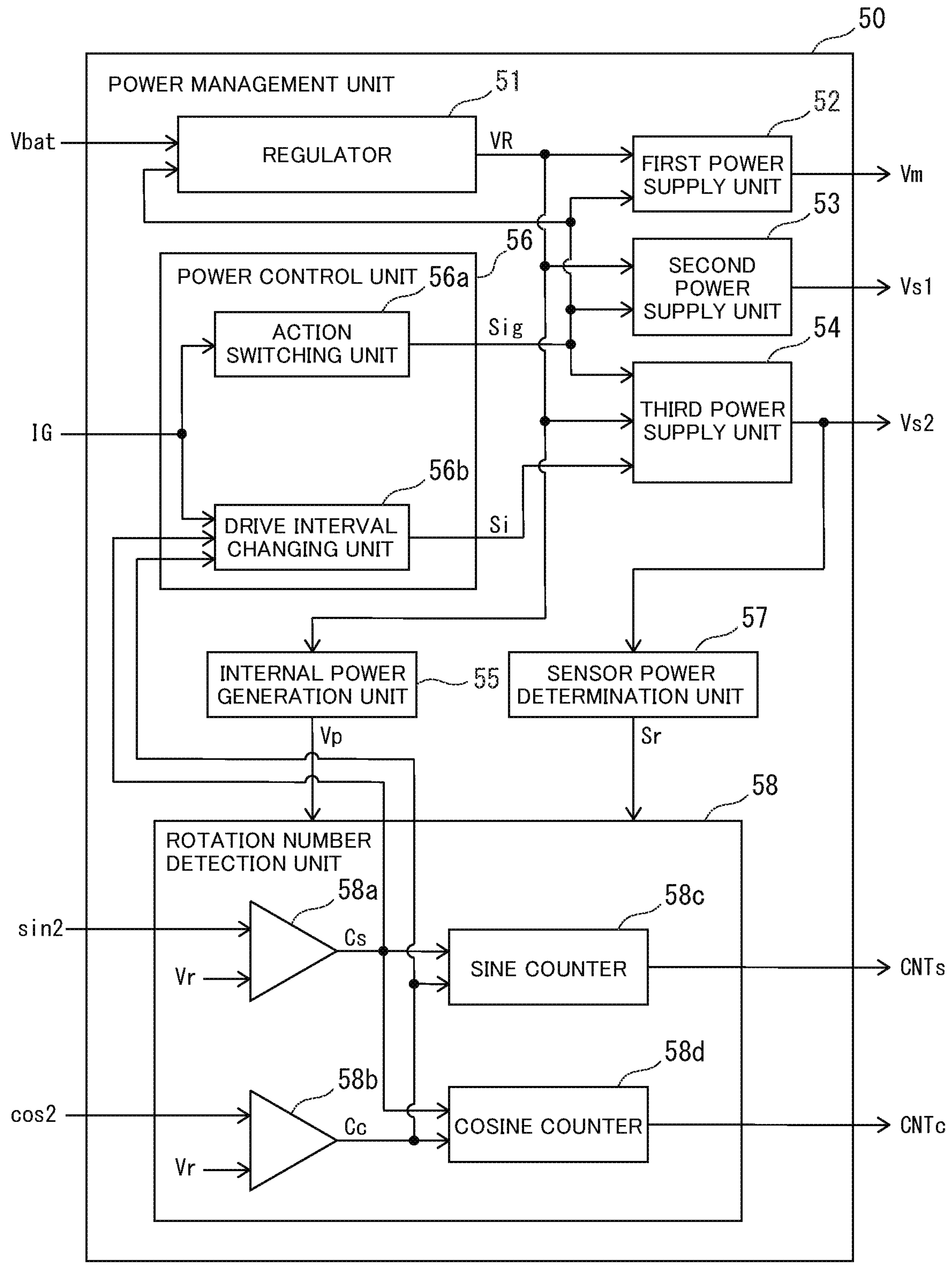
FIG. 14 is a block diagram of an exemplary functional configuration of a power management unit of the second embodiment.

FIG. 14 is a block diagram of an exemplary functional configuration of a power management unit 50 of the second embodiment. A component similar to that of the power management unit 50 of the first embodiment is indicated with the same reference sign. A power management unit 50 of the second embodiment includes an internal power generation unit 55 and a sensor power determination unit 57.

The third power supply unit 54 is an example of a "sensor power supply unit". The first power supply unit 52, the second power supply unit 53 and the internal power generation unit 55 are an example of a "power supply unit" described in the claims.

The power control unit 56 generates an operation switching signal Sig based on the ignition key signal IG and outputs to the regulator 51, the first power supply unit 52, the second power supply unit 53, and the third power supply unit 54.

The operation switching signal Sig has a different value in accordance with whether the ignition key 11 is on or off.

In other words, the operation switching signal Sig represents whether the ignition key 11 is on or off. For example, the value representing that the ignition key 11 is on may be "1", and the value representing that the ignition key 11 is off may be "0".

The power control unit 56 generates a drive interval instruction signal Si and outputs to the third power supply unit 54. The drive interval instruction signal Si is a signal that indicates the interval of intermittently supplying power to the second sensor while the ignition key 11 is off, in other words, a signal that indicates the drive interval of driving the second sensor 34. The details of the power control unit 56 will be described later.

The regulator 51 generates regulator power source VR having a predetermined voltage from the battery power source Vbat. The first power supply unit 52, the second power supply unit 53, the third power supply unit 54, and the internal power generation unit 55 generate the power source Vm, the first sensor power source Vs1, the second sensor power source Vs2, and the internal power source Vp respectively from the regulator power source VR.

The regulator 51 switches the voltage of the regulator power source VR in accordance with the operation switching signal Sig. For example, the voltage of the regulator power source VR while the operation switching signal Sig is "1" (in other words, while the ignition key 11 is on) may be 6 V, and the voltage of the regulator power source VR while the operation switching signal Sig is "0" (in other words, while the ignition key 11 is off) may be 4 V.

The first power supply unit 52 continually supplies power source Vm to the MPU 60, etc. while the operation switching signal Sig has the value of "1".

While the operation switching signal Sig has the value of "1", the second power supply unit 53 continually supplies the first sensor power source Vs1 to the first sensor 33, and the third power supply unit 54 continually supplies the second sensor power source Vs2 to the second sensor 34.

As a result, in the period while the ignition key 11 is on, the MPU 60, etc., the first sensor 33 and the second sensor 34 operate continually. The voltages of the first sensor power source Vs1 and the second sensor power source Vs2 are the common power voltage Vcc1.

On the other hand, when the operation switching signal Sig has a value of "0" (in other words, while the ignition key 11 is off), the first power supply unit 52 and the second power supply unit 53 stop generating the power source Vm and the first sensor power source Vs1. Accordingly, the supply of the first sensor power source Vs1 to the first sensor 33 and the supply of the power source Vm to the MPU 60, etc. are stopped, and the operation of the first sensor 33 and the MPU 60, etc. stops.

The third power supply unit 54 generates the second sensor power source Vs2 having the power voltage Vcc2 that is lower than the power voltage Vcc1 while the operation switching signal Sig has a value of "0". The third power supply unit 54 intermittently generates the second sensor power source Vs2 in the drive interval instructed by the drive interval instruction signal Si while the operation switching signal Sig has a value of "0".

As a result, the second sensor power source Vs2 having a power voltage Vcc2 that is lower than the power voltage Vcc1 is intermittently supplied to the second sensor 34, and the second sensor 34 operates intermittently.

The internal power generation unit 55 supplies the internal power source Vp to the rotation number detection unit 58 regardless of the value of the operation switching signal Sig being "1" or "0" (regardless of the ignition key 11 being on or off).

The sensor power determination unit 57 determines whether the second sensor power source Vs2 is supplied to the second sensor 34 in the period when the ignition key 11 is off (in other words, the period in which the second sensor power source Vs2 is generated intermittently). The sensor power determination unit 57 generates an activation signal Sr for operating the rotation number detection unit 58 at the timing when the second sensor power source Vs2 is supplied to the second sensor 34. The value of the activation signal Sr intermittently becomes "1" in the period when the second sensor power source Vs2 is supplied, and becomes "0" in the period when the second sensor power source Vs2 is not supplied, for example.

While the ignition key 11 is on, the rotation number detection unit 58 continually operates. While the ignition key 11 is off, the rotation number detection unit 58 operates when the value of the activation signal Sr from the sensor power determination unit 57 is "1" (in other words, the second sensor power source Vs2 is supplied to the second sensor 34). Therefore, the rotation number detection unit 58 operates intermittently.

The first comparator 58*a* and the second comparator 58*b* of the rotation number detection unit 58 operate intermittently while the ignition key 11 is off, and changes the sign signals Cs and Cc in accordance with the result of comparing the second sine-wave signal sin 2 and the second cosine-wave signal cos 2 and the threshold voltage Vr. In the period when the second sensor power source Vs2 is not supplied to the second sensor 34, the internal power source Vp maintains the output of the sign signals Cs and Cc. The sine counter 58*c* and the cosine counter 58*d* operate using the internal power source Vp as the power source and calculate the sine count value CNTs and the cosine count value CNTc, respectively.

The power control unit 56 is further described. As described above, the power control unit 56 controls the regulator 51, the first power supply unit 52, the second power supply unit 53, and the third power supply unit 54 by generating the operation switching signal Sig and the drive interval instruction signal Si. The power control unit 56 includes an action switching unit 56*a* and a drive interval changing unit 56*b*.

The action switching unit 56*a* generates the operation switching signal Sig based on the ignition key signal IG.

The drive interval changing unit 56*b* generates the drive interval instruction signal Si based on whether the rotation of the motor rotation shaft 21 is detected or not. As described above, the drive interval instruction signal Si instructs the drive interval for intermittently driving the second sensor 34.

The drive interval changing unit 56*b* expands/shortens the drive interval instructed by the drive interval instruction signal Si in accordance with whether the rotation of the motor rotation shaft 21 is detected or not.

More specifically, the drive interval changing unit 56*b* shortens the drive interval instructed by the drive interval instruction signal Si from the predetermined maximum interval x when a rotation of the motor rotation shaft 21 is detected and expands the drive interval to the maximum interval x when a rotation of the motor rotation shaft 21 is no longer detected afterwards. The maximum interval x is an example of the "first time interval".

As described above, by shortening the drive interval for intermittently driving the second sensor 34 when a rotation of the motor rotation shaft 21 is detected, a counting mistake of the sine count value CNTs and the cosine count value CNTc can be prevented.

For example, the drive interval changing unit 56*b* may generate the drive interval instruction signal Si in accordance with whether a change in the second sine-wave signal sin 2 and the second cosine-wave signal cos 2 is detected or not.

More specifically, the drive interval changing unit 56*b* generates the drive interval instruction signal Si based on the change of the sign signal Cs of the second sine-wave signal sin 2 that is the output of the first comparator 58*a* and the change of the sign signal Cc of the second cosine-wave signal cos 2 that is the output of the second comparator 58*b*.

In other words, the drive interval changing unit 56*b* shortens the drive interval instructed by the drive interval instruction signal Si from the maximum interval x when a change occurs in the sign signals Cs and Cc.

Afterwards, the drive interval changing unit 56*b* expands the drive interval instructed by the drive interval instruction signal Si to the maximum interval x when a change no longer occurs to the sign signals Cs and Cc.

For example, the drive interval changing unit 56*b* may start to expand the drive interval when the change of neither of the sign signals Cs and Cc is detected even when the power is supplied intermittently for the predetermined multiple times to the second sensor 34.

When the drive interval changing unit 56*b* detects a change in one of the sign signals Cs and Cc and then detects a change in the other of the sign signals Cs and Cc, the drive interval instructed by the drive interval instruction signal Si may be shortened by steps.

For example, when a change in one of the sign signals Cs and Cc is detected, the drive interval changing unit 56*b* shortens the drive interval by the predetermined length T1, and when a change in the other signal is detected afterwards, further shortens the drive interval by the predetermined length T1. Therefore, the shortening length changes by steps of T1, (2×T1).

By shortening the drive interval by steps as described above, a counting mistake of the sine count value CNTs and the cosine count value CNTc can be prevented while suppressing the increase in the power consumption due to the shortening of the drive interval.

Figures 15A, 15B, 15C:
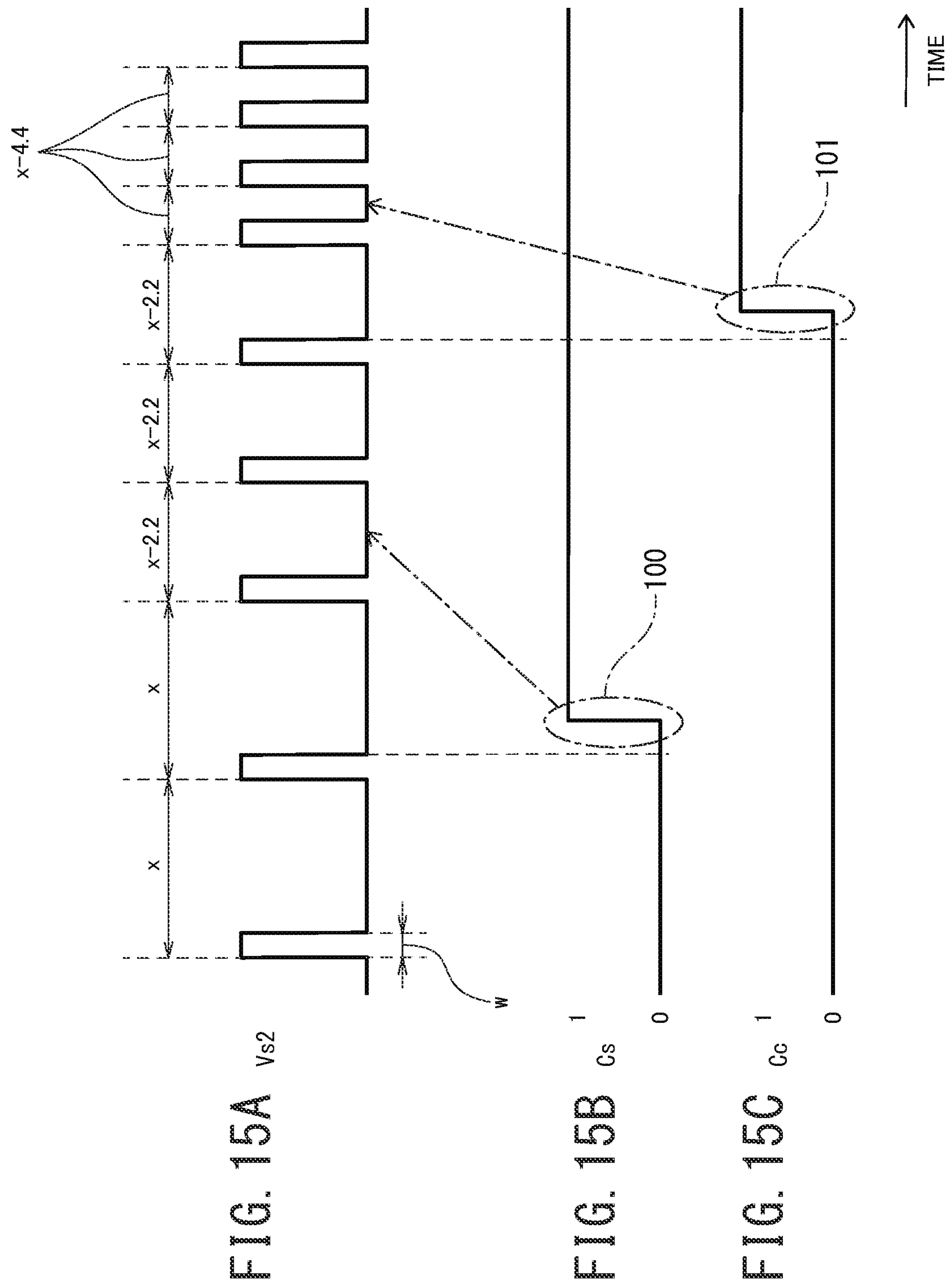
FIG. 15A to FIG. 15C are explanatory diagrams of an example of controlling a drive interval of a second sensor when a rotation of a motor rotation shaft is detected while an ignition key is off.

Referring to FIG. 15A to FIG. 15C, an example of controlling the drive interval of the second sensor 34 when a rotation of the motor rotation shaft 21 is detected while the ignition key 11 is off is described. FIG. 15A illustrates an example when the predetermined length T1 is 2.2 msec.

The initial drive interval is the maximum interval x, and as represented by the reference sign 100, when the sign signal Cs changes from "0" to "1", the drive interval is shortened from the maximum interval x to (x−2.2) msec.

Then, when the sign signal Cc changes from "0" to "1" as represented by the reference sign 101, the drive interval is shortened from (x−2.2) msec to (x−4.4) msec.

For example, when the maximum interval x is 6.6 msec, the drive interval instructed by the drive interval instruction signal Si is shortened by steps from 6.6 msec to 4.4 msec, and then to 2.2 msec.

When the drive interval instructed by the drive interval instruction signal Si is shortened to a predetermined minimum interval, the drive interval changing unit 56*b* prohibits shortening the drive interval to a value shorter than the minimum interval even when a change in the sign signals Cs and Cc is detected. For example, in the example in FIG. 15A, the minimum interval may be (x−4.4) msec. In the example in FIG. 15A, when the maximum interval x is 6.6 msec, the minimum interval becomes 2.2 msec.

The time width w of the period when the second sensor power source Vs2 is supplied to the second sensor 34 (in other words, the period when the second sensor 34 is driven) may be fixed. The time width w may be 220 μsec, for example.

When the time width w is fixed, the duty ratio of the drive period of the second sensor 34 when the drive interval is the maximum interval of 6.6 msec is ⅓ of when the drive interval is the minimum interval of 2.2 msec.

When the time width w is 220 μsec and the drive interval is the minimum interval of 2.2 msec, the duty ratio is 10%.

There is a case when one of the sign signals Cs and Cc changes, and then before the other of the sign signals Cs and Cc changes, the one of the sign signals Cs and Cc changes again.

In the example in FIG. 15B and FIG. 15C, as represented by the reference sign 100, when the sign signal Cs changes from "0" to "1", and then the sign signal Cs returns to "0" from "1" although the sign signal Cc does not change from "0" to "1".

Such an event occurs when the motor rotation shaft 21 rotates and one of the sign signals Cs and Cc changes, and then the motor rotation shaft 21 does not rotate to the same direction for more than 90 degrees, but rotates to the opposite direction, for example.

In this case, the motor rotation shaft 21 is not rotating fast so there is a little risk of a counting mistake of the sine count value CNTs and the cosine count value CNTc even if the drive interval is not greatly shortened.

Accordingly, the drive interval changing unit 56*b* may be configured not to shorten the drive interval instructed by the drive interval instruction signal Si when one of the sign signals Cs and Cc changes, and then before the other of the sign signals Cs and Cc changes, the one of the sign signals Cs and Cc changes again.

For example, the drive interval changing unit 56*b* stores the change history of the sign signal Cs representing the change of the sign signal Cs when a change in the sign signal Cs is detected.

When the change history of the sign signal Cs is stored and a change in the sign signal Cs is detected, the drive interval changing unit 56*b* does not shorten the drive interval by steps. On the contrary, when the change history of the sign signal Cs is not stored and a change in the sign signal Cs is detected, the drive interval changing unit 56*b* shortens the drive interval and stores the change history of the sign signal Cs.

When the change history of the sign signal Cs is stored and a change in the sign signal Cc is detected, the drive interval changing unit 56*b* shortens the drive interval and stores the change history of the sign signal Cc. At this time, the drive interval changing unit 56*b* resets the change history to a state in which the change of the sign signal Cs is not stored.

When the change history of the sign signal Cc is stored and a change in the sign signal Cc is detected, the drive interval changing unit 56*b* does not shorten the drive interval by steps.

On the contrary, when the change history of the sign signal Cc is not stored and a change in the sign signal Cc is detected, the drive interval changing unit 56*b* shortens the drive interval by steps and stores the change history of the sign signal Cc.

When the change history of the sign signal Cc is stored and a change in the sign signal Cs is detected, the drive interval changing unit 56*b* shortens the drive interval and stores the change history of the sign signal Cs. The drive interval changing unit 56*b* resets the change history to a state in which the change of the sign signal Cc is not stored.

The change history of the sign signals Cs and Cc may be stored by a flip-flop circuit, etc. when the drive interval changing unit 56*b* is implemented by hardware such as a logical circuit for example.

The change history of the sign signals Cs and Cc may be stored by a flag, etc. when the drive interval changing unit 56*b* is realized by software.

Next, the operation of the drive interval changing unit 56*b* when the rotation of the motor rotation shaft 21 is not detected while the ignition key 11 is off is described.

As described above, the drive interval changing unit 56*b* expands the drive interval instructed by the drive interval instruction signal Si to the maximum interval x when a change no longer occurs to the sign signals Cs and Cc after the drive interval instructed by the drive interval instruction signal Si is shortened.

More specifically, when a change in neither of the sign signals Cs and Cc is detected even when power is intermittently supplied to the second sensor 34 for predetermined multiple times, the drive interval instructed by the drive interval instruction signal Si is expanded to the maximum interval x.

Therefore, the drive interval changing unit 56*b* counts the power supply count CNTr that represents the number of times that power is intermittently supplied to the second sensor 34 after the last detection of the change of one of the sign signals Cs and Cc.

In other words, the drive interval changing unit 56*b* increases the power supply count CNTr by 1 every time power is intermittently supplied to the second sensor 34 and resets the power supply count CNTr to 0 when a change in one of the sign signals Cs and Cc is detected.

The drive interval changing unit 56*b* determines whether the power supply count CNTr is equal to or greater than a predetermined count threshold value Cth or not. When the power supply count CNTr is equal to or greater than the predetermined count threshold value Cth, the drive interval changing unit 56*b* expands the drive interval instructed by the drive interval instruction signal Si by a predetermined length T2 every time the power supply count CNTr increases by 1. The predetermined length T2 may be shorter than the above-described predetermined length T1, or may be equal to the predetermined length T1.

At this time, the drive interval changing unit 56*b* resets the change history to a state in which the change of the sign signals Cs and Cc is not stored.

The drive interval changing unit 56*b* continues to expand the drive interval until the drive interval reaches the maximum interval x, and when the drive interval reaches the maximum interval x, stops expanding the drive interval.

Referring to FIG. 16A to FIG. 16D, an example of controlling the drive interval of the second sensor 34 when a rotation of the motor rotation shaft 21 is not detected while the ignition key 11 is off is described. In the example in the FIG. 16A to FIG. 16D, the count threshold value Cth is 4, and the predetermined length T2 is 1.1 msec.

Now, as illustrated in FIG. 16A, assume that the drive interval instructed by the drive interval instruction signal Si is initially shortened to (x−4.4) msec.

As represented by the reference sign 102, when the sign signal Cs changes, the drive interval changing unit 56*b* resets the power supply count CNTr to 0. Then, the drive interval changing unit 56*b* increases the power supply count CNTr by 1 every time power is intermittently supplied to the second sensor 34 when no change of either of the sign signals Cs and Cc is detected.

The drive interval changing unit 56*b* determines whether or not the power supply count CNTr is equal to or greater than 4 which is the count threshold value Cth.

When the power supply count CNTr reaches 4, the drive interval changing unit 56*b* expands the drive interval instructed by the drive interval instruction signal Si by the predetermined length T2 of 1.1 msec. As a result, the drive interval expands from (x−4.4) msec to (x−3.3) msec.

Then, the drive interval changing unit 56*b* expands the drive interval by 1.1 msec every time the power supply count CNTr increases by 1.

Afterwards, when the drive interval instructed by the drive interval instruction signal Si is expanded to the maximum interval x, the drive interval changing unit 56*b* stops expanding the drive interval.

Here, the numerical examples of the above-described predetermined lengths T1 and T2, the maximum interval x and the minimum interval of the drive interval, and the count threshold value Cth are merely examples, and the present invention is not limited to the above numerical examples. The value of the predetermined length T1, the maximum interval x and the minimum interval may be set appropriately in accordance with the actual device configuration.

When the drive interval becomes shorter than the minimum interval when the drive interval is shortened by the predetermined length T1 when a change in the sign signal Cs or Cc is detected, the drive interval changing unit 56*b* may shorten the length of shortening the drive interval to be shorter than the predetermined length T1. Similarly, when the drive interval becomes longer than the maximum interval x when the drive interval is expanded by the predetermined length T2 when no change in the sign signal Cs or Cc is detected, the drive interval changing unit 56*b* may shorten the length to expand the drive interval to be shorter than the predetermined length T2.

For example, assume that a change in the sign signal Cs or Cc is detected at a timing when the drive interval is (x−3.3) msec during the process of expanding the drive interval when the predetermined length T1 is 2.2 msec and the minimum interval is (x−4.4) msec.

At this time, if the drive interval is shortened by the predetermined length T1, the drive interval becomes (x−5.5) msec that is shorter than the minimum interval (x−4.4) msec. Therefore, the drive interval changing unit 56*b* shortens the drive interval by 1.1 msec that is shorter than the predetermined length T1=2.2 msec, and sets the drive interval to be the minimum interval of (x−4.4) msec.

Figure 17:
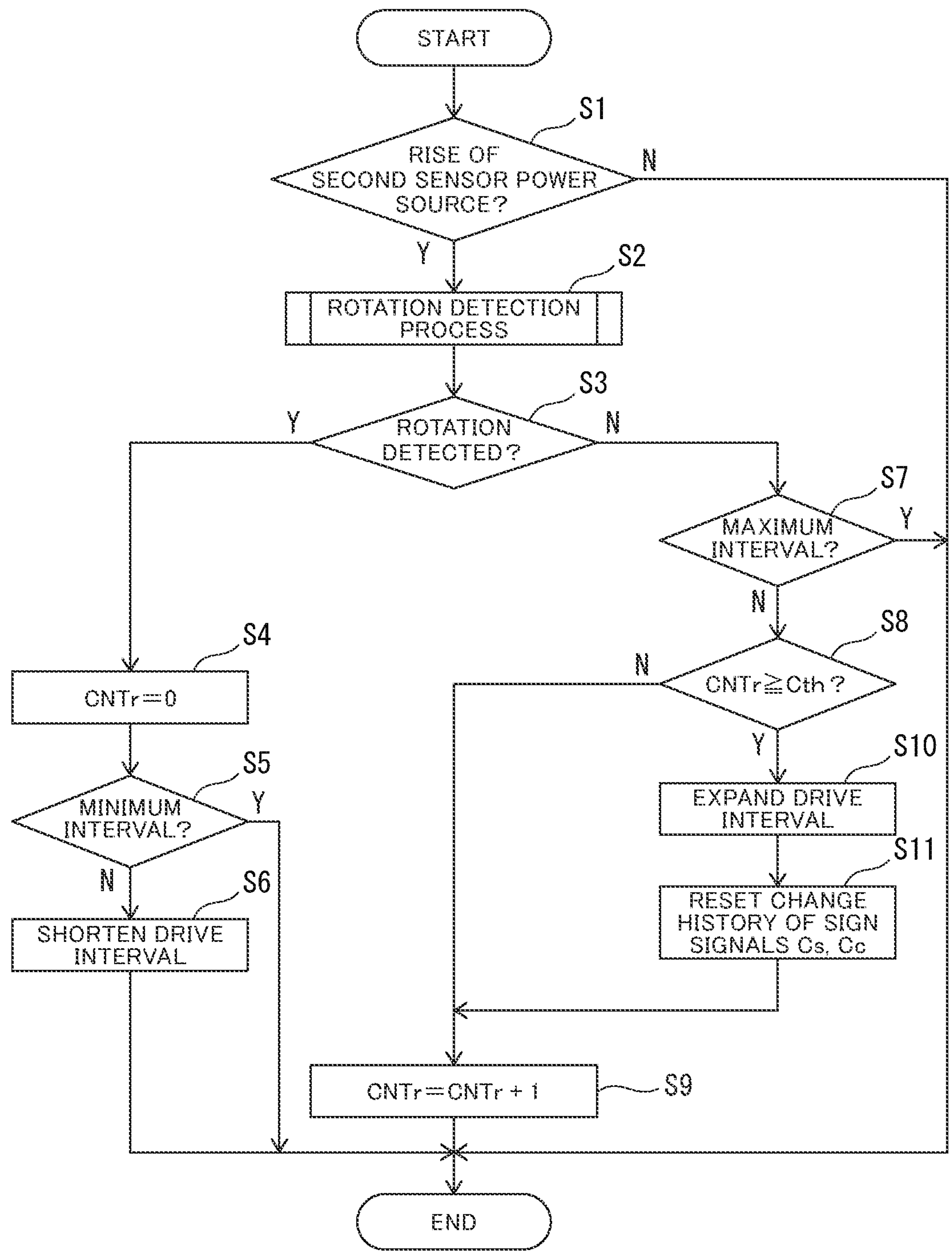
FIG. 17 is a flow chart of an example of a setting method of the drive interval instructed by a drive interval instruction signal.

With reference to FIG. 17, an example of a method of setting the drive interval instructed by the drive interval instruction signal Si is described.

In step S1, the sensor power determination unit 57 determines whether a rise of the voltage of the second sensor power source Vs2 is detected or not. When the rise of the voltage of the second sensor power source Vs2 is detected (step S1: Y), the process proceeds to step S2. When the rise of the voltage of the second sensor power source Vs2 is not detected (step S1: N), the process terminates. In this case, the drive interval does not change.

In step S2, the sensor power determination unit 57 generates the activation signal Sr and outputs to the rotation number detection unit 58. In the rotation number detection unit 58 started by the activation signal Sr, the first comparator 58*a* and the second comparator 58*b* output the sign signal Cs of the second sine-wave signal sin 2 and the sign signal Cc of the second cosine-wave signal cos 2.

The drive interval changing unit 56*b* performs a rotation detection process, and determines whether a rotation of the motor rotation shaft 21 is detected or not based on the sign signals Cs and Cc.

With reference to FIG. 18, an example of the rotation detection process in step S2 is described.

In step S20, the drive interval changing unit 56*b* determines whether the sign signal Cs changed or not. When the sign signal Cs changed (step S20: Y), the process proceeds to S21. When the sign signal Cs did not change (step S20: N), the process proceeds to S25.

In step S21, the drive interval changing unit 56*b* determines whether the change history of the sign signal Cs representing that the sign signal Cs changed exists or not. When the change history exists (step S21: Y), the process proceeds to S24. When the change history does not exist (step S21: N), the process proceeds to S22.

In step S22, the drive interval changing unit 56*b* stores the change history of the sign signal Cs representing that the sign signal Cs changed. The drive interval changing unit 56*b* resets the change history representing the sign signal Cc changed to a state that the change of the sign signal Cc is not stored.

In step S23, the drive interval changing unit 56*b* determines that a rotation of the motor rotation shaft 21 is detected, and terminates the rotation detection process.

On the other hand, when the change history is determined not to exist in step s21 (step S21: N), the drive interval changing unit 56*b* determines that a rotation of the motor rotation shaft 21 is not detected in step S24, and terminates the rotation detection process.

When the sign signal Cs does not change in step S20 (step S20: N), the drive interval changing unit 56*b* determines whether the sign signal Cc changed or not in step S25.

When the sign signal Cc changed (step S25: Y), the process proceeds to step S26. When the sign signal Cc did not change (step S25: N), the process proceeds to S24. In this case, the drive interval changing unit 56*b* determines that a rotation of the motor rotation shaft 21 is not detected, and terminates the rotation detection process.

In step S26, the drive interval changing unit 56*b* determines whether the change history of the sign signal Cs representing that the sign signal Cs changed exists or not.

When the change history exists (step S26: Y), the process proceeds to S24. In this case, the drive interval changing unit 56*b* determines that a rotation of the motor rotation shaft 21 is not detected, and terminates the rotation detection process.

When the change history of the sign signal Cs does not exist (step S26: N), the process proceeds to S27.

In step S27, the drive interval changing unit 56*b* stores the change history of the sign signal Cc representing that the sign signal Cc changed. The drive interval changing unit 56*b* resets the change history representing the sign signal Cs changed to a state that the change of the sign signal Cs is not stored.

In step S28, the drive interval changing unit 56*b* determines that a rotation of the motor rotation shaft 21 is detected, and terminates the rotation detection process.

Refer to FIG. 17. When a rotation of the motor rotation shaft 21 is detected (step S3: Y), the process proceeds to S4. When a rotation of the motor rotation shaft 21 is not detected (step S3: N), the process proceeds to S7.

In step S4, the drive interval changing unit 56*b* resets the power supply count CNTr counting the number of times power is intermittently supplied to the second sensor 34.

In step S5, the drive interval changing unit 56*b* determines whether the drive interval instructed by the drive interval instruction signal Si is already the minimum interval. When the drive interval is the minimum interval (step S5: Y), the process terminates. In this case, the drive interval does not change.

When the drive interval is not the minimum interval (step S5: N), the process proceeds to step S6.

In step S6, the drive interval changing unit 56*b* shortens the drive interval instructed by the drive interval instruction signal Si. Afterwards, the process terminates.

When a rotation of the motor rotation shaft 21 is not detected in step S3 (step S3: N), the drive interval changing unit 56*b* determines whether the drive interval instructed by the drive interval instruction signal Si is the maximum interval x or not in step S7. When the drive interval is the maximum interval x (step S7: Y), the process terminates. In this case, the drive interval does not change.

When the drive interval is not the maximum interval x (step S7: N), the process proceeds to step S8.

In step S8, the drive interval changing unit 56*b* determines whether the power supply count CNTr is equal to or greater than the count threshold value Cth or not.

When the power supply count CNTr is equal to or greater than the count threshold value Cth (step S8: Y), the process proceeds to S10. When the power supply count CNTr is not equal to or greater than the count threshold value Cth (step S8: N), the process proceeds to S9. In this case, the drive interval does not change.

In step S9, the drive interval changing unit 56*b* increases the power supply count CNTr by 1. Afterwards, the process terminates.

In step S8, when the power supply count CNTr is equal to or greater than the count threshold value Cth (step S8:Y), the drive interval changing unit 56*b* expands the drive interval instructed by the drive interval instruction signal Si in step S10.

In step S11, the drive interval changing unit 56*b* resets the change history to a state in which the change of the sign signals Cs and Cc is not stored. Afterwards, the process terminates after step S9.

Effect of the Second Embodiment (1) The second sensor 34 outputs the second sensor signal including the sine-wave signal and the cosine-wave signal in accordance with the rotation of the motor rotation shaft 21 of the motor 20. The third power supply unit 54 supplies the second sensor power source Vs2 to the second sensor 34. The power control unit 56 controls the third power supply unit 54 to continually supply the second sensor power source Vs2 to the second sensor 34 when the ignition key 11 is on and intermittently supply the second sensor power source Vs2 to the second sensor 34 when the ignition key 11 is off. The first comparator 58*a* and the second comparator 58*b* detect a change in the sine-wave signal and a change in the cosine-wave signal.

The power control unit 56 sets a drive interval for driving the second sensor 34 by providing the second sensor power source Vs2 intermittently to the second sensor 34 to a first time interval when no change is detected in the sine-wave signal and the cosine-wave signal, sets to the second time interval that is shorter than the first time interval when a change in only one of the sine-wave signal and the cosine-wave signal is detected and sets to the third time interval that is shorter than the second time interval when a change in one of the sine-wave signal and the cosine-wave signal is detected and then a change in the other is detected.

As described above, since the second sensor 34 is driven intermittently when the ignition key 11 is off, the power consumption while the ignition key 11 that is the power switch is off can be reduced.

Moreover, since the drive interval of the second sensor 34 is shortened in accordance with the change of the output signal of the second sensor 34, a detection mistake of a rotation of the motor rotation shaft 21 can be prevented.

Moreover, since the drive interval is shortened by steps in accordance with the change of the output signal of the second sensor 34, a detection mistake of a rotation of the motor rotation shaft 21 can be prevented while suppressing the increase in the power consumption.

(2) The power control unit 56 may expand by steps the drive interval to the first time interval when a change in neither of the sine-wave signal and the cosine-wave signal is detected even when the second sensor power source Vs2 is intermittently supplied for a predetermined plurality of times while the drive interval is set to be shorter than the first time interval.

As described above, the power consumption can be reduced because the drive interval is expanded when neither the sine-wave signal or the cosine-wave signal is detected.

Moreover, since the drive interval is expanded by steps, the detection mistake of a rotation of the motor rotation shaft 21 can be prevented while suppressing the increase in the power consumption.

(3) The power control unit 56 may increase the duty ratio of the period during which the second sensor power source Vs2 is supplied to the second sensor 34 by shortening the drive interval.

For example, the duty ratio when the drive interval is the third time interval may be 10%.

The duty ratio when the drive interval is the first time interval may be one-third of the duty ratio when the drive interval is the third time interval, for example.

Therefore, the power consumption in the period when the ignition key 11 is off can be reduced.

(4) The power control unit 56 may lower the voltage of the second sensor power source Vs2 that is supplied when the ignition key 11 is off than when the ignition key 11 is on.

For example, the voltage of the second sensor power source Vs2 when the ignition key 11 is off may be 3.3 V, and the voltage of the second sensor power source Vs2 when the ignition key 11 is on may be 5 V.

Therefore, the power consumption in the period when the ignition key 11 is off can be reduced.

(5) The first sensor 33 outputs the first sensor signal in accordance with the rotation of the motor rotation shaft 21 of the motor 20. The angular position calculation unit 61 calculates the angular position information that represents the angular position of the motor rotation shaft 21 based on the first sensor signal. The rotation number detection unit 58 detects the rotation number of the motor rotation shaft 21 based on the second sensor signal and outputs the rotation number information representing the rotation number. The rotation angle information calculation unit 66 calculates rotation angle information representing the rotation angle of the motor rotation shaft 21 based on the angular position information and the rotation number information.

The second power supply unit 53, the first power supply unit 52, and the internal power generation unit 55 supply power to the first sensor 33, the angular position calculation unit 61, the rotation number detection unit 58, and the rotation angle information calculation unit 66. The power control unit 56 may control the second power supply unit 53 and the first power supply unit 52 to supply power to the first sensor 33, the angular position calculation unit 61, and the rotation angle information calculation unit 66 when the ignition key 11 is on and to stop supplying power to the first sensor 33, the angular position calculation unit 61, and the rotation angle information calculation unit 66 when the ignition key 11 is off.

As a result, in the period when the ignition key 11 is off, the power consumption in the first sensor 33 and the angular position calculation unit 61 and the rotation angle information calculation unit 66 that process its output signal can be stopped. Therefore, the power consumption in the period when the power switch is off can be reduced.

Third Embodiment

A power management unit 50 according to the third embodiment is described. Similar to the second embodiment, the power management unit 50 supplies the power source Vs2 to the MPU 60, etc. while the ignition key 11 is on.

The power management unit 50 supplies the first sensor power source Vs1 and the second sensor power source Vs2 to the first sensor 33 and the second sensor 34, respectively. While the ignition key 11 is on, the power management unit 50 continually supplies power as the first sensor power source Vs1 and the second sensor power source Vs2. The voltage of the first sensor power source Vs1 and the second sensor power source Vs2 while the ignition key 11 is on may be the common power voltage Vcc1 (Vcc1=5 V, for example), for example.

While the ignition key 11 is on, the power management unit 50 supplies the internal power source Vp that is the continual power source to the logical circuit inside the power management unit 50. For example, the voltage of the internal power source Vp while the ignition key 11 is on may be the common power voltage Vcc1. In other words, the voltage of the internal power source Vp may be equal to the voltage of the second sensor power source Vs2.

The power continually supplied as the second sensor power source Vs2 and the internal power source Vp while the ignition key 11 is on is an example of the "first power".

On the other hand, the power management unit 50 stops providing the first sensor power source Vs1 to the first sensor 33 and the and the power source Vm to the MPU 60, etc. while the ignition key 11 is off.

While the ignition key 11 is off, the power management unit 50 intermittently supplies power as the second sensor power source Vs2 to the second sensor 34.

For example, the voltage of the second sensor power source Vs2 that is supplied intermittently while the ignition key 11 is off may be the power voltage Vcc2 that is lower than the power voltage Vcc1. The power voltage Vcc2 may be 3.3 V, for example.

The power intermittently supplied as the second sensor power source Vs2 while the ignition key 11 is off is an example of the "second power".

Figure 19A:
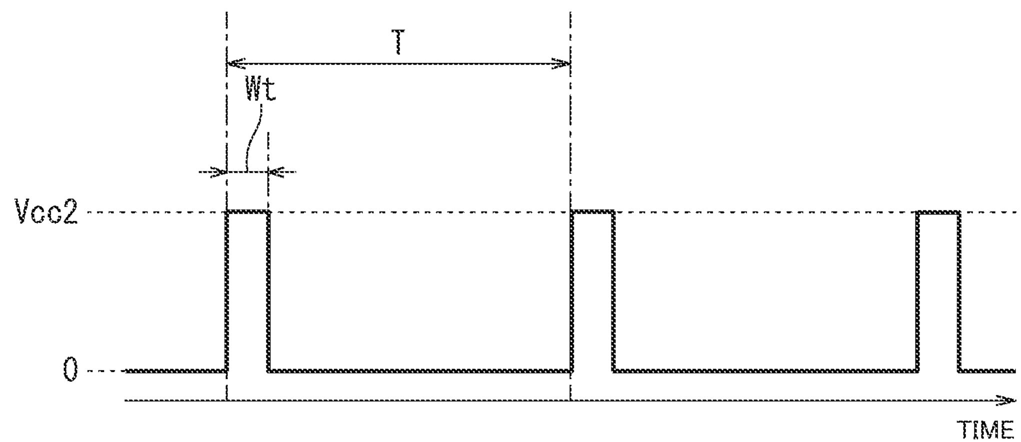
FIG. 19A is a diagram illustrating a waveform of an exemplary second sensor power source Vs2 that is output intermittently while the ignition key is off.

FIG. 19A is a diagram illustrating a waveform of an exemplary second sensor power source Vs2 that is output intermittently while the ignition key 11 is off.

When the ignition key 11 is off, the voltage of the second sensor power source Vs2 becomes the power voltage Vcc2 in the intermittent output period for the time width Wt that occurs in the output cycle T and becomes 0 outside the intermittent output period. Similar to the second embodiment, the power management unit 50 may dynamically change the output cycle T. The output cycle T may be from 2.2 msec to 6.6 msec, for example.

Figure 19B:
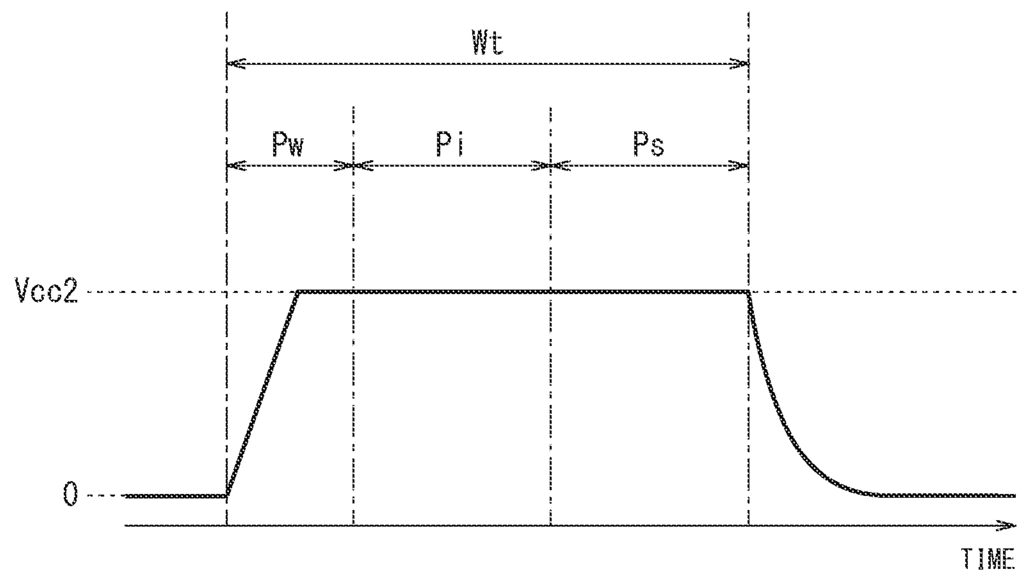
FIG. 19B is a diagram illustrating a waveform of a single intermittent output of the second sensor power source Vs2.

FIG. 19B is a diagram illustrating a waveform of one intermittent output of the second sensor power source Vs2. The time width Wt of one output period during which the second sensor power source Vs2 is intermittently output is the total of a waiting period Pw, an idle period Pi and a sampling period Ps.

The waiting period Pw is the period during which sampling of the second sensor signal is prohibited to prevent the voltage fluctuation that occurs immediately after the intermittent output of the second sensor power source Vs2 starts from affecting the second sensor signal of the second sensor 34. The waiting period Pw may be a fixed value for example and may be an arbitrary value programmable in the power management unit 50.

The period length of the idle period Pi and the sampling period Ps are arbitrary values programmable in the power management unit 50. The sampling period Ps is specified as the period during which the power management unit 50 samples the second sensor signal of the second sensor 34 when the ignition key 11 is off.

The period length of the idle period Pi can be programmed to specify the start of the sampling period Ps, and the period length of the sampling period Ps can be programmed to specify the time of the end of the intermittent output of the second sensor power source Vs2.

The length of the time width Wt of the intermittent output of the second sensor power source Vs2 affects the dark current that flows in the sensor unit 30 and the controller 40 while the ignition key 11 is off. In other words, the length of the time width Wt affects the power consumption of the sensor unit 30 and the controller 40 while the ignition key 11 is off. The longer the time width Wt, the larger the dark current and the power consumption, and the shorter the time width Wt, the more the dark current and the power consumption are saved.

On the other hand, when the idle period Pi and the sampling period Ps are shortened, it becomes difficult to accurately sample the second sensor signal output from the second sensor 34 that is intermittently driven.

For example, when the supply of the second sensor power source Vs2 starts, the voltage of the second sensor signal that the controller 40 receives from the second sensor 34 changes with a certain time constant from 0 to a value in accordance with the magnetic flux applied to the second sensor 34. The time constant of the second sensor signal is determined by an electric characteristic of the second sensor 34 itself or impedance of the harness 35 and the input circuit etc., for example. Therefore, when the idle period Pi is excessively small, there is a risk of sampling a signal smaller than the intended second sensor signal.

Thus, it is desirable that the length of the time width Wt of the one intermittent output of the second sensor power source Vs2 is set in accordance with the consumption current (dark current) that is allowed for the sensor unit 30 and the controller 40 while the ignition key 11 is off. For example, the time width Wt of one intermittent output by the second sensor power source Vs2 may be equal to or smaller than 220 μsec.

The time width Wt of one intermittent output of the second sensor power source Vs2 is preferable to be set in accordance with a time constant of the second sensor signal when an intermittent supply of the second sensor power source Vs2 starts while the ignition key 11 is off.

For example, it is realistically possible to design the second sensor signal to be sufficiently large when 100 μsec passes after the output of the second sensor power source Vs2 starts (for example, to rise to approximately 99% of the magnitude of the second sensor signal when the second sensor power source Vs2 is continually supplied). Therefore, for example, the time width Wt of one intermittent output by the second sensor power source Vs2 may be equal to or greater than 100 μsec.

While the ignition key 11 is off, the power management unit 50 continually supplies power as the internal power source Vp as well. In other words, the power management unit 50 continually supplies power as the internal power source Vp, regardless of whether the ignition key 11 is on or off.

However, while the ignition key 11 is off, the power management unit 50 supplies the internal power source Vp having a lower voltage than the voltage while the ignition key 11 is on.

For example, the voltage of the internal power source Vp while the ignition key 11 is off may be equal to the power voltage Vcc2 that is the voltage of the second sensor power source Vs2 while the ignition key 11 is off.

The power continually supplied as the internal power source Vp while the ignition key 11 is off is an example of the "third power".

Figure 20:
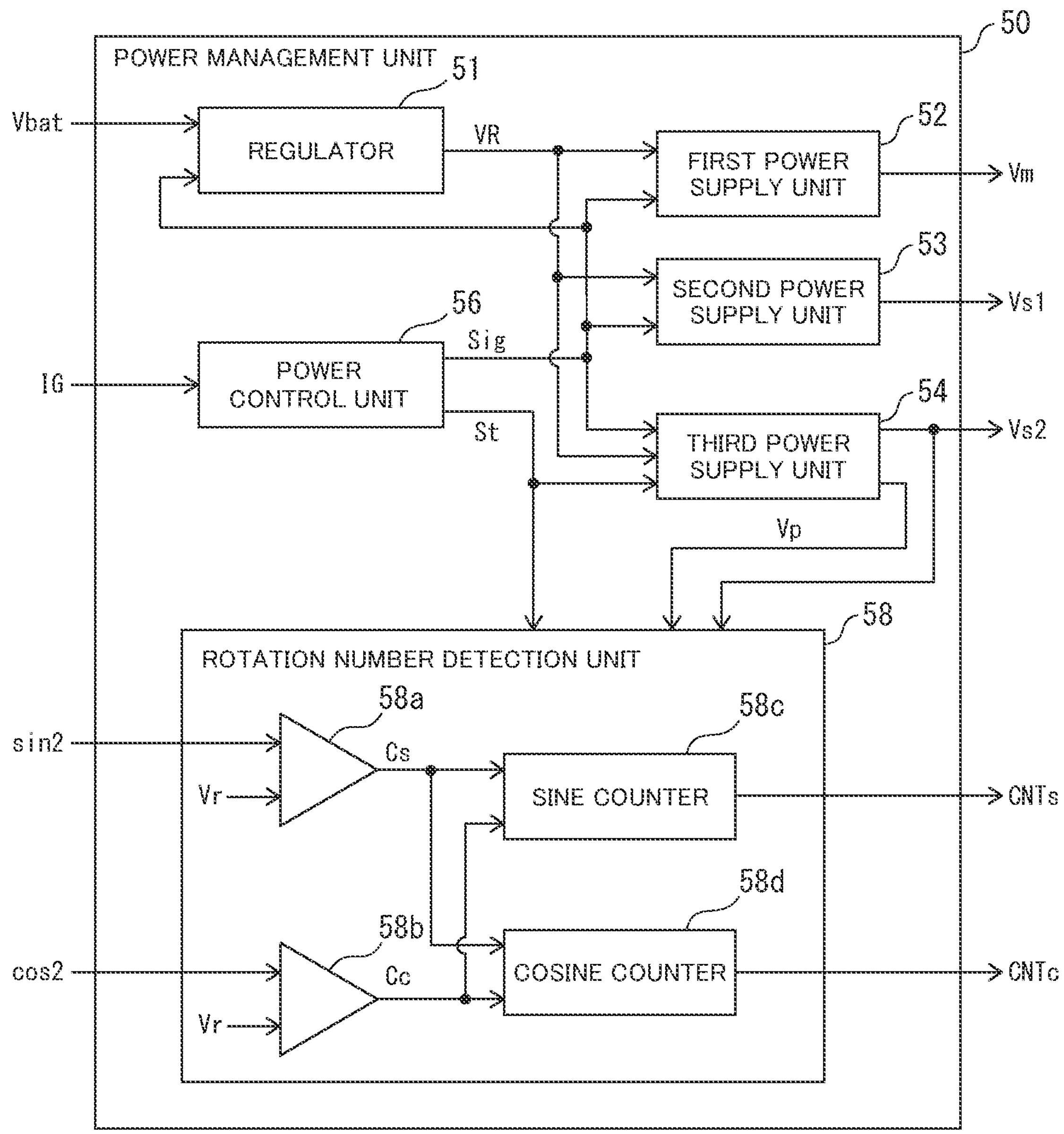
FIG. 20 is a block diagram of an exemplary functional configuration of a power management unit of the third embodiment.

With reference to FIG. 20, a functional configuration example of a power management unit 50 is explained. A component similar to that of the power management unit 50 of the first embodiment is indicated with the same reference sign.

The power control unit 56 generates an operation switching signal Sig based on the ignition key signal IG and outputs to the regulator 51, the first power supply unit 52, the second power supply unit 53, and the third power supply unit 54.

The power control unit 56 outputs a timing signal St having the cycle T representing the start time of the intermittent output period of the second sensor power source Vs2 to the third power supply unit 54 and the rotation number detection unit 58 while the ignition key 11 is off.

The regulator 51 generates regulator power source VR having a predetermined voltage from the battery power source Vbat. The first power supply unit 52 and the second power supply unit 53 generate the power source Vm and the first sensor power source Vs1 from this regulator power source VR. The third power supply unit 54 generates the second sensor power source Vs2 and the internal power source Vp from the regulator power source VR.

The regulator 51 switches the voltage of the regulator power VR in accordance with the operation switching signal Sig.

For example, the voltage of the regulator power source VR while the operation switching signal Sig is "0" (in other words, while the ignition key 11 is off) may be lower than the voltage of the regulator power source VR while the operation switching signal Sig is "1" (in other words, while the ignition key 11 is on). Consequently, the voltage of the second sensor power source Vs2 and the internal power source Vp while the ignition key 11 is off can be lowered than the voltage while the ignition key 11 is on.

For example, the voltage of the regulator power source VR while the operation switching signal Sig is "1" may be 6 V, and the voltage of the regulator power source VR while the operation switching signal Sig is "0" may be 4 V.

While the operation switching signal Sig has the value of "1", the first power supply unit 52 continually supplies power to the MPU 60, etc. as the power source Vm, and the second power supply unit 53 continually supplies power to the first sensor 33 as the first sensor power source Vs1.

While the operation switching signal Sig has a value of "1", the third power supply unit 54 continually supplies power to the second sensor 34 and the rotation number detection unit 58 as the second sensor power source Vs2, and continually supplies power to the rotation number detection unit 58 as the internal power source Vp.

As a result, in the period while the ignition key 11 is on, the MPU 60, etc., the first sensor 33 and the second sensor 34 operate continually. The voltage of the first sensor power source Vs1, the second sensor power source Vs2, and the internal power source Vp is the power voltage Vcc1.

On the other hand, when the operation switching signal Sig has a value of "0" (in other words, while the ignition key 11 is off), the first power supply unit 52 and the second power supply unit 53 stop generating the power source Vm and the first sensor power source Vs1. Accordingly, the supply of the first sensor power source Vs1 to the first sensor 33 and the supply of the power source Vm to the MPU 60, etc. stop, and the operation of the first sensor 33 and the MPU 60, etc. stops.

The third power supply unit 54 intermittently outputs power having a voltage of power voltage Vcc2 as the second sensor power source Vs2 while the operation switching signal Sig has a value of "0".

As a result, the second sensor power source Vs2 having a power voltage Vcc2 that is lower than the power voltage Vcc1 is intermittently supplied to the second sensor 34, and the second sensor 34 operates intermittently.

The third power supply unit 54 intermittently outputs the second sensor power source Vs2 in the timing based on the timing signal St output by the power control unit 56. The third power supply unit 54 sets the time width Wt of one intermittent output of the second sensor power source Vs2 in accordance with the waiting period Pw and idle period Pi and sampling period Ps that are preliminarily programmed in the power management unit 50.

The third power supply unit 54 continually generates power having a voltage of power voltage Vcc2 as the internal power source Vp while the operation switching signal Sig has a value of "0". For example, while continually generating common power having a voltage of the power voltage Vcc2 from the regulator power source VR and outputting the common power as it is as the internal power source Vp, third power supply unit 54 may generate the second sensor power source Vs2 by switching the common power.

While the ignition key 11 is on, the rotation number detection unit 58 generates the rotation number information in a predetermined sampling period that is shorter than the intermittent output cycle T of the second sensor power source Vs2. While the ignition key 11 is off, the rotation number detection unit 58 intermittently generates the rotation number information when the second sensor power source Vs2 is supplied to the second sensor 34 in the intermittent output cycle T.

The first comparator 58*a* operates using the second sensor power source Vs2 as the power source and generates a sign signal Cs representing the plus/minus sign of the second sine-wave signal sin 2 by comparing the second sine-wave signal sin 2 and the threshold voltage Vr. The sign signal Cs has a logical value of "1" when the second sine-wave signal sin 2 is equal to or greater than the threshold voltage Vr and has a logical value of "0" when the second sine-wave signal sin 2 is less than the threshold voltage Vr.

The threshold voltage Vr may be set based on the voltage of the second sensor power source Vs2. The rotation number detection unit 58 may include a voltage-dividing resistor that generates a threshold voltage Vr by dividing the voltage of the second sensor power source Vs2 or the regulator power source VR, for example.

For example, when the ignition key 11 is on and the second sensor power source Vs2 is 5 V, the threshold voltage Vr may be set to 2.5 V, and when the ignition key 11 is off and the second sensor power source Vs2 is 3.3V, the threshold voltage Vr may be set to 1.65 V.

The second comparator 58*b* operates using the second sensor power source Vs2 as the power source and generates a sign signal Cc representing the plus/minus sign of the second cosine-wave signal cos 2 by comparing the second cosine-wave signal cos 2 and the threshold voltage Vr. The sign signal Cc has a logical value of "1" when the second cosine-wave signal cos 2 is equal to or greater than the threshold voltage Vr and has a logical value of "0" when the second cosine-wave signal cos 2 is less than the threshold voltage Vr.

While the ignition key 11 is off, the first comparator 58*a* and the second comparator 58*b* obtain the second sine-wave signal sin 2 and the second cosine-wave signal cos 2 during the sampling period Ps that starts from the start time determined based on the timing signal St having a cycle T output from the power control unit 56, the waiting period Pw, and the idle period Pi preliminarily programmed in the power management unit 50. As a result, the first comparator 58*a* and the second comparator 58*b* operate intermittently while the ignition key 11 is off, and changes the sign signals Cs and Cc in accordance with the result of comparing the second sine-wave signal sin 2 and the second cosine-wave signal cos 2 and the threshold voltage Vr.

The sine counter 58*c* and the cosine counter 58*d* operate using the internal power source Vp as the power source and calculate the sine count value CNTs and the cosine count value CNTc, respectively.

The power management unit 50 may dynamically change the intermittent output cycle T of the second sensor power source Vs2 while the ignition key 11 is off, in a similar manner to the second embodiment. For example, when the motor rotation shaft 21 rotates while the ignition key 11 is off, afterwards, the motor rotation shaft 21 may rotate faster, and there is a risk that the rotation number detection unit 58 cannot detect the rotation of the motor rotation shaft 21 correctly. On the other hand, while the motor rotation shaft 21 continues to stop, the power consumption can be reduced by expanding the intermittent output cycle T.

Therefore, the power management unit 50 may shorten the intermittent output cycle T when a change in one of the second sine-wave signal sin 2 or the second cosine-wave signal cos 2 is detected, for example. Also, the power management unit 50 may expand the intermittent output cycle T when a period in which no change in either the second sine-wave signal sin 2 or the second cosine-wave signal cos 2 is detected continues.

The configuration example of the power management unit 50 described in reference to FIG. 19A, FIG. 19B, and FIG. 20 includes the first power supply unit 52 that supplies power source Vm to the MPU 60, etc. and the second power supply unit 53 that supplies the first sensor power source Vs1 to the first sensor 33, however, the present invention is not limited to such a configuration. The power source Vm and the first sensor power source Vs1 may be supplied from a component other than the power management unit 50 so long as they are supplied when the ignition key 11 is on and the supply stops when the ignition key 11 is off.

Effect of the Third Embodiment (1) The rotation angle detection device of the third embodiment includes the first sensor 33 that is supplied with power when the ignition key 11 is on and outputs the first sensor signal in accordance with the rotation of the motor rotation shaft 21 of the motor 20, power supply for the the first sensor 33 being stopped when the ignition key 11 is off, the angular position calculation unit 61 that is supplied with power when the ignition key 11 is on and calculates the angular position information representing the angular position of the motor rotation shaft 21 based on the first sensor signal, power supply for the angular position calculation unit 61 being stopped when the ignition key 11 is off, the second sensor 34 that outputs the second sensor signal including the sine-wave signal and the cosine-wave signal in accordance with the rotation of the motor rotation shaft 21, the power management unit 50 that continually supplies the first power to the second sensor 34 when the ignition key 11 is on, and intermittently supplies the second power having a voltage lower than the first power to the second sensor 34 when the ignition key 11 is off and outputs rotation number information representing the rotation number of the motor rotation shaft based on the second sensor signal, and the rotation angle information calculation unit 66 that is supplied with power when the ignition key 11 is on, and calculates the rotation angle information representing the rotation angle of the motor rotation shaft 21 based on the angular position information and the rotation number information, the power supply for the angle information calculation unit 66 being stopped when the ignition key 11 is off.

The power management unit 50 includes the third power supply unit 54 that generates the first power and the second power, the comparators 58*a* and 58*b* that operate using the first power supplied from the third power supply unit 54 as the power source and compare the first reference voltage based on the voltage of the first power and the second sensor signal when the ignition key 11 is on, and operate using the second power as the power source supplied from the third power supply unit 54 and compare the second reference voltage based on the voltage of the second power and the second sensor signal when the ignition key 11 is off, and counters 58*c* and 58*d* that detect the rotation number of the motor rotation shaft by counting the outputs of the comparators 58*a* and 58*b*.

As described above, since the second sensor 34 and comparators 58*a* and 58*b* are driven intermittently and these power voltages are lowered when the ignition key 11 is off, the power consumption while the ignition key 11 is off can be reduced.

Moreover, by arranging the comparators 58*a* and 58*b* that acquire the second sensor signal of the second sensor 34 that is intermittently driven in the power management unit 50 that intermittently outputs the power source of the second sensor 34, the operation of comparators 58*a* and 58*b* can be more easily synchronized with the intermittent driving of the second sensor 34.

By driving the comparators 58*a* and 58*b* with the same power source as that of the second sensor 34, and setting the reference voltage for comparing with the second sensor signal based on the voltage of the power source of the second sensor 34, the proper outputs of the comparators 58*a* and 58*b* can be obtained even if the power voltage for the second sensor 34 switches as the ignition key 11 is turned on and off.

(2) The third power supply unit 54 may supply the first power as the power source to the counters 58*c* and 58*d* when the ignition key 11 is on and may generate the third power that is the continuous power having the same voltage as the second power and supply to the counters 58*c* and 58*d* when the ignition key 11 is off.

Since the power voltages of the counters 58*c* and 58*d* are lowered when the ignition key 11 is off, the power consumption while the ignition key 11 is off can be reduced.

(3) The power management unit 50 includes a regulator 51 that generates the fourth power that is continuous power having the first regulator voltage from an external power source when the ignition key 11 is on and generates fifth power that is continuous power having the second regulator voltage lower than the first regulator voltage from an external power source when the ignition key 11 is off, and the third power supply unit 54 may generate the first power from the fourth power and may generate the second power and the third power from the fifth power.

As a result, the output voltage of the third power supply unit 54 can be switched by switching the output power from the regulator 51.

(4) The comparators 58*a*, 58*b*, and the third power supply unit 54 can be arranged in a single integrated circuit chip.

As a result, the operation of the comparators 58*a* and 58*b* can be more easily synchronized with the intermittent driving of the second sensor 34.

(5) The time width Wt of one intermittent output of the second power may be set in accordance with the consumption current acceptable by the rotation angle detection device when the ignition key 11 is off. Therefore, the power consumption in the period while the ignition key 11 is off can be reduced.

(6) The time width Wt of one intermittent output of the second power may be set in accordance with the time constant of the second sensor signal when the second power is intermittently supplied. As a result, sampling of a signal smaller than the original second sensor signal due to the time width Wt being too small can be prevented.

(7) The time width of one intermittent output of the second power may be equal to or smaller than 220 μsec, for example. As a result, the power consumption in the period while the ignition key 11 is off can be reduced.

Fourth Embodiment

A sensor unit 30 and a controller 40 according to the fourth embodiment are described. A power management unit 50 intermittently supplies power as a second sensor power source Vs2 to a second sensor 34 while the ignition key 11 is off. However, when the sensor unit 30 is formed as a unit separate from the controller 40, and a second sensor power source Vs2 is intermittently supplied to a second sensor 34 via a harness 35, transient current may flow right after start, and the power voltage may become unstable and electromagnetic noise may be generated. As a result, while the ignition key 11 is off, there is a risk that the second sensor signal obtained from the second sensor 34 becomes unstable.

Hence, for the sensor unit 30 and the controller 40 according to the fourth embodiment, one or both of a bypass capacitor and a decoupling capacitor are arranged in the power line of the second sensor power source Vs2. The bypass capacitor mainly has a function of allowing the noise element whose frequency is relatively high to escape to the ground, and the decoupling capacitor mainly has a function of absorbing the voltage fluctuation whose frequency is relatively low and stabilizing the power supply system, however, there is a case that one capacitor has both functions.

Figure 21:
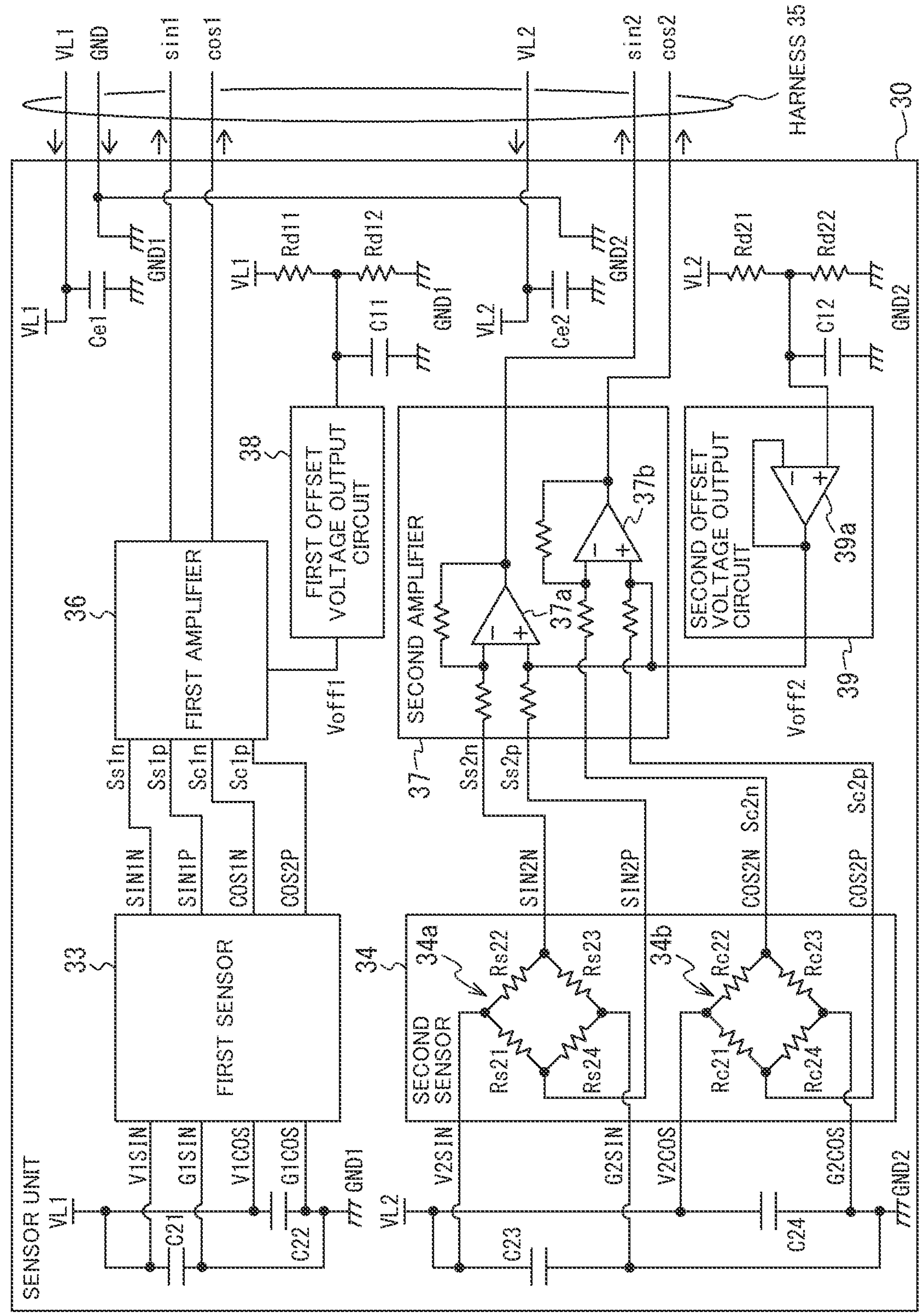
FIG. 21 is a block diagram illustrating an outline of an exemplary circuit configuration of a sensor unit according to the fourth embodiment.

FIG. 21 is a block diagram illustrating an outline of an exemplary circuit configuration of the sensor unit 30 according to the fourth embodiment. The sensor unit 30 includes the first sensor 33, the second sensor 34, a first amplifier 36, a second amplifier 37, a first offset voltage output circuit 38, a second offset voltage output circuit 39, voltage-dividing resistors Rd11, Rd12, Rd21, and Rd22.

A first sensor power line VL1 of the first sensor power source Vs1 and a second sensor power line VL2 of the second sensor power source Vs2 on the side of the sensor unit 30 are connected to a first sensor power line VL1 and a second sensor power line VL2 on the side of the harness 35, and the first sensor power source Vs1 and the second sensor power source Vs2 are supplied from the controller 40. A first sensor grounding line GND1 and a second sensor grounding line GND2 on the side of the sensor unit 30 are connected to a grounding line (not illustrated) on the controller 40 side via a grounding line GND on the harness 35 side.

The second sensor 34 includes a bridge circuit 34*a* of magnetoresistive elements Rs21, Rs22, Rs23, and Rs24, and a bridge circuit 34*b* of the magnetoresistive elements Rc21, Rc22 Rc23, and Rc24.

The magnetization direction of the pin layer of the magnetoresistive elements Rs21, Rs22, Rs23, and Rs24 and the magnetization direction of the pin layer of the magnetoresistive elements Rc21, Rc22 Rc23, and Rc24 differ by 90°.

Differential sine-wave signals Ss2*p* and Ss2*n* representing the sine wave component in accordance with the motor rotation shaft 21 are output from the output terminals SIN 2P and SIN 2N that are connected to the midpoint potential points when the second sensor power source Vs2 is supplied between the connection point of the magnetoresistive elements Rs21 and Rs22 that are connected to the second sensor power line VL2 via the power terminal V2 SIN and the connection point of the magnetoresistive elements Rs23 and Rs24 that are connected to the second sensor grounding line GND2 via the grounding terminal G2 SIN.

The differential cosine-wave signals Sc2*p* and Sc2*n* representing the cosine wave component in accordance with the motor rotation shaft 21 are output from the output terminals COS 2P and COS 2N that are connected to the midpoint potential points when the second sensor power source Vs2 is supplied between the connection point of the magnetoresistive elements Rc21 and Rc22 that are connected to the second sensor power line VL2 via the power terminal V2 COS and the connection point of the magnetoresistive elements Rc23 and Rc24 that are connected to the second sensor grounding line GND2 via the grounding terminal G2 COS.

The first sensor 33 has the same configuration as the second sensor 34, and the power terminals V1 SIN and V1 COS correspond to the power terminals V2 SIN and V2 COS respectively, the grounding terminals G1 SIN and G1 COS correspond to the grounding terminals G2 SIN and G2 COS respectively, the output terminals SIN 1N, SIN 1P, COS 1N, and COS 1P correspond to the output terminals SIN 2N, SIN 2P COS 2N, and COS 2P respectively, the differential sine-wave signals Ss1*p* and Ss1*n* correspond to the differential sine-wave signals Ss2*p* and Ss2*n* respectively, and the differential cosine-wave signals Sc1*p* and Sc1*n* correspond to the differential cosine-wave signals Sc2*p* and Sc2*n* respectively.

The second amplifier 37 outputs a second sine-wave signal sin 2 by amplifying the differential sine-wave signals Ss2*p* and Ss2*n* and applying an offset voltage Voff2 output from the second offset voltage output circuit 39. Also, second amplifier 37 outputs a second cosine-wave signal cos 2 by amplifying the differential cosine-wave signals Sc2*p* and Sc2*n* and applying an offset voltage Voff2. The second amplifier 37 includes a differential amplifier 37*a* having a non-inversion terminal and an inversion terminal to which the differential sine-wave signals Ss2*p* and Ss2*n* are input respectively and a differential amplifier 37*b* having a non-inversion terminal and an inversion terminal to which the differential cosine-wave signals Sc2*p* and Sc2*n* are input respectively.

The second offset voltage output circuit 39 applies the offset voltage Voff2 to the non-inversion terminals of differential amplifiers 37*a* and 37*b*.

The second offset voltage output circuit 39 may be a voltage follower circuit having an amplifier 39*a* including a non-inversion terminal to which the division voltage acquired by dividing the second sensor power source Vs2 by the voltage-dividing resistors Rd21 and Rd22 is input, for example. For example, the resistance values of the voltage-dividing resistors Rd21 and Rd22 may be equalized, and the second sensor power source Vs2 may be divided in the ratio of 1:1. In this case, the offset voltage Voff2 becomes ½ of the second sensor power source Vs2 (Vs2/2).

The first amplifier 36 and the first offset voltage circuit 38 have the same configuration as the second amplifier 37 and the second offset voltage circuit 39.

The first amplifier 36 outputs a first sine-wave signal sin 1 by amplifying the differential sine-wave signals Ss1*p* and Ss1*n* and applying an offset voltage Voff1 output from the first offset voltage output circuit 38. Also, the first amplifier 36 outputs a first cosine-wave signal cos 1 by amplifying the differential cosine-wave signals Sc1*p* and Sc1*n* and applying an offset voltage Voff1.

The first offset voltage output circuit 38 may be a voltage follower circuit to which the division voltage acquired by dividing the first sensor power source Vs1 by the voltage-dividing resistors Rd11 and Rd12 is input, for example. The offset voltage Voff1 may be one-half of the first sensor power source Vs1 (Vs1/2), for example.

The first sine-wave signal sin 1, the first cosine-wave signal cos 1, the second sine-wave signal sin 2, and the second cosine-wave signal cos 2 are transmitted to the controller 40 via the harness 35.

In both cases when the ignition key 11 is on where the second sensor power source Vs2 is continually supplied and when the ignition key 11 is off where the second sensor power source Vs2 is intermittently supplied, the present invention requires (1) power stability on the side of the second sensor 34, (2) good Electromagnetic Compatibility (EMC) characteristics, and (3) reducing the dark current when the ignition key 11 is off.

From the viewpoint of power stability, a high-capacity decoupling capacitor is desired. On the other hand, when the ignition key 11 is off where the second sensor power source Vs2 is intermittently supplied, a small-capacity bypass capacitor is desired from the viewpoint of a fast signal rise and dark current reduction. From the viewpoint of EMC characteristics, a bypass capacitor that functions in the high-frequency region is desired.

The inventors discovered that a stable second sensor signal can be obtained by arranging a bypass capacitor and a decoupling capacitor at the following three locations (1) to (3) by repeating simulations.

(1) An Input Terminal of the Second Offset Voltage Output Circuit 39

By arranging a decoupling capacitor C12 to connect the input terminal of the second offset voltage output circuit 39 and the second sensor grounding line GND2 (in other words, the connection point of the voltage-dividing resistors Rd21 and Rd22 and the second sensor grounding line GND2 are connected), when the second sensor power source Vs2 is intermittently supplied, even when the second sensor power source Vs2 is switched, the voltage fluctuation in the power source caused by the transient current is blocked by a low-pass filter formed by the voltage-dividing resistor Rd21 and the decoupling capacitor C12, and therefore the fluctuation in the DC component of the second sensor signal is suppressed. As a result, the stability of the second sensor signal can be improved.

(2) A Position Proximate to the Second Sensor 34

By arranging bypass capacitors C23 and C24 connecting the second sensor power line VL2 and the second sensor grounding line GND2 at a position proximate to the second sensor 34, the effect of the electromagnetic noise occurred by the switching of the second sensor power source Vs2 on the second sensor 34 is suppressed, and therefore the stability of the second sensor signal is improved.

(3) A position proximate to the power management unit 50

Figure 22:
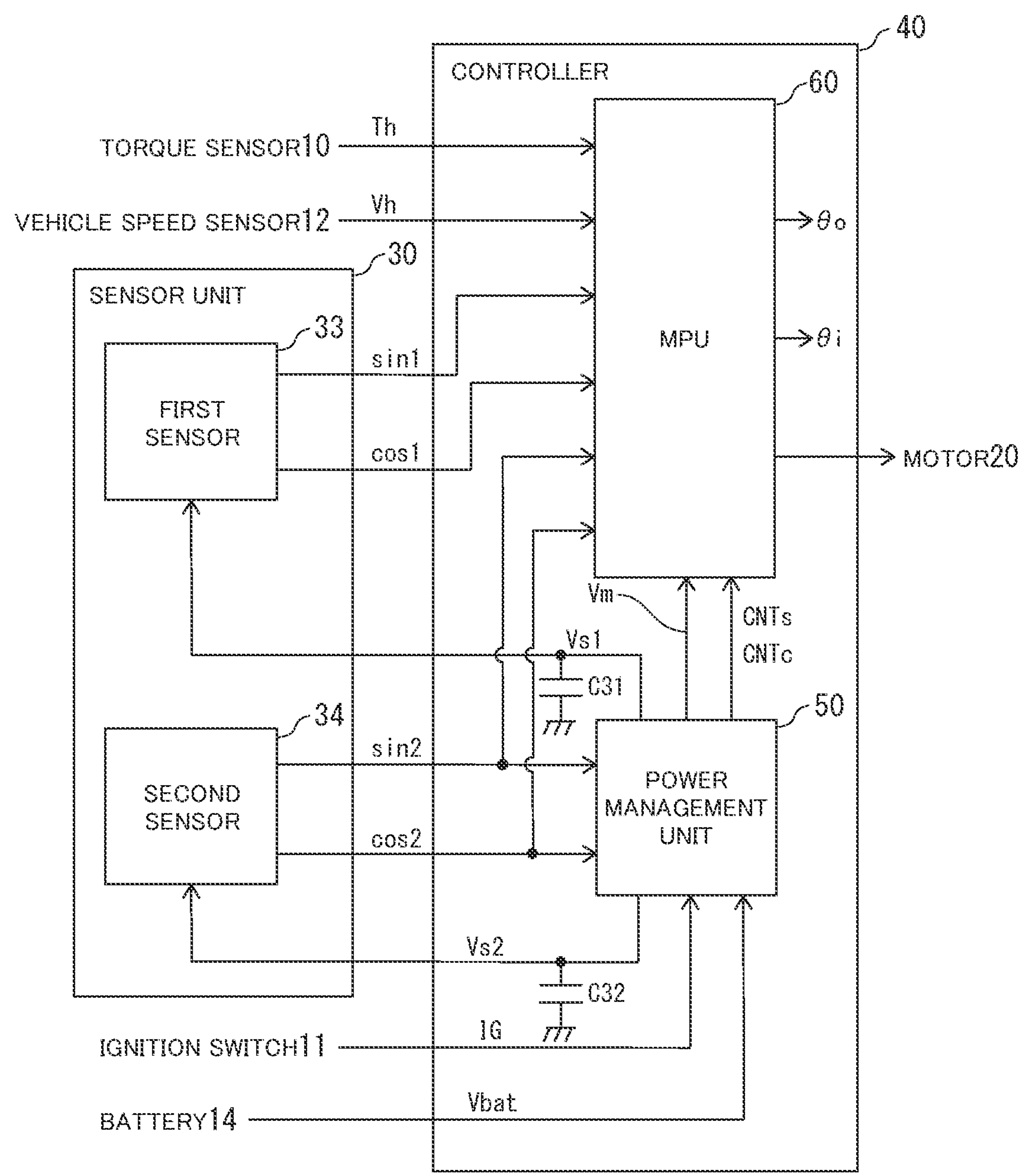
FIG. 22 is a diagram illustrating a configuration example of a controller according to the fourth embodiment.

By arranging a decoupling capacitor C32 (refer to FIG. 22) that connects the second sensor power line VL2 of the harness 35 and the grounding line GND at a position in the proximity of the power management unit 50, the entry of the voltage fluctuation that occurs when the second sensor power source Vs2 is switched into the harness 35 is prevented, and therefore the power is supplied by the harness 35 in a stable manner. Moreover, noise generated by the harness 35 can be reduced.

When the ignition key 11 is on (in other words, when the second sensor power source Vs2 is continually supplied), the effect of the noise from outside to the second sensor 34 can be suppressed by connecting one or both of a bypass capacitor and a decoupling capacitor at the above-described 3 locations (1) to (3), so the stability of the second sensor signal can be improved.

Similar to the second sensor power line VL2 of the second sensor power source Vs2, a bypass capacitor and a decoupling capacitor may be arranged on the first sensor power line VL1 of the first sensor power source Vs1. In the embodiment, a decoupling capacitor C11 (refer to FIG. 21) that connects the input terminal of the first offset voltage output circuit 38 and the first sensor grounding line GND1 is provided.

Bypass capacitors C21 and C22 that connect the first sensor power line VL1 and the first sensor grounding line GND1 at a position proximate to the first sensor 33 are also arranged.

A decoupling capacitor C31 (refer to FIG. 22) that connects the first sensor power line VL1 and the grounding line GND of the harness 35 at a position proximate to the power management unit 50 is arranged.

A bypass capacitor Ce1 that connects the first sensor power line VL1 and the first sensor grounding line GND1 on the sensor unit 30 side for preventing electrostatic discharge surge (ESD) and a bypass capacitor Ce2 that connects the second sensor power line VL2 and the second sensor grounding line GND2 on the sensor unit 30 side for ESD prevention may be arranged at a position proximate to the connector with the harness 35.

Effect of the Fourth Embodiment (1) The rotation angle detection device of the embodiment includes the sensor unit 30 that outputs the first sensor signal including the sine-wave signal and the cosine-wave signal in accordance with the rotation of the motor rotation shaft 21 of the motor 20 and the second sensor signal including a sine-wave signal and a cosine-wave signal in accordance with the motor rotation shaft 21, the controller 40 that calculates the rotation angle information representing the rotation angle of the motor rotation shaft 21 based on the first sensor signal and the second sensor signal while supplying power to the sensor unit 30, and the harness 35 that connects the controller 40 and the sensor unit 30, transmits power from the controller 40 to the sensor unit 30, and transmits the first sensor signal and the second sensor signal from the sensor unit 30 to the controller 40.

The sensor unit 30 includes the first sensor 33 driven by the first sensor power source Vs1 supplied by the controller 40 via the harness 35 that outputs a sine-wave signal and a cosine-wave signal in accordance with the rotation of the motor rotation shaft 21, the first amplifier 36 that amplifies the output signal of the first sensor 33 and outputs as the first sensor signal, the second sensor 34 that is driven by the second sensor power source Vs2 supplied by the controller 40 via the harness 35 and outputs a sine-wave signal and a cosine-wave signal in accordance with the rotation of the motor rotation shaft 21, the second amplifier 37 that amplifies the output signal of the second sensor 34 and outputs as the second sensor signal, the first voltage-dividing resistors Rd11 and Rd12 and the second voltage-dividing resistors Rd21 and Rd22 that respectively divide the voltages of the first sensor power source Vs1 and the second sensor power source Vs2 that are supplied by the controller 40 via the harness 35, the first offset voltage output circuit 38 and the second offset voltage output circuit 39 that apply the offset voltage to the first amplifier 36 and the second amplifier 37 to which the division voltages are respectively input from the connection points of the first voltage-dividing resistors Rd11 and Rd12 and the second voltage-dividing resistors Rd21 and Rd22, and the decoupling capacitor C12 that connects the input terminal of the second offset voltage output circuit 39 and the ground.

The controller 40 includes the power management unit 50 that continually supplies the first sensor power source Vs1 and the second sensor power source Vs2 when the power switch is on and stops supplying the first sensor power source Vs1 when the power switch is off while intermittently supplies power as the second sensor power source Vs2.

By arranging the decoupling capacitor C12, when the second sensor power source Vs2 is intermittently supplied, even when the second sensor power source Vs2 is switched, the voltage fluctuation in the power source caused by the transient current is blocked by a low-pass filter formed by the voltage-dividing resistor Rd21 and the decoupling capacitor C12, and therefore the fluctuation in the DC component of the second sensor signal is suppressed. As a result, the stability of the second sensor signal can be improved.

(2) The sensor unit 30 may include bypass capacitors C23 and C24 that connect the power line of the second sensor power source Vs2 and the ground at a position proximate to the second sensor 34.

By arranging bypass capacitors C23 and C24, the effect of the electromagnetic noise occurred by the switching of the second sensor power source Vs2 on the second sensor 34 is suppressed, and therefore the stability of the second sensor signal can be improved.

(3) The controller 40 may include the decoupling capacitor C32 that connects the power line of the second sensor power source Vs2 of the harness 35 and the ground at a position proximate to the power management unit 50.

By arranging the decoupling capacitor C32, the entry of the voltage fluctuation that occurs when the second sensor power source Vs2 is switched into the harness 35 is prevented, and therefore the power can be supplied by the harness 35 in a stable manner. Moreover, noise generated by the harness 35 can be reduced.

(4) The sensor unit 30 may include the bypass capacitors C21 and C22 that connect the power line of the first sensor power source Vs1 and the ground at a position proximate to the first sensor 33.

By arranging bypass capacitors C22 and C22, the effect of the electromagnetic noise occurred by the switching of the first sensor power source Vs1 on the first sensor 33 is suppressed, and therefore the stability of the first sensor signal can be improved.

The configurations of the first embodiment to the fourth embodiment may be appropriately combined. For example, in the power control unit 56 of the power management unit 50 according to the third embodiment, the drive interval of driving the second sensor 34 may be modified in the configuration and method similar to the power control unit 56 of the second embodiment.

Similar to the third embodiment, for example, the comparators 58*a* and 58*b* according to the second embodiment may operate using the second sensor power source Vs2 continually supplied from the third power supply unit 54 as the power source and compare the threshold voltage Vr based on the voltage of the second sensor power source Vs2 and the second sensor signal when the ignition key 11 is on, and operate using the second sensor power source Vs2 as the power source intermittently supplied from the third power supply unit 54 and compare the threshold voltage Vr based on the voltage of the second sensor power source Vs2 and the second sensor signal when the ignition key 11 is off, and the sine counter 58*c* and the cosine counter 58*d* may operate using the internal power source Vp as the power source.

A bypass capacitor similar to that of the fourth embodiment may be provided in the sensor units 30 and the controllers 40 according to the first to third embodiments, for example.

Variation

In the above description, the rotation angle detection device of the present invention is applied to an electric power steering device of a column-assist type, so-called upstream assistance type, however, the rotation angle detection device of the present invention may be applied to an electric power steering device of a so-called downstream assistance type. Hereinafter, as an example of an electric power steering device of the downstream assist type, configuration examples of applying the rotation angle detection device of the present invention to electric power steering devices of single pinion-assist type, rack assist type, and dual pinion-assist type are described.

Figure 23:
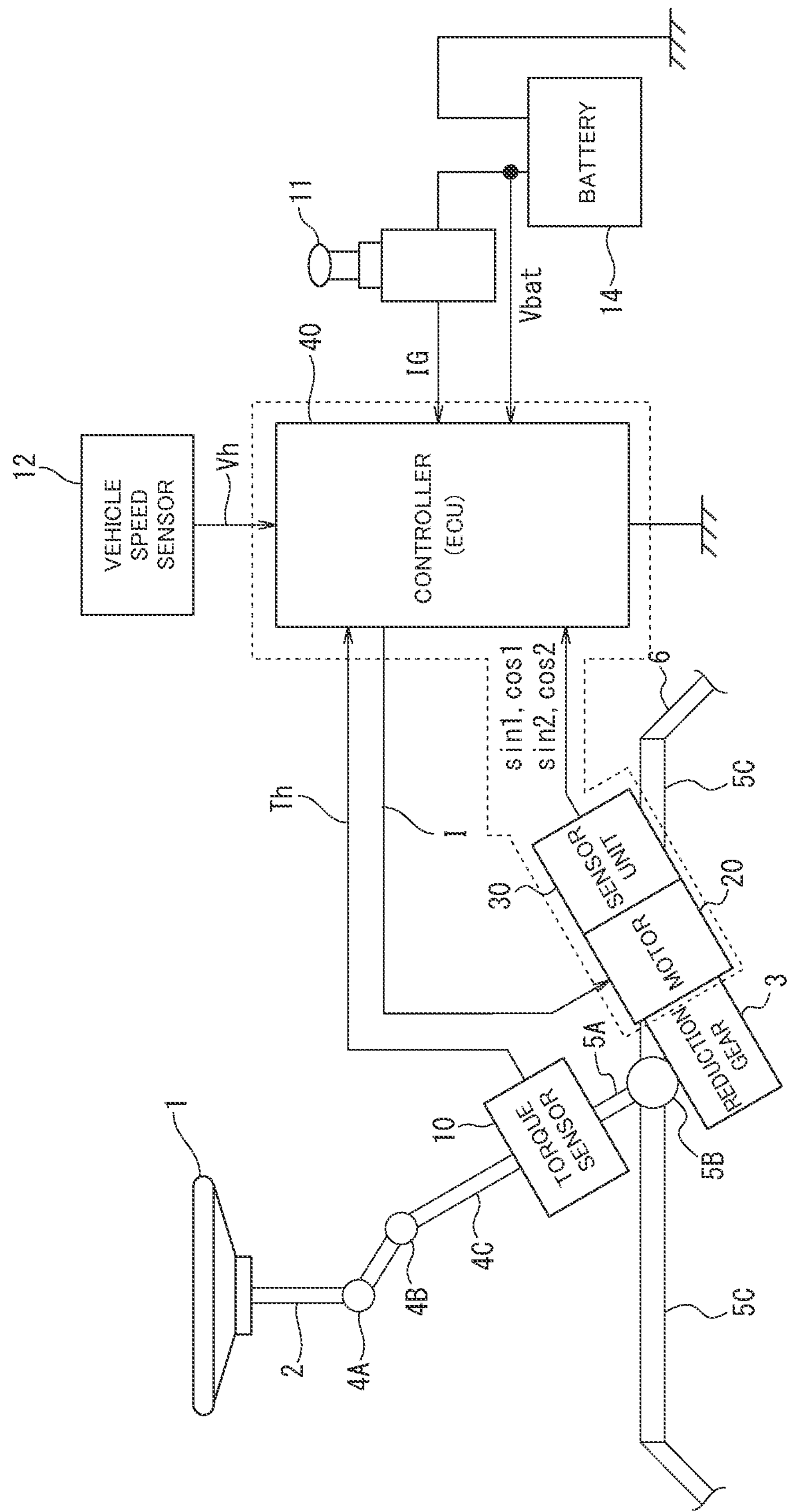
FIG. 23 is a configuration diagram illustrating an outline of an example of a modification of electric power steering device.
Figure 24:
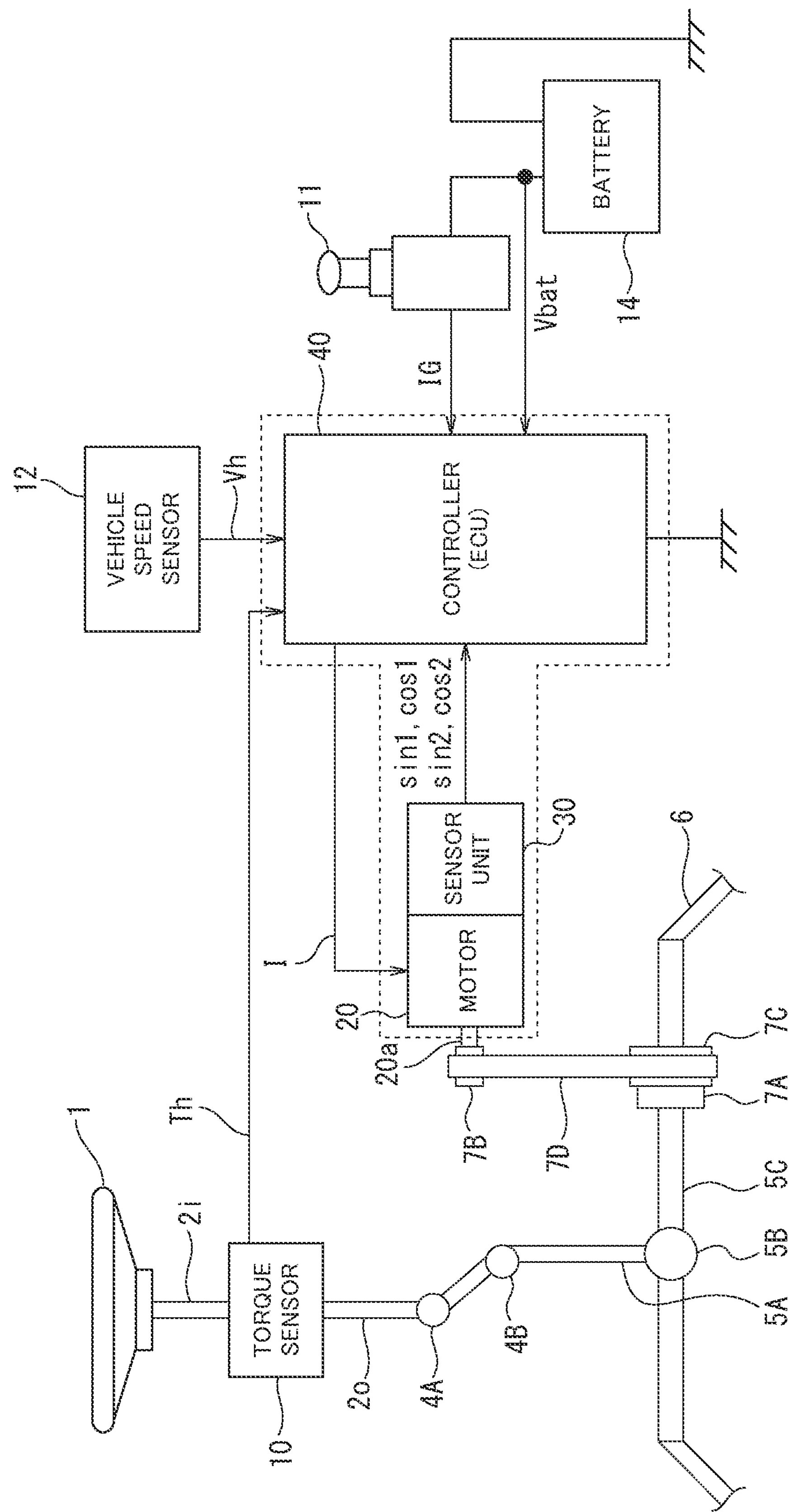
FIG. 24 is a configuration diagram illustrating an outline of an example of a modification of electric power steering device.
Figure 25:
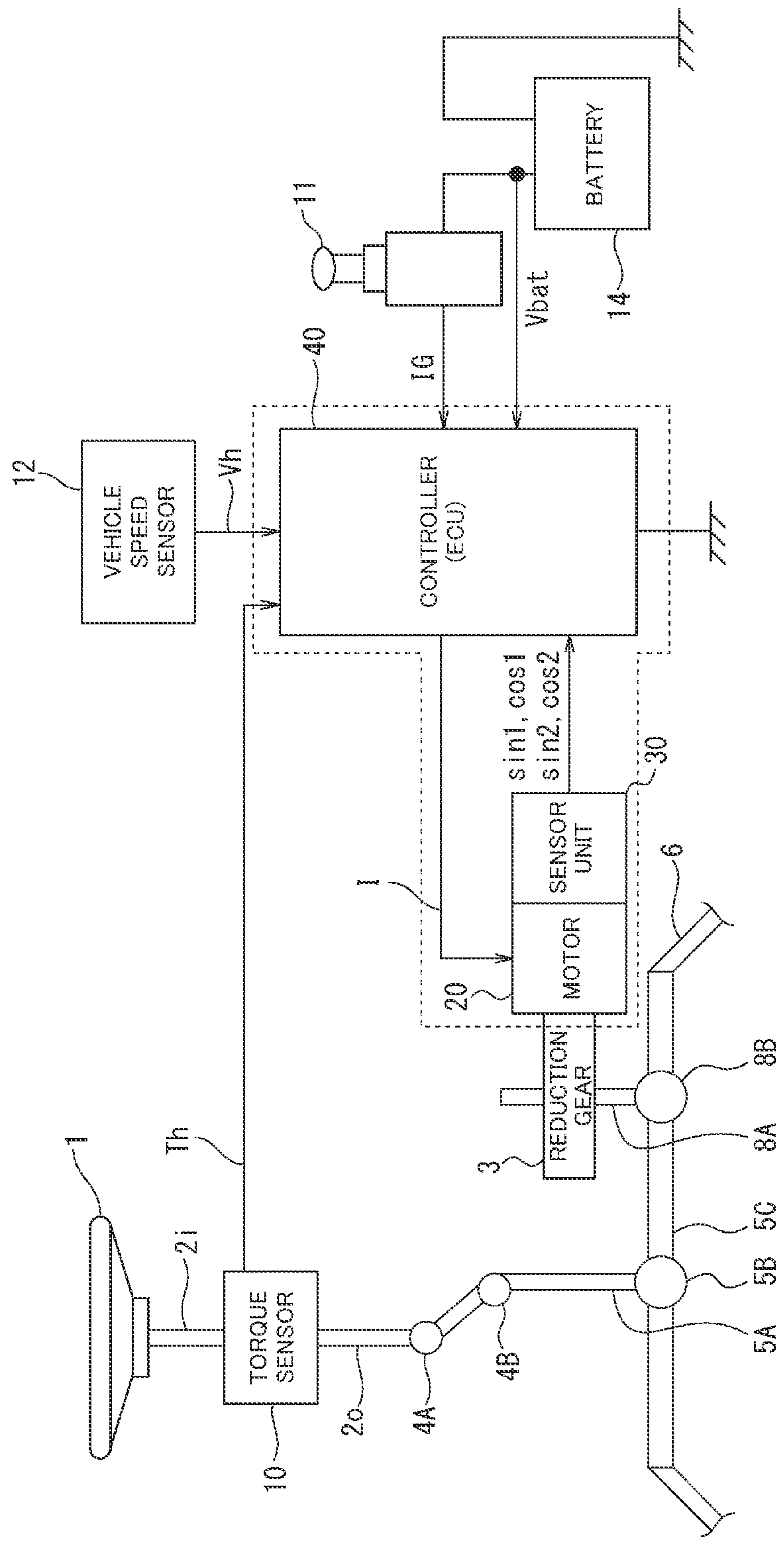
FIG. 25 is a configuration diagram illustrating an outline of an example of a modification of electric power steering device.

In the case of the downstream assist method, the motor 20, the sensor unit 30, and the controller 40 may not be separated but may be an integrated structure Motor Control Unit (MCU) as illustrated by the broken lines in FIG. 23 to FIG. 25 for waterproof purposes. In this case, a sensor IC that becomes the above-described first sensor 33 and second sensor 34 may be embedded in the circuit substrate of the controller 40.

FIG. 23 illustrates a configuration example of applying the rotation angle detection device of the present invention to a single pinion-assist type electric power steering device. A column shaft 2 is provided instead of column shafts 2*i* and 2*o* and a torsion bar that connects both. A steering wheel 1 is connected to a universal joint 4A at one end of an intermediate shaft via a column shaft 2. The other universal joint 4B is connected to an input-side shaft 4C of the torsion bar (not illustrated).

A pinion and rack mechanism 5 includes a pinion shaft 5A, a pinion gear 5B, and a rack bar 5C. The input-side shaft 4C and the pinion rack mechanism 5 are connected by a torsion bar (not illustrated) that twists according to a difference of rotation angles of the input-side shaft 4C and the pinion rack mechanism 5. A torque sensor 10 electromagnetically measures a torsion angle of the torsion bar as steering torque Th of the steering wheel 1.

The pinion shaft 5A is connected to a motor 20 that assists the steering force of a steering wheel 1 via a reduction gear 3, and a sensor unit 30 calculates rotation angle information of the motor rotation shaft of the motor 20, in a similar manner to the above-described embodiment.

FIG. 24 illustrates a configuration example of applying the rotation angle detection device of the present invention to a rack assist type electric power steering device. A spiral groove (not illustrated) is formed on a circumference surface of the rack bar 5C, and a spiral groove (not illustrated) having a similar lead is formed inside a nut 7A. A ball screw is formed by arranging multiple rolling bodies on a rolling path formed by the spiral grooves.

A belt 7D is wrapped around a driven pulley 7C connected to the nut 7A and the driving pulley 7B connected to the rotation shaft 20*a* of the motor 20 that assists the steering force of the steering wheel 1, and a rotary motion of the rotation shaft 20*a* is converted to a linear motion of the rack bar 5C. A sensor unit 30 calculates rotation angle information of the motor rotation shaft of the motor 20, similar to the above-described embodiment.

FIG. 25 illustrates a configuration example of applying the rotation angle detection device of the present invention to a dual pinion-assist type electric power steering device. A dual pinion-assist type electric power steering device includes a second pinion shaft 8A, a second pinion gear 8B in addition to a pinion shaft 5A and a pinion gear 5B, and the rack bar 5C includes a first rack tooth (not illustrated) that meshes with the pinion gear 5B and a second rack tooth (not illustrated) that meshes with the second pinion gear 8B. The second pinion shaft 8A is connected to a motor 20 that assists the steering force of a steering wheel 1 via a reduction gear 3, and a sensor unit 30 calculates rotation angle information of the motor rotation shaft of the motor 20, in a similar manner to the above-described embodiment.

REFERENCE SIGNS LIST

1 Steering wheel
2*i* Column shaft (input shaft)
2*o* Column shaft (output shaft)
3 Reduction gear
4A, 4B Universal joint
5 Pinion rack mechanism
6 Tie rod
10 Torque sensor
11 Ignition key (power switch)
12 Vehicle speed sensor
14 Battery
20 Motor
30 Sensor unit
33 First sensor
34 Second sensor
35 Harness
36 First amplifier
37 Second amplifier
38 First offset voltage output circuit
39 Second offset voltage output circuit
40 Controller
50 Power management unit
51 Regulator
52 First power supply unit
53 Second power supply unit
54 Third power supply unit
55 Internal power generation unit
56 Power control unit
57 Sensor power determination unit
58 Rotation number detection unit
58*a* First comparator
58*b* Second comparator
58*c* Sine counter
58*d* Cosine counter
60 Microprocessor
61 Angular position calculation unit
62 Count total unit
63 Rotation number information correction unit
63*a* First quadrant information calculation unit
63*b* Second quadrant information calculation unit
63*c* Quadrant comparison unit
63*d* Correction unit
64 Rotation number calculation unit
65 Angle calculation unit
66 Rotation angle information calculation unit
66*a*, 66*c* Multiplier
66*b*, 66*d* Adder
67 Diagnosis unit
68 Assist control unit
C11, C12, C31, C32 Decoupling capacitor
C21 to C24, Ce1, Ce2 Bypass capacitor

The invention claimed is:

1. A rotation angle detection device of a motor comprising:

a sensor configured to output a sensor signal including a sine-wave signal and a cosine-wave signal in accordance with a directly measured amount of rotation of a motor rotation shaft of a motor;

a sensor power supply unit configured to supply power to the sensor;

a power control unit configured to control the sensor power supply unit to supply power to the sensor continually when a power switch is on and supply power to the sensor intermittently when the power switch is off;

a sensor signal detection unit configured to detect a change in the sine-wave signal and a change in the cosine-wave signal; wherein the power control unit sets a drive interval for driving the sensor by providing power intermittently to the sensor to a first time interval when no change is detected in the sine-wave signal and the cosine-wave signal, sets to a second time interval that is shorter than the first time interval when a change in only one of the sine-wave signal and the cosine-wave signal is detected, and sets to a third time interval that is shorter than the second time interval when a change in one of the sine-wave signal and the cosine-wave signal is detected and then a change in the other is detected.

2. The rotation angle detection device according to claim 1, wherein the power control unit expands by steps the drive interval to the first time interval when a change in neither of the sine-wave signal and the cosine-wave signal is detected even when power is intermittently supplied for a predetermined plurality of times to the sensor while the drive interval is set to be shorter than the first time interval.

3. The rotation angle detection device according to claim 1, wherein the power control unit increases a duty ratio of a period during which power is supplied to the sensor by shortening the drive interval.

4. The rotation angle detection device according to claim 3, wherein the duty ratio is 10% when the drive interval is the third time interval.

5. The rotation angle detection device according to claim 4, wherein the duty ratio when the drive interval is the first time interval is one-third of the duty ratio when the drive interval is the third time interval.

6. The rotation angle detection device according to claim 1, wherein the power control unit lowers a voltage of power supplied to the sensor when the power switch is off than when the power switch is on.

7. The rotation angle detection device according to claim 6, wherein a voltage of power supplied to the sensor when the power switch is off is 3.3 V, and a voltage of power supplied to the sensor when the power switch is on is 5V.

8. A rotation angle detection device according to claim 1, comprising:

a first sensor configured to output a first sensor signal in accordance with a rotation of the motor rotation shaft;

an angular position calculation unit configured to calculate an angular position information that indicates an angular position of the motor rotation shaft based on the first sensor signal;

a rotation number detection unit configured to detect a rotation number of the motor rotation shaft based on the sensor signal output from a second sensor that is the sensor and output rotation number information indicating the rotation number; a rotation angle calculation unit configured to calculate rotation angle information indicating a rotation angle of the motor rotation shaft based on the angular position information and the rotation number information; and a power supply unit configured to supply power to the first sensor, the angular position calculation unit, the rotation number detection unit, and the rotation angle calculation unit; wherein the power control unit controls the power supply unit to supply power to the first sensor, the angular position calculation unit, and the rotation angle calculation unit when the power switch is on and to stop supplying power to the first sensor, the angular position calculation unit, and the rotation angle calculation unit when the power switch is off.

9. An electric power steering device comprising;

a torque sensor configured to detect steering torque that is applied to a steering shaft based on a torsion angle between an input shaft and an output shaft connected via a torsion bar mounted on a steering shaft of a vehicle;

a motor configured to provide steering assistance force to a steering mechanism of the vehicle;

the rotation angle detection device according to claim 1 configured to calculate rotation angle information of a motor rotation shaft of the motor;

a motor control unit configured to drive and control the motor based on the steering torque; and a steering angle calculation unit configured to calculate a steering angle of the input shaft based on the torsion angle, a reduction ratio of a reduction gear, and the rotation angle information.

10. A control method of an electric power steering device according to claim 9, wherein the steering assistance force provided by the motor is controlled based on the steering angle calculated by the steering angle calculation unit.

* * * * *